United States Patent
Yamashita et al.

(10) Patent No.: US 6,182,163 B1
(45) Date of Patent: Jan. 30, 2001

(54) CONTROL METHOD FOR DISTRIBUTED TYPE REMOTE I/O CONTROL SYSTEM PERFORMING AUTOMATIC RESET OF OUTPUT AT START IF NO DETECTED TRANSMISSIONS IN SPECIFIC PERIOD

(75) Inventors: Akihiro Yamashita; Junichi Mito, both of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/116,204

(22) Filed: Jul. 16, 1998

Related U.S. Application Data

(62) Division of application No. 08/583,431, filed on Jan. 5, 1996, now Pat. No. 5,822,615.

(30) Foreign Application Priority Data

May 26, 1995 (JP) .................................................. 7-128604

(51) Int. Cl.⁷ ................................................. G06F 13/42
(52) U.S. Cl. ........................... 710/12; 709/208; 709/238; 710/14; 710/15
(58) Field of Search .................... 709/208, 230, 709/238; 710/12, 14, 30, 15

(56) References Cited

U.S. PATENT DOCUMENTS

| | | | |
|---|---|---|---|
| 4,649,473 | * | 3/1987 | Hammer et al. ..................... 709/213 |
| 4,752,930 | * | 6/1988 | Kitamura et al. .................... 714/815 |
| 5,014,193 | * | 5/1991 | Garner ................................ 395/830 |
| 5,155,846 | * | 10/1992 | Mino ...................................... 714/55 |
| 5,161,151 | * | 11/1992 | Kimura ................................ 370/241 |
| 5,247,657 | * | 9/1993 | Myers ................................... 709/236 |
| 5,301,185 | * | 4/1994 | Cherry ................................. 370/216 |
| 5,323,385 | * | 6/1994 | Jurewicz et al. ..................... 370/300 |

FOREIGN PATENT DOCUMENTS

| | | | |
|---|---|---|---|
| 33 17 567 C2 | * | 12/1983 | (DE) . |
| 33 32 268 A1 | * | 3/1985 | (DE) . |
| 39 38 018 A1 | * | 5/1990 | (DE) . |
| 55-92905 | * | 7/1980 | (JP) . |
| 60-262210 | * | 12/1985 | (JP) . |
| 5-158502 | * | 6/1993 | (JP) . |
| 93-13907 | * | 7/1993 | (KR) . |

OTHER PUBLICATIONS

Dr. Peter Wratil, "Speicherprogrammierbare Steuerungen", Elektronik, Jul. 1986, pp. 128–137 "Auf die richtige Verbindung kommt es an", ELO, Aug. 1986, pp. 64–69.*
Patent Abstracts of Japan, No. 3–6643, Mar. 18, 1991.*
Patent Abstracts of Japan, No. 5–11813, Jan. 22, 1993.*
Patent Abstracts of Japan, No. 61–150006 Jul. 8, 1986.*
Patent Abstracts of Japan, No. 6–95729, Apr. 8, 1994.*

* cited by examiner

Primary Examiner—Thomas C. Lee
Assistant Examiner—Tammara Peyton
(74) Attorney, Agent, or Firm—Sughrue, Mion, Zinn, Macpeak & Seas, PLLC

(57) ABSTRACT

A basic system of an NC unit and a distributed type remote I/O unit executes time division signal transaction through a half-duplex serial communication line, and in case where the distributed type remote I/O can not detect a receiving start state of a transmission frame from the basic system of the NC unit for a specified period of time, output is reset, and the basic system of the NC unit checks a type of and data setting in the distributed type remote I/O unit, and also checks a result for an input/output test and the current situation of communication according to a header pattern of a transmission frame.

16 Claims, 33 Drawing Sheets

FIG. 26A

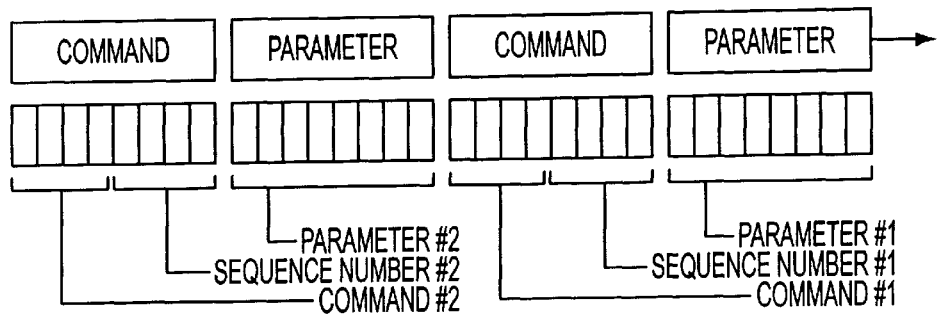

| COMMAND | CONTENTS | PARAMETER #1 | PARAMETER #2 |
|---|---|---|---|
| 0 | RESET | — | — |
| 1 | SELECT HEADER ADDRESS | HEADER ADDRESS (LOW) | HEADER ADDRESS (HIGH) |
| 2 | READ | — | — |
| 4 | WRITE | DATA #1 | DATA #2 |
| F | NO-OPERATION COMMAND | — | — |

FIG. 26B

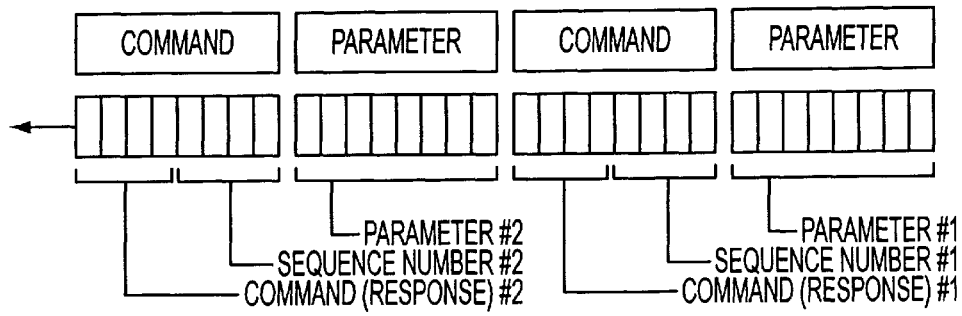

| COMMAND | CONTENTS | PARAMETER #1 | PARAMETER #2 |
|---|---|---|---|
| 0 | RESET RESPONSE | ERROR STATUS | ERROR STATUS |
| 1 | SELECT HEADER ADDRESS RESPONSE | ERROR STATUS | ERROR STATUS |
| 2 | READ RESPONSE | DATA #1 | DATA #2 |
| 4 | WRITE RESPONSE | ERROR STATUS | ERROR STATUS |
| F | NO-OPERATION COMMAND RESPONSE | — | — |

CONTROL METHOD FOR DISTRIBUTED TYPE REMOTE I/O CONTROL SYSTEM PERFORMING AUTOMATIC RESET OF OUTPUT AT START IF NO DETECTED TRANSMISSIONS IN SPECIFIC PERIOD

This is a divisional of application Ser. No. 08/583,431 filed Jan. 5, 1996, U.S. Pat. No. 5,822,615 Oct. 13, 1998 the disclosure of which is incorporated herein by reference.

FIELD OF THE INVENTION

The present invention relates to a control method for a distributed type remote I/O unit control system and a data communication method, and more particularly to a control method for a distributed type remote I/O control system with a numerical control unit, a programmable controller unit, and other various types of control unit, in which a basic system of a control unit is connected to a plurality of distributed type remote I/O units through a serial communication system, and 1 vs. N communication is executed between the basic system of the control unit and each distributed type remote I/O unit.

BACKGROUND OF THE INVENTION

In the field of control system with a numerical control (NC) unit, a programmable controller (PC), or other various types of control unit, a distributed type remote I/O unit control system, in which a plurality of distributed type remote I/O units each for sending and receiving data to and from a basic system of the control unit are provided separately and bidirectional data communication is executed between the basic system of the control unit and the distributed type remote I/O units through a serial communication system, has been well known.

FIG. 31 shows a case where the conventional type of distributed type remote I/O control system is applied in an NC unit. In this figure, the distributed type remote I/O numerical control system has a basic system of the NC unit 1, and a plurality of distributed type remote I/O units 2 each provided separately from the basic system of the NC unit 1, and the basic system of the NC unit 1 and each of the distributed type remote I/O units 2 are connected to each other with two transmission signal lines 121, 122 in the form of serial communication system, and bidirectional data communications is executed between the basic system of the NC unit 1 and each distributed type remote I/O unit 2.

Of the transmission signal lines 121 and 122 which are in parallel to each other, the transmission signal line 121 is used for data transmission from the basic system of the NC unit 1 to the distributed type remote I/O unit 2, while the other transmission signal line 122 is used for data transmission from the distributed type remote I/O unit 2 to the basic system of the NC unit 1. It should be noted that a terminal module 4 is connected to the final distributed type remote I/O unit 2.

The basic system of the NC unit 1 comprises an MPU 101, a communication control section 102 having a transmission driver IC and a receiving driver IC, and a memory 103 for storing therein a control program, data, and the like, and a display unit 3 such as a CRT is connected thereto.

Each of the distributed type remote I/O units 2 comprises an MPU 111, a communication control section 112 having a transmission driver IC and a receiving driver IC, a memory 113 with a control program or the like stored therein, a switch 114 for determining an operating state of each distributed type remote I/O unit 2 discretely, an output I/F section 115 for a mechanical device (equipment to be controlled) not shown herein, and an input I/F section 116.

In the conventional type of distributed type remote I/O numerical control system as described above, the basic system of the NC unit 1 and the distributed type remote I/O units 2 are connected to each other in the form of serial communication system, and the distributed type remote I/O unit 2 is put under software control by the MPU 111 like the basic system of the NC unit 1, and different communication lines are provided for transmission and receiving for the basic system of the NC unit 1 and the distributed type remote I/O unit 2 respectively.

FIG. 32 shows another example of the conventional technology in which the distributed type remote I/O control system is applied to an NC unit. In this distributed type remote I/O numerical control system, the basic system of the NC unit 1 and the distributed type remote I/O unit 2 are connected with one signal line 123 in the form of serial communication system, and bidirectional data communication between the basic system of the NC unit 1 and each distributed type remote I/O unit 2 is executed through the one signal line 123.

This distributed type remote I/O numerical control system has substantially the same configuration as that of the distributed type remote I/O numerical control unit shown in FIG. 31 excluding the point that the signal line 123 is used for both data transmission from the basic system of the NC unit 1 to the distributed type remote I/O unit 2 and data transmission from the distributed type remote I/O unit 2 to the basic system of the NC control unit 1.

Description is made hereinafter for a software processing flow by the MPU 101 in the basic system of the NC unit 1 in the distributed type remote I/O numerical control system as described above with reference to FIG. 33. When operation of the system is started up, as the MPU 101 in the basic system of the NC unit 1 has not checked what type of distributed type remote I/O unit 2 is connected to the basic system of the NC unit 1, at first the MPU 101 generates a transmission frame for status request to each distributed type remote I/O unit 2 (step S1), and sends the status request frame to each distributed type remote I/O unit 2 (step S2).

As a response indicating reception of a status request frame by each distributed type remote I/O unit 2, the distributed type remote I/O unit 2 sends a frame (status data frame) including status data (step S3), and the basic system of the NC unit 1 receiving the frame stores the received status data therein. Then, a status request is repeated successively to other distributed type remote I/O units 2, and when the status data frames have been received from all the distributed type remote I/O units (step S4 affirmative), then connection state of each distributed type remote I/O unit 2 is analyzed from the status data, and a result of analysis is displayed on the display unit 3 in the basic system of the NC unit 1 (step S5).

Then the MPU 101 in the basic system of the NC unit 1 switches the operating mode to the on-line communication mode, generates on-line transmission frames each including data outputted by the distributed type remote I/O unit 2 (step 6), successively transmits the on-line transmission frame to the distributed type remote I/O units 2 (step S7), receives frames each including ordinary input data (on-line receiving frame) from the distributed type remote I/O units 2 (step 8), and executes each analysis of receiving state (whether receiving is complete or not, and whether any error is included in the received data or not) as well as of received data (step 39). Then, the operating sequence from step S6 to step S9 is repeated.

Next description is made for a software processing flow by the MPU 111 in the distributed type remote I/O unit 2 in the distributed type remote I/O numerical control system as described above.

Upon power turn ON, the MPU 111 in the distributed type remote I/O unit 2 executes a control program stored in the memory 113 to initialize operation of the communication control section 113 and read switch status data, recognizes how the unit 2 itself stands in a group of the distributed type I/O units 2 installed in the control system (step S21), and then enters the waiting state for receiving a transmission frame transmitted from the basic system of the NC control unit 1 to the distributed type remote I/O unit 2 (step S22). When the distributed type I/O units 2 receives a transmission frame transmitted thereto from the basic system of the NC unit 1 (step S22 affirmative), the MPU 111 determines whether the frame is in the off-line communication mode or the on-line communication mode from the header pattern (step S23).

In the off-line communication mode, namely if a status data request frame has been received, status data for the distributed type remote I/O unit is read to generate a transmission frame including status data for the unit, namely an off-line transmission frame (status data frame) (step S24), the transmission driver IC of the communication control section 112 is enabled according to an instruction from the MPU 111 (step S25), an off-line transmission frame is transmitted to the basic system of the NC unit 1 (step S26), and after transmission the transmission diver IC in the communication control section 112 is disabled (step S27). Then the operating state of the unit again returns to the receiving waiting (step S22).

In contrast, in the on-line communication mode, an on-line transmission frame incorporating therein input data fetched from the input I/F section 116 is generated (step S28), the transmission driver IC in the communication control section 112 is enabled according to an instruction from the MPU 111 (step S29), an off-line transmission frame is transmitted to the basic system of the NC unit 1 (step S30), and after transmission the transmission driver IC in the communication control section 112 is disabled (step S31).

Also determination is made as to whether the on-line transmission frame from the basic system of the NC unit 1 includes a CRC error or not (step S32), and if any CRC error is not included, an output signal is set to output the data included in the on-line transmission frame to the output I/F section 115 (step S33). When transmission is complete, the operating state returns again to the receiving waiting state (step S22), and then if a frame to the unit is received from the basic system of the NC unit 1, the above-described operating sequence is repeated.

In the conventional type of numerical control system as shown in FIG. 31, in spite of the fact that the communication system is of half duplex type, bidirectional communications between the basic system of the NC unit 1 and the distributed type remote I/O unit 2 is executed through two signal lines parallel to each other; the transmission signal line 121 dedicated to transmission from the basic system of the NC unit 1 to the distributed type remote I/O unit 2 and the transmission signal line 122 dedicated to transmission from the distributed type remote I/O unit 2 to the basic system of the NC unit 1, and for this reason there are many signal lines in the system, a large packaging space is required for connectors for connection of the signal lines in the basic system of the NC unit 1 as well as in the distributed type remote I/O unit 2, and also reliability against such troubles as breaking of wire or separation of connectors becomes disadvantageously low.

In contrast, in the conventional type of numerical control system as shown in FIG. 32, data communication is executed bidirectionally through one signal line 123 between the basic system of the NC unit 1 and the distributed type remote I/O unit 2, so that a number of signal lines is reduced and the reliability is higher as compared to that as shown in FIG. 31, but in either case of the numerical control system based on the conventional technology, a time required for analysis of received data included in a received frame, generation or transmission of a transmission frame varies case by case in the MPU 101 of the basic system of the NC unit 1 by executing a task other than data communication with the distributed type remote I/O unit 2, but as soon as a transmission frame is generated, transmission of the transmission frame is started between the basic system of the NC unit 1 and the distributed type remote I/O units 2, so that a cycle time for transmission and receiving to and from each of the distributed type remote I/O units 2 and also a cycle time for transmission and receiving of transmission frames for all the distributed type remote I/O units vary, which makes it impossible to execute cyclic communications within a prespecified period of time.

Also in the conventional type of control systems, in the distributed type remote I/O unit 2, a system function for cyclically executing transaction of data with the basic system of the NC unit 1 is realized with software control by the MPU 111 executing a control program, so that the hardware cost becomes expensive and also development of software for controlling the MPU 111 is required, thus also cost for software development being necessitated. For this reason, the distributed type remote I/O unit 2 becomes expensive.

Also the system function of the distributed type remote I/O unit 2 is realized with software control by the MPU 111, the communication data format becomes complicated, and if a plurality of equipment each having a different function are connected to the distributed type remote I/O unit 2 through one signal line (communication line), the MPU 111 must be added also to the distributed type remote I/O unit 2 for equipment treating only a small quantity of data, which is disadvantageous for cost performance.

Also in a system cyclically executing transaction of data between the basic system of the NC unit 1 and the distributed type remote I/O unit 2, when large data is transferred dividing the transmission time into several unit periods, if it is tried to read received data at a timing delayed from that as required by the transfer cycle, continuity of data can not be insured, which is disadvantageous.

Also in the conventional type of system, although the distributed type remote I/O unit 2 repeats input/output of data during normal operation, it is required for the MPU 111 to check for any error in a transmission frame from the basic system of the NC unit 1, output an operational instruction to an output control section, receive data inputted from an external device, and execute incorporation of the received transmission frame into a transmission frame, and for this reason work load to the MPU 111 is large, so that the MPU 111 is required to have a high performance and the cost becomes more expensive.

Also in the conventional system as described above, if any fault occurs, the basic system of the NC unit 1 transmits a transmission frame for resetting output from the distributed type remote I/O unit 2 to the distributed type remote I/O unit 2, but if an accidental error should occur, a transmission processing time required for resetting output becomes short, and the output resetting can not be executed, or output resetting can not be carried out due to such cable troubles as disconnection of cable connectors or breaking of signal line, and for this reason another resetting means is required.

SUMMARY OF THE INVENTION

It is an object of the present invention to provide a control method for a distributed type remote I/O control system enabling size reduction, improvement of the reliability, cost reduction, and improvement of the safety thereof.

In the control method for a distributed type remote I/O control system according to the present invention, bidirectional serial transmission between the basic system of the control unit and each of the distributed type remote I/O units is executed by means of time division, and the basic system of the control unit automatically starts communications in an off-line status communication mode different from the ordinary I/O mode, when operation of the system is started, to determine a type of the distributed type remote I/O unit and data set in the distributed type remote I/O unit. With this configuration, the system always operates in the off-line status communication mode whenever operation of the system is started, so that abnormal operation of the system can be prevented, and the basic system of the control unit can recognize a class of each distributed type remote I/O unit when in the on-line communication mode thereafter, then in the basic system of the control unit, an I/O control corresponding to the class of the distributed type remote I/O unit is possible.

In another control method for the distributed type remote I/O control system according to the present invention, in the off-line status communication mode, transmission frames are successively transmitted from the basic system of the control unit to each distributed type remote I/O unit, and each distributed type remote I/O unit corresponding to a transmission frame transmits a transmission frame including data concerning a type of the unit to the basic system of the control unit so that the basic system of the control unit can recognize a type of each distributed type remote I/O unit corresponding to the switch packaged in the distributed type remote I/O unit. And in the off-line status communication mode an output signal from a distributed type remote I/O unit is kept unchanged from that in a previous operation and is not updated to data newly transmitted from the basic system of the control unit. With this configuration, an operator of the basic system of the control unit can easily check connecting state of the distributed type remote I/O unit and a type of connected distributed type remote I/O unit thereto when the operation of the system is started. Also in the off-line status communication mode, data transmitted from the basic system of the control unit is not used in the distributed type remote I/O unit, and also even if an MPU transmits an output data by mistake when communication is started, the output data is not outputted from the distributed type remote I/O unit, so that a system with high reliability can be constructed.

In another control method for the distributed type remote I/O control system according to the present invention, switching between an on-line communication mode and an off-line status communication mode is executed according to a difference of a header pattern of a frame transmitted from the basic system of the control unit to a distributed type remote I/O unit, and a communication control section in the distributed type remote I/O unit detects the difference of a header pattern and selects ordinary input in the on-line communication mode or status input in the off-line status communication mode according to a mode switching signal based on the difference. With this configuration, circuit configuration each of the basic system of the control unit and the distributed type remote I/O unit can be simplified, and as far as output from the distributed type remote I/O unit is concerned, also in the off-line communication mode, output is possible even in the on-line communication mode.

In another control method for the distributed type remote I/O control system according to the present invention, the off-line status communication mode is automatically selected upon system power ON, and switching between the off-line status communication mode and the on-line communication mode is executed by an MPU of the basic system of the control unit by means of setting a mode select bit in the communication control section, the mode switching is executed by a synchronizing circuit by means of synchronizing to a first one of the plurality of the distributed type remote I/O units and on, a status bit indicating completion of reception of signals for status of all the distributed type remote I/O units is set after mode switching, and thus the MPU of the basic system of the control unit recognizes completion of reception of status signals. With this configuration, the off-line status communication mode is automatically selected after system power ON, and transmission frames each for status request is successively transmitted to the distributed type remote I/O units, so that software processing in the basic system of the control unit becomes easier. Also the operating mode is switched to transmission of transmission frames each for status request synchronizing to transmission for a first distributed type remote I/O unit, and for this reason there is no possibility for the basic system of the control unit to incorrectly mistake an ordinary input for a status.

In another control method for the distributed type remote I/O control system according to the present invention, data concerning a number of distributed type remote I/O units connected to the basic system of the control unit and a type of a distributed type remote I/O unit corresponding to each unit number is stored in a memory means in the basic system of the control unit, and if status data contained in a transmission frame transmitted from a distributed type remote I/O unit after start of system operation is different from the data stored in the memory means described above, an alarm is outputted. With this configuration, a distributed type remote I/O unit system with high reliability can be constructed.

In another control method for the distributed type remote I/O control system according to the present invention, the communication control section in the basic system of the control unit uses a received data memory means both in the off-line status communication mode and in the on-line communication mode. With this feature, configuration of the communication control section can be simplified.

n another control method for the distributed type remote I/O control system according to the present invention, start in a distributed type remote I/O unit of receiving transmission frames from the basic system of the control unit is monitored by a receiving start state monitoring means, and if start of receiving of a transmission frame from the basic system of the control unit can not be detected for a specified period of time, the distributed type remote I/O unit automatically resets its output. With this configuration, the basic system of the control unit enters an abnormal state, and a machine control signal can be reset when system operation is terminated, and for this reason a system with high reliability can be constructed.

Also as start of receiving is automatically detected, even if system operation is terminated during transmission, and if disadvantageous states such as cable off or a breaking of a cable should occur, an output from the distributed type remote I/O unit can surely be reset.

In another control method for the distributed type remote I/O control system according to the present invention, the communication control section in the basic system of the control unit writes transmitted data in the distributed type remote I/O unit with an MPU in the basic system of the control unit, and if transmitted data can not be read out from the distributed type remote I/O unit for a specified period of time, recognizes the state as a system fault, stops transmission to the distributed type remote I/O unit, and causes the distributed type remote I/O unit to reset its output. With this configuration, output from a distributed type of remote I/O unit can surely be reset by detecting that system software in the basic system of the control system does not run normally.

In another control method for the distributed type remote I/O control system according to the present invention, only when a header pattern contained in transmission frame from the basic system of the control unit is a pattern corresponding to a switch for setting a unit number of each distributed type remote I/O unit, the distributed type remote I/O units recognizes the transmission frame as that to the status itself, and, after receiving of the frame is completed, starts transmission of the transmission frame to the basic system of the control unit in after a lapse of a specified time counted by a hardware timer. With this configuration, a software sequence as that required in the conventional technology in which an MPU in a distributed type remote I/O unit checks completion of receiving of a frame from a basic system of the control system and then starts transmission to the basic system of the control unit becomes unnecessary.

In another control method for the distributed type remote I/O control system according to the present invention, the distributed type remote I/O unit executes frame transmission to the basic system of the control unit after it detects completion of reception of a frame transmitted from the basic system of the control unit to the distributed type remote I/O unit, and does not execute frame transmission to the basic system of the control unit if it does not detect completion of reception of a transmission frame. With this configuration, determination can be made therein as to whether a distributed type remote I/O unit is packaged or not.

In another control method for the distributed type remote I/O control system according to the present invention, the distributed type remote I/O unit provides error control over transmission/receiving of transmission frames when a frame is received from the basic system of the control unit, switches and transmits, when an error is detected, a header pattern of a transmission frame to the basic system of the control unit without updating an output signal from the distributed type remote I/O unit, detects the error from a header pattern of a transmission frame in the basic system of the control unit, and recognizes that an error has occurred in a frame transmission from the basic system of the control unit to the distributed type remote I/O unit. If the error is detected when a frame transmission from the basic system of the control unit is received, the distributed type remote I/O unit does not update an output signal therefrom, so that reliability to noise environment in a communication path is improved.

In another control method for the distributed type remote I/O control system according to the present invention, if times when a header pattern of a transmission frame from the distributed type remote I/O unit to indicate an error of a transmission frame from the basic system of the control unit exceeds a specified value, it is recognized that a system fault has occurred and operation of the system is stopped. With this configuration, reliability of the system is improved.

In another control method for the distributed type remote I/O control system according to the present invention, a data array in a transmission frame between the basic system of the control unit and the distributed type remote I/O unit is switched by reversing a sequence of a step of reading a transmission frame from the basic system of the control unit to the distributed type remote I/O unit and that from the distributed type remote I/O unit to the basic system of the control unit by each data unit from the transmitted data memory means and a step of writing the transmission frame into a received data memory means according to the data array in the MPU of the basic system of the control unit. With this configuration, response to various types of machine becomes easier.

n another control method for the distributed type remote I/O control system according to the present invention, a loop back mode, in which data transmitted from the basic system of the control unit to each distributed type remote I/O unit is outputted in the distributed type remote I/O unit and the same data as the outputted data is transmitted to the basic system of the control unit is given to a communication control section in the distributed type remote I/O unit, an instruction for the loop back mode is given according to a switch packaged in the distributed type remote I/O unit or a header pattern of a transmission frame transmitted from the basic system of the control unit, and a header pattern is changed by an MPU in the basic system of the control unit by means of setting a mode select bit for the communication control section. With this configuration, it can easily be recognized that output data transmitted from the basic system of the control transmitted and simultaneously also transmission from the distributed type remote I/O unit to the basic system of the control unit can normally be executed.

In another control method for the distributed type remote I/O control system according to the present invention, data read for data transmitted from the basic system of the control unit and data write for data to be transmitted to the basic system of the control unit are executed by the MPU. With this configuration, the system can be used for other applications, which makes a scope of applications of the system larger.

In another control method for the distributed type remote I/O control system according to the present invention, the distributed type remote I/O unit allows input/output of an analog voltage, and digital data for output of an analog voltage or input of an analog voltage once for every cycle is transacted between the basic system of the control unit and the distributed type remote I/O unit. With this configuration, a scope of application thereof as a system becomes larger.

In another control method for the distributed type remote I/O control system according to the present invention, an output section of each distributed type remote I/O unit is connected to an input section of another distributed type remote I/O unit, output data for the basic system of the control unit to output each distributed type remote I/O unit is set so that different data will be outputted to each distributed type remote I/O unit, and the basic system of the control unit checks that data inputted to each distributed type remote I/O unit coincides with an I/O connection state previously set in each distributed type remote I/O unit. With this configuration, a test on a system comprising the basic system of the control unit and a plurality of the distributed type remote I/O units can easily be carried out.

In another control method for the distributed type remote I/O control system according to the present invention, in the on-line communication mode, in correspondence to a type of a distributed type remote I/O unit identified by referring to data on a switch on the distributed type remote I/O unit, the basic system of the control unit cyclically transmits transmission data consisting of a header pattern including a unit number of the distributed type remote I/O unit, commands, and parameters, and only when a transmission frame contains a header pattern corresponding to a set switch for setting a unit number of each distributed type remote I/O unit, each distributed type remote I/O unit recognizes the transmission frame as that for the unit and processes command data and parameters in the transmitted data with hardware configuration. With this configuration, various types of I/O unit can be connected through a communication line.

In another control method for the distributed type remote I/O control system according to the present invention, the basic system of the control unit cyclically transmits a header pattern including a unit number of a display unit, a display command, and displayed data to the distributed type remote I/O unit, and the data is displayed on a display unit connected to the distributed type remote I/O unit. Therefore in a software processing in the basic system of the control unit, a control command and displayed data are only required to be written into the transmission buffer of the distributed type remote I/O unit in the basic system of the control unit like in a case where the display unit is directly connected to the data bus in MPU, without noticing the operation for transmitting displayed data by a series communication. The displayed data written to the transmission buffer is outputted to the distributed type remote I/O unit by a series communication according to hardware processing, and is set in the display unit as output data from the distributed type remote I/O unit. For this reason, software for the basic system of the control unit is not required to execute a particular processing for outputting data using the distributed type remote I/O unit.

In another control method for the distributed type remote I/O control system according to the present invention, a header pattern of the distributed type remote I/O unit and a command to maintain and read a pulse counter value are cyclically transmitted from the basic system of the control unit to a hardware circuit in a distributed type remote I/O unit having a pulse counter for counting a number of pulses in a pulse array outputted from the synchronizing encoder and manual pulse generator, and the pulse counter values for the synchronizing encoder and manual pulse generator are transmitted to the basic system of the control unit. With this configuration, data for the pulse counter is cyclically transmitted to the basic system of the control unit, and the software for the basic system of the control unit reads out data in the received buffer of the distributed type remote I/O unit in the basic system of the control unit, so that data cyclically updated can be read out like in a case where a pulse counter interface is directly connected to the data bus in MPU, without recognizing the operation for receiving data through series communication.

In another control method for the distributed type remote I/O control system, according to the present invention, transmission data comprising a command section including a header pattern as well as a sequence number section cyclically changing and a parameter section is transmitted from the basic system of the control unit to the distributed type remote I/O unit with an MPU, the distributed type remote I/O unit interprets a command section of received data and arrays data in the parameter section according to a sequence number. With this configuration, a series of data can be transmitted with high reliability from the basic system of the control unit to the distributed type remote I/O unit with an MPU.

n another control method for the distributed type remote I/O control system according to the present invention, the distributed type remote I/O unit with an MPU generates response data consisting of a command section and a parameter section as response data to the received command, the received command and sequence number are assigned to the command section so that the basic system of the control unit can recognize to which command the received data corresponds as a response, and data in the parameter section is arrayed according to the sequence number so that the distributed type remote I/O unit can execute data transfer sequentially to the basic system of the control unit. With this configuration, a series of data can be transmitted with high reliability from the distributed type remote I/O unit with an MPU to the basic system of the control unit.

Other objects and features of this invention will become understood from the following description with reference to the accompanying drawings.

BRIEF DESCRIPTION OF THE DRAWINGS

FIG. 26A is an explanatory view showing a data format for the distributed type remote I/O unit with an MPU in the distributed type remote I/O control system in which the control method according to the present invention is implemented;

FIG. 26B is an explanatory view showing a data format for the distributed type remote I/O unit with an MPU in the distributed type remote I/O control system in which the control method according to the present invention is implemented;

DESCRIPTION OF THE PREFERRED EMBODIMENTS

Detailed description is mad hereinafter for embodiments of the present invention with reference to the attached drawings. It should be noted that, in the embodiments of the present invention described below, the same reference numbers are assigned to the same portions as those in the conventional type of control systems described above, and that sometimes description thereof may be omitted herein.

Figure 1:
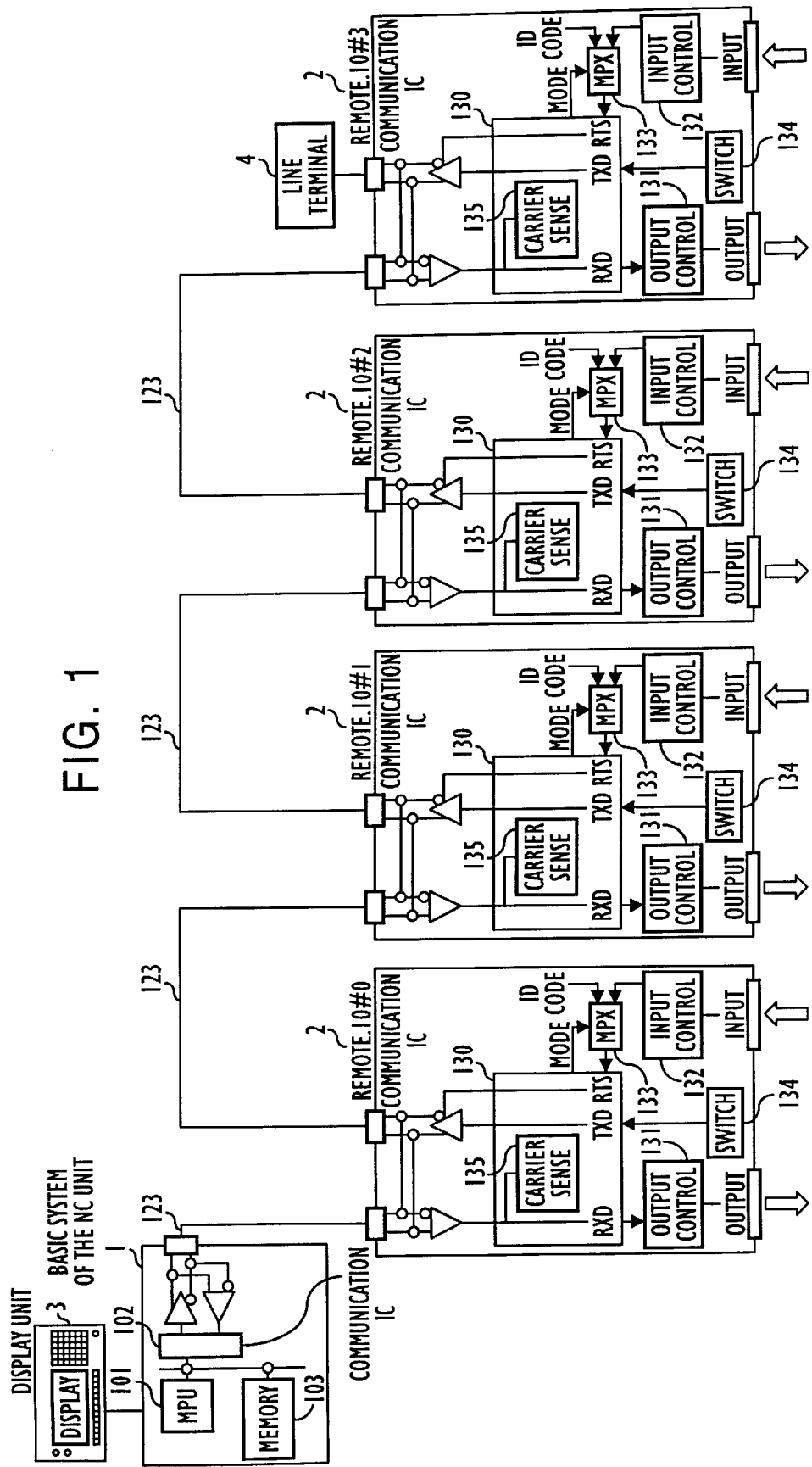
FIG. 1 is a block diagram showing an example of a distributed type remote I/O control system in which the control method according to the present invention is implemented.

FIG. 1 shows an example of a distributed type remote I/O control system in which the control method according to the present invention is implemented.

The distributed type remote I/O unit 2 comprises a communication control section 130, an output control section 131, an input control section 132, a multiplexer 133 for selecting an ordinary input of data from the input I/F section 132 in the on-line communication mode or an input of status data in the off-line communication mode (ID CODE) according to a communication mode select signal MODE from the communication control section 130, and a switch 134 for discretely setting a type of each distributed type remote I/O unit 134.

The status data includes data concerning a type of the distributed type remote I/O unit 2 and data for setting or the like, and also includes data indicating what type of I/O signal the distributed type remote I/O unit 2 treats (such as a digital signal, an analog signal, a voltage signal, a current signal, and AC/DC).

This distributed type remote I/O unit 2 does not include an MPU nor a software storage ROM for making an MPU operate.

The communication control section 130 has a carrier sensor 135 as a receiving start state monitoring means. The carrier sensor 135 is a logic section for detecting whether a transmission frame from the basic system of the NC unit 1 is in the receiving start state or not, and monitors whether a serial receiving signal RXD from the basic system of the NC unit 1 is present or not.

It should be noted that, in FIG. 1, TXD indicates a serial transmission signal from the distributed type remote I/O unit 2 and RTS is a transmission driver IC ON signal.

Figure 2:
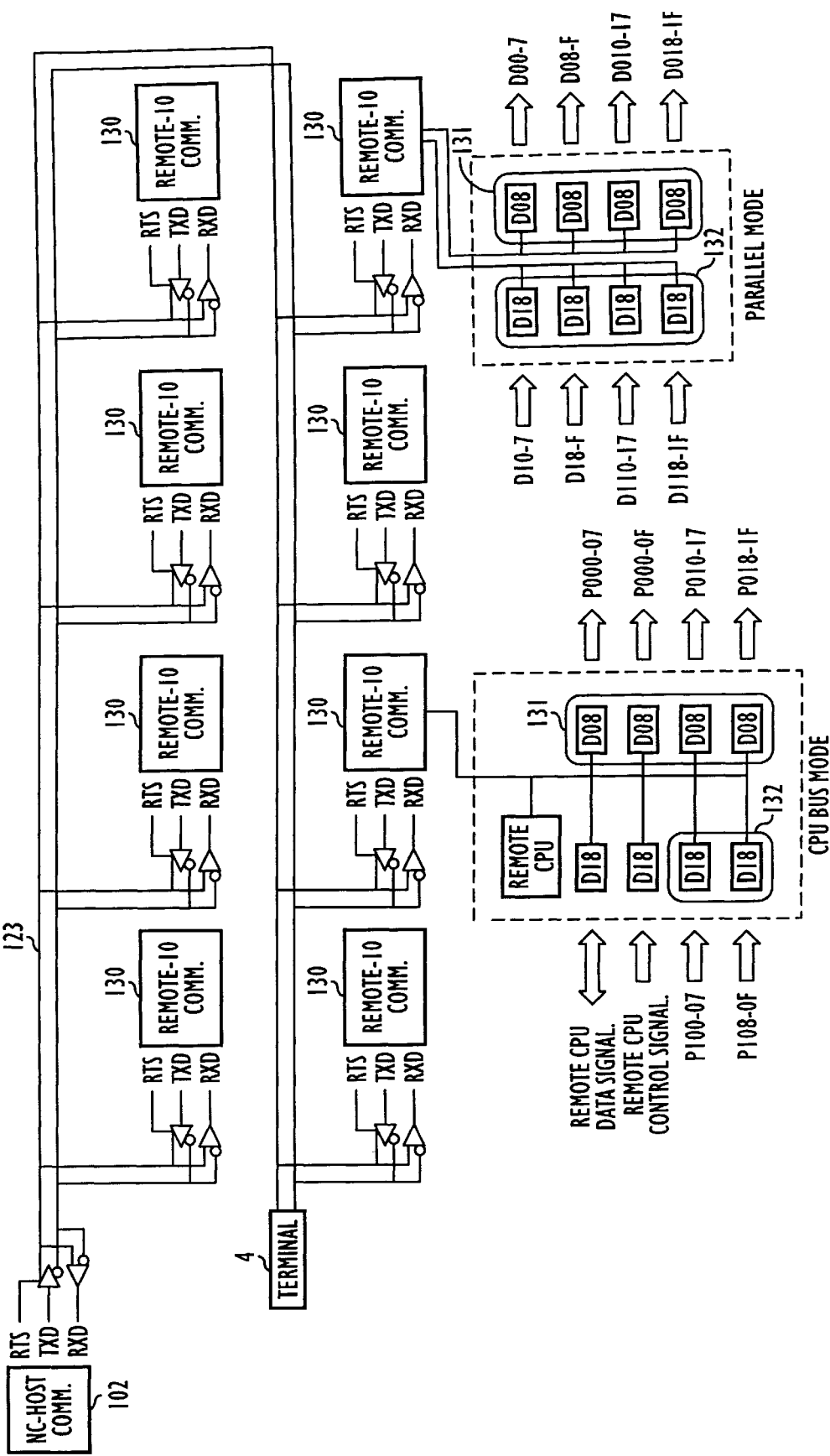
FIG. 2 is a systematic diagram showing a connection form of the distributed type remote I/O unit in the distributed type remote I/O control system in which the control method according to the present invention is implemented.

FIG. 2 shows a difference between a parallel mode in which only simple I/O control is executed and a CPU bus mode in which control is provided by a distributed type remote I/O unit having an MPU (a remote CPU) in the input control section in the distributed type remote I/O control system as described above. In the parallel mode, the communication control section (REMOTE-IO COMM.) 130 directly controls the 8-bit output port DO as well as the 8-bit input port DI. The CPU bus mode is described in detail later with reference to FIG. 8.

It should be noted that, in FIG. 2, DO 01 to 1F indicate output data and DI 0 to 1F indicate input data. Also PO 00 to 1F indicate data set in a register 535 shown in Fig below, and PI 00 to OF indicate parallel input signals equivalent to those indicated by PI 00 to 0F in Fig.

Signal names are differentiated as DO 0 to 1F and DI 0 to IF because treatment of each type of signal is different.

Figure 3:
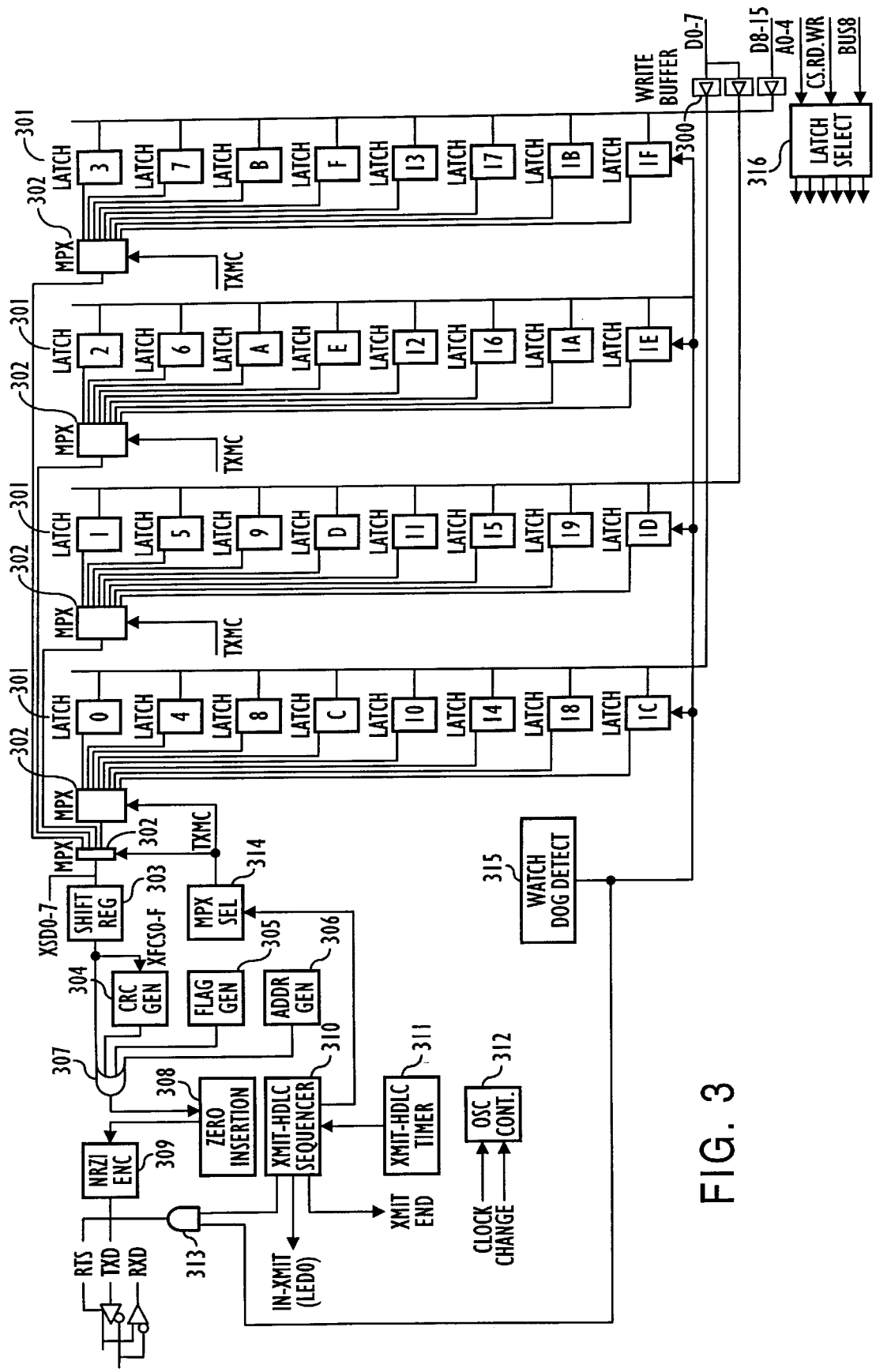
FIG. 3 is a block diagram showing an inner transmitting section of the communication control section of the basic system of the NC unit in the distributed type remote I/O control system in which the control method according to the present invention is implemented.

FIG. 3 shows hardware configuration of a transmission section of the communication control section 102 in the basic system of the NC unit used for implementation of the control method for the distributed type remote I/O control system according to the present invention.

This transmission section comprises a write buffer 300 for temporally storing therein data D0 to D15 to be transmitted from the MPU 101 to the distributed type remote I/O unit 2, a latch circuit (transmission data storage means) 301 for storing therein data D0 to D15 sent from the write buffer 300, a multiplexer 302 for selecting the latch circuit 301, a shift register 303 for shifting transmission data for the selected latch circuit 301 to serial data, a CRC generator 304 for generating CRC data to be added for detecting an error in an transmission frame, and a flag pattern generator 305 for generating a flag pattern to be added for indicating a header and an end of a transmission frame.

In addition, the transmission section comprises an address generator 306 for generating a header pattern for indicating to which distributed type remote I/O unit the transmission frame is to be transmitted, an OR gate 307 for getting a logical sum of discrete outputs from the shift register 303, CRC generator 304, flag pattern generator 305, and address generator 306, a zero insertion circuit 308 for inserting zero into transmission data for identifying transmission data from a flag pattern, and an NRZI modulating circuit 309 for subjecting a pattern of the transmission frame to NZRI modulation.

Furthermore the transmission section comprise a transmission HDLC sequencer 310 for generating a transmission frame at a specified timing, a transmission HDLC timer 311 for deciding a timing for start of transmission from the basic system of the NC unit 1 to the distributed type remote I/O unit 2 at a specified time interval, a clock signal control section 312 for controlling all clocks for the communication control section 102, an AND gate 313 for stopping transmission when a watch dog is detected in the communication control section 102, a multiplexer switching circuit 314 for switching the multiplexer 302 at a timing for transmission by the transmission HDLC sequencer 310, a watch dog detecting circuit 315 for turning OFF transmission output by detecting a period when the MPU 101 does not write transmission data to nor read received data from the communication control section 102, and a latch selector 316 for selecting a latch circuit 301 as a destination for writing data transmitted from the MPU 101.

The watch dog detecting circuit 315 is connected to both the AND gate 313 and latch circuit 301 in the figure, but the watch dog circuit 315 can perform its normal function even if it is connected to either one of them above. If the watch dog detecting circuit 315 is connected to the AND gate 313, when the watch dog detecting circuit 315 generates a transmission OFF instruction signal, the RTS signal is turned OFF, and the transmission signal TXD is immediately disconnected with high responsiveness. In contrast, if the watch dog detecting circuit 315 is connected to the latch circuit 301, the latch circuit 301 is reset according to the transmission OFF instruction signal from the watch dog detecting circuit 315, and reset data is transmitted. In this case, output from the distributed type remote I/O unit 2 can substantially be turned OFF without interrupting a transmission signal, and it becomes possible to differentiate the state from disconnection of the signal cable.

A timing for transmission in the basic system of the NC unit 1 is decided by the transmission HDLC timer 311, and a transmission cycle time is kept at a constant value.

It should be noted that, in FIG. 3, A 0–4, CS, RD, WR, and BUS8 each indicates an address signal from the MPU 101, CLOCK is a clock signal, CHANGE is a clock select signal for switching a transmitting/receiving baud rate, IN-XMIT is an output signal for LED indicating that the IN-XMIT is ready for transmission, XMIT END is a signal indicating that transmission of a transmission frame to be outputted to the MPU 101 is over, XSD 0–7 are monitor signals each for transmission data for the distributed type remote I/O unit 2, XFCS 0–7 are CRC data signals, and TXMC is a multiplexer select signal for selecting data to be transmitted.

Figures 4A, 4B:
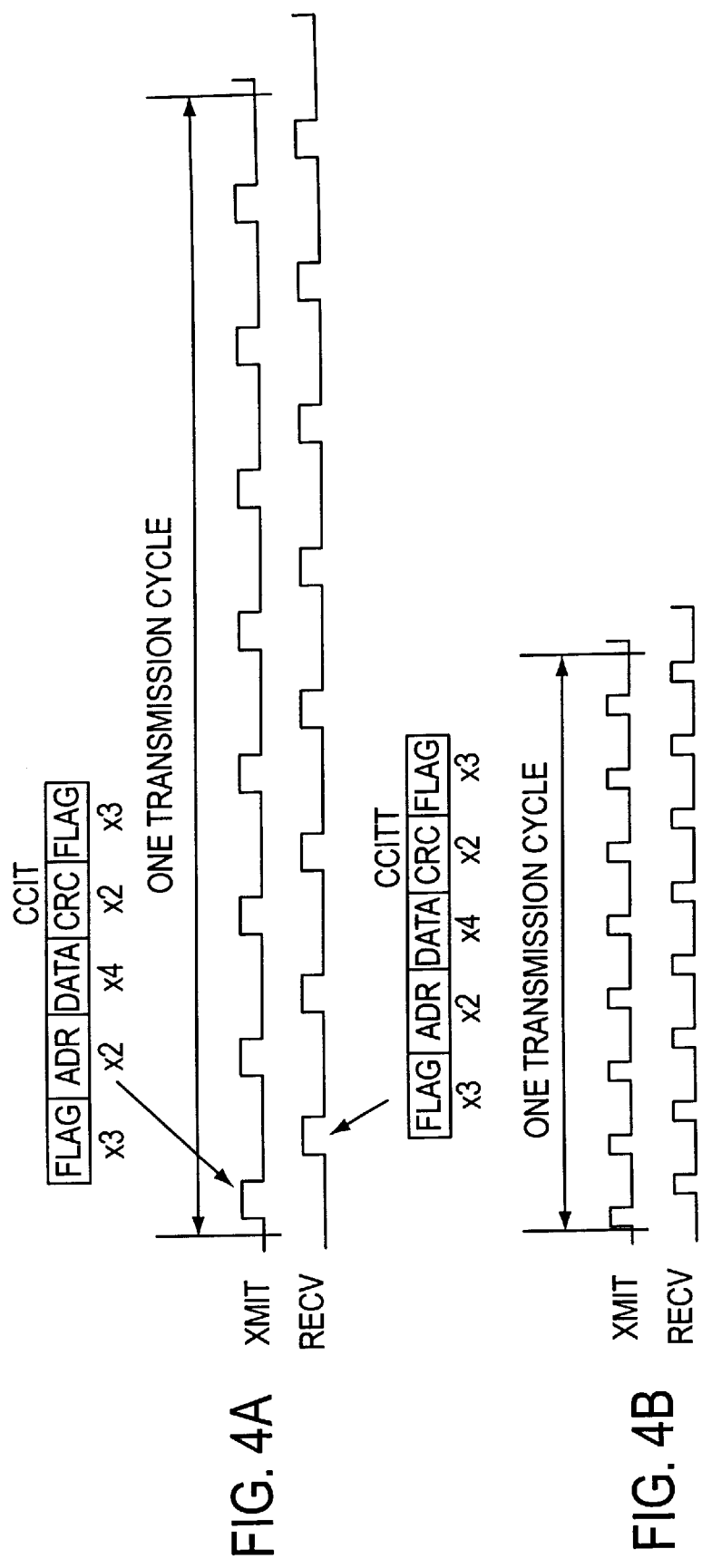
FIG. 4A is a time chart showing a transmitting/receiving timing of the basic system of the NC unit in the distributed type remote I/O control system in which the control method according to the present invention is implemented.
FIG. 4B is a time chart showing a transmitting/receiving timing of the basic system of the NC unit in the distributed type remote I/O control system in which the control method according to the present invention is implemented.

FIG. 4A shows a timing for transmitting and receiving signals when the basic system of the NC unit 1 is in the low speed mode, while FIG. 4B shows a timing for transmitting and receiving signals in the high speed mode. It should be noted that, in FIGS. 4A and 4B, XMIT and RECV indicates a timing for transmission and that for receiving respectively.

In case of the timing for transmission shown in FIGS. 4A and 4B, the transmission HDLC timer 311 generates a transmission start signal XMIT 8 times for one transmission cycle. When the transmission HDLC timer 311 generates the transmission start signal XMIT, the transmission HDLC sequencer 310 receives the transmission start signal XMIT and selects the latch circuit 301 for storing therein transmission data, and outputs a select signal to the multiplexer select circuit 314. The multiplexer select circuit 314 causes the multiplexer 302 to execute an operation for selection, and selects and sets the latch circuit 301 to which the data is to be transmitted.

Concretely, at first, for a first transmission start signal XMIT in one transmission cycle, the four latch circuits 301 having any of numbers from 0 to 3 are selected, and for the next transmission start signal XMIT, the four latch circuits 301 having any of numbers from 4 to 7 are selected. Thus the latch circuits 301 are selected sequentially for each transmission start signal XMIT with the four latch circuits 301 having numbers from 1C to 1F selected for a last transmission start signal XMIT in one transmission cycle and all the latch circuits 301 selected within one transmission cycle, thus data for all the latch circuits 301 being transmitted.

Figure 5:
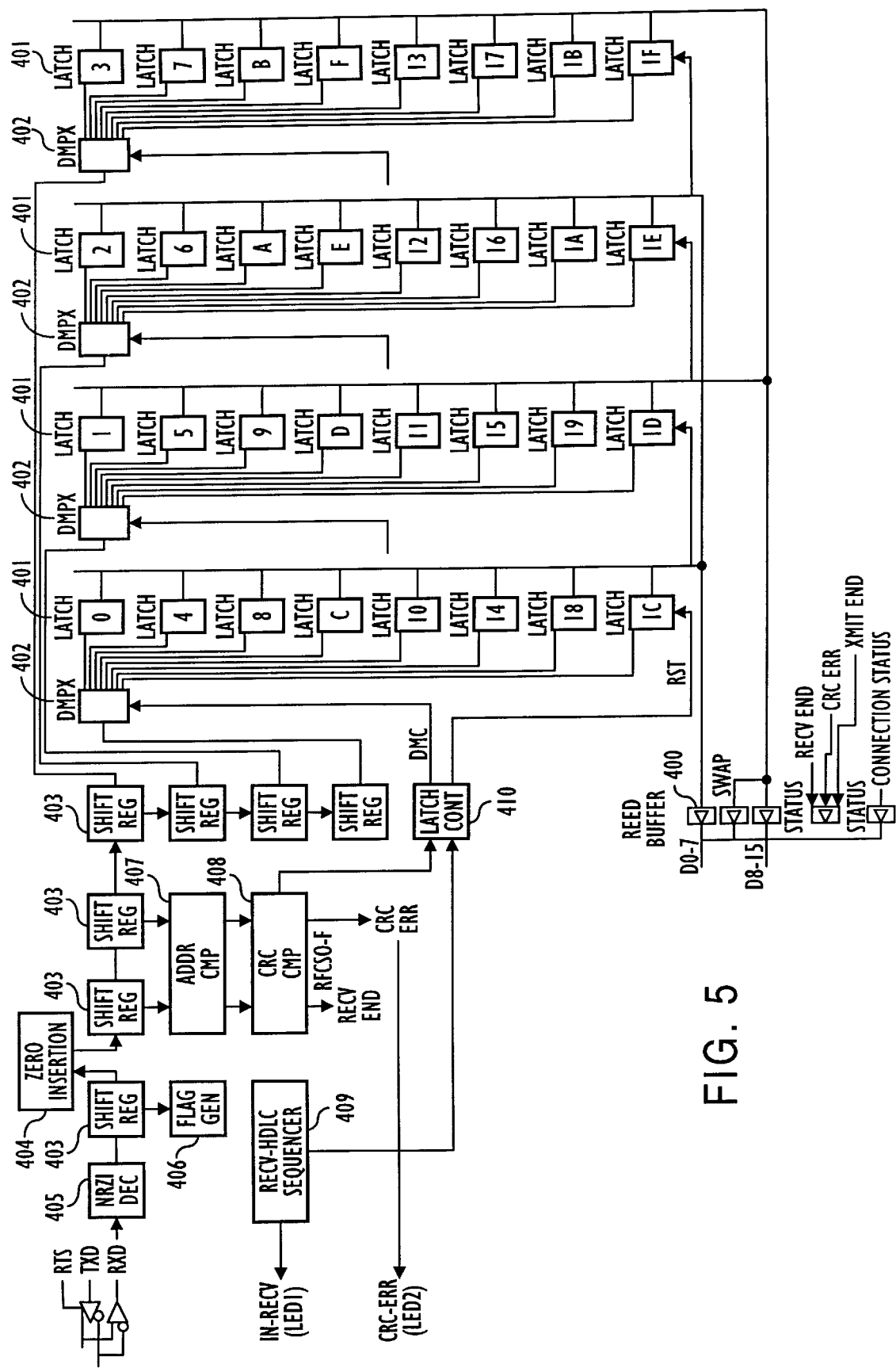
FIG. 5 is a block diagram showing an inner receiving section of the communication control section of the basic system of the NC unit in the distributed type remote I/O control system in which the control method according to the present invention is implemented.

FIG. 5 shows hardware configuration of a receiving section of the communication control section 102 in the basic system of the NC unit 1 used for implementation of the control method for the distributed type remote I/O control system according to the present invention.

This receiving section comprises a read buffer 400 for temporally storing therein received data D0 to D15, and various types of status data (XMIT END, RECVEND, CRC ERR, CONNECTION STATUS), a latch circuit (received data storage means) 401 for storing therein data D0 to D15 received from the read buffer 400, a demultiplexer 402 for switching and selecting the latch circuit 401 according to a signal received from each distributed type remote I/O unit 2, a shift register 403 for shifting serial data for a receiving frame, a zero deletion circuit 404 for deleting zero from a received bit array having been subjected to zero insertion, and a ZRZI demodulation circuit 405 for demodulating a receiving frame from subjected to NRZI modulation.

In addition, the receiving section comprises a flag pattern comparator 406 for detecting start and end of a receiving frame, an address pattern comparator 407 for determining whether a header pattern of a receiving frame is normal or not, a CRC comparator 408 for determining whether any error is included in a receiving frame or not, a receiving HDLC sequencer 409 for controlling a timing for receiving signals, and a receiving latch control section 410 for writing data into the latch circuit 401 for storing therein received data only when a result of determination by the CRC comparator 408 indicates that no error is included in the receiving frame according to a timing when receiving of a signal from the receiving HDLC sequence 409 is complete.

It should be noted that, in FIG. 5, IN-RECV is an output signal for LED indicating that the receiving section is currently ready for receiving, CRC-ERR is a receiving error detection signal, RECV END is a receiving complete signal, CRC ERR is a status signal indicating that receiving is terminated with a CRC error, SWA is a data signal with data output switched according to a data bit number of the MPU 101, CONNECTION STATUS is a status signal indicating whether the distributed type remote I/O unit 2 has been connected or not, RFCS 0 to 7 are signals each indicating a result of comparison by the CRC comparator 408, DMC is a select signal for the demultiplexer 402, and RST is a latch strobe signal for the latch circuit 401.

Herein the receiving latch control circuit 410 selects the demultiplexer 402 according to the demultiplexer select signal DMC in the order of receiving, and gives a latch strobe signal to the selected latch circuit 401 for latching.

Detailed operation of the communication control section 102 of the basic system of the NC unit 1 are the same as that supporting the general HDLC protocol, so that description thereof is omitted herein, but in the control method according to the present invention, if the watch dog detecting circuit 315 detects the state where the communication control section 102 is not accessed for a specified period of time, the latch circuit 301 for transmission data is reset, the transmission data in the default state is transmitted to the distributed type remote I/O units, and transmission of a gate signal to the transmission driver is interrupted by the AND gate 313. The distributed type remote I/O unit 2 resets output by detecting that there is no receiving frame.

In this system, communication between the basic system of the NC unit 1 and the distributed type remote I/O units 2 is executed through one communication line functioning as both a transmission line from the basic system of the NC unit 1 to the distributed type remote I/O unit 2 and a transmission line from the remote I/O unit 2 to the basic system of the NC unit 1, so that there is no need for using a new signal line as a means for turning OFF output from the distributed type remote I/O unit 2 against faults such as cable off, breaking of a cable, or any trouble in the MPU 101 in the basic system of the NC unit 1.

In the basic system of the NC unit 1, data write for data to be transmitted to the distributed type remote I/O unit 2 and data read for received data are executed cyclically, so that the specified period of time set by the watch dog circuit 315 should be set to a value which is 2 times or more larger than a value of the cycle. Also the specified period of time is set according a state of use of the distributed type remote I/O unit 2 such as, for instance, whether control characteristics of a machine tool as an object for data I/O is required or not, and is generally set to within several hundreds milli-seconds.

A timing of transmission from the basic system of the NC unit 1 does not depend on operation of the MPU 101 and is set by the transmission HDLC timer 311, so that the transmission cycle time is kept at a constant value.

Figure 6:
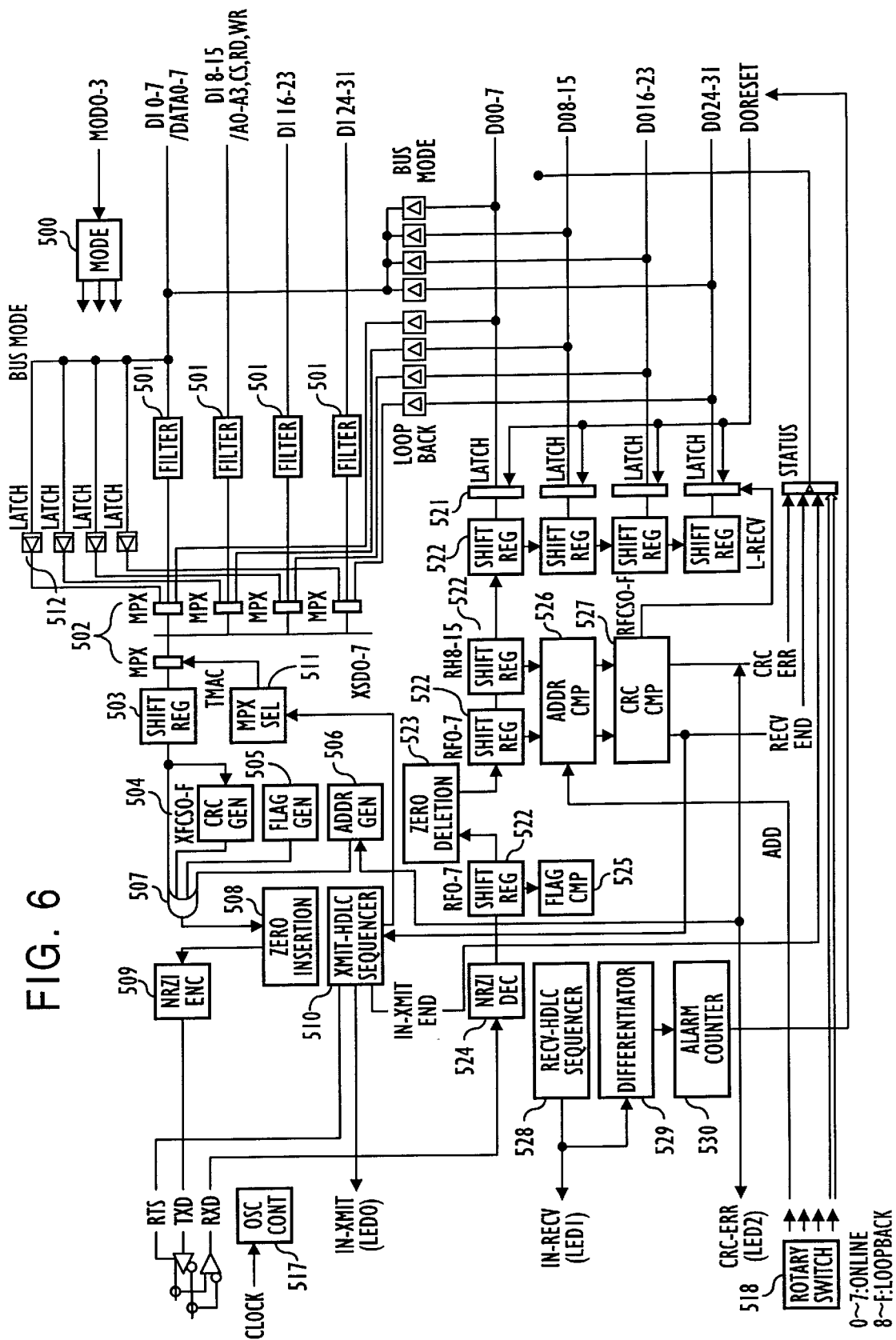
FIG. 6 is a block diagram showing an inner communication control section of the distributed type remote I/O unit in the distributed type remote I/O control system in which the control method according to the present invention is implemented.

FIG. 6 shows hardware configuration of the communication control section 130 in the distributed type remote I/O unit 2 used for implementation of the control method for the distributed type remote I/O control system according to the present invention.

The communication control section 130 comprises a mode setting decoder 500 for selectively setting any of the ordinary I/O mode, bus operation mode, and loop-back mode, a filter circuit 501 to which input data DI 0 to 31 is given, a multiplexer 502 for selecting the filter circuit 501, a shift register 503 for shifting input data (transmission data) for the selected filter circuit 501 to serial ones, a CRC generator 504 for generating CRC data to be added for detection of an error in a transmission frame, a flag pattern generator 505 for generating a flag pattern to be added to indicate a header and an end of a transmission frame, and an address generator 506 for generating a header pattern indicating a destination of transmission.

The communication control section 130 comprises, in addition, an OR gate 507 for obtaining a logical sum of discrete outputs from the shift register 503, CRC generator 504, flag pattern generator 505, and address generator 506, a zero-insertion circuit 508 for inserting zero to transmission data for identifying transmission data from a flag pattern, an NRZI modulation circuit 509 for subjecting a pattern of a transmission frame to NRZI modulation, a transmission HDLC sequencer 510 for generating a transmission frame at an appropriate timing, a multiplexer select circuit 511 for selecting transmission data to select the multiplexer 502 at a timing for transmission from the transmission HDLC sequencer 510, and a latch circuit 521 for storing output data DO 0 to DO 31.

The transmission HDLC sequencer 510 includes a hardware timer started by a RECV END signal outputted from a CRC comparator 527 described later, and sets a timing for starting transmission of a transmission frame according to a time counted by the hardware timer.

The communication control section 130 comprises, in addition, a shift register 522 for shifting serial data for a receiving frame, a zero deletion circuit 523 for deleting zero in a received bit array with zero inserted therein, an NRZI demodulation circuit 524 for demodulating a receiving frame subjected to NRZI modulation, a flag pattern comparator 525 for detecting start and end of a receiving frame, an address pattern comparator 526 for determining whether a header pattern of a receiving frame is normal or not, a CRC comparator 527 for determining whether any error is included in a receiving frame or not, a receiving HDLC sequencer 528 for implementing timing control for receiving, a differentiator 529 for outputting a differential signal when receiving of another signal is started during receiving, an alarm counter 530 for detecting the fact that a differential signal can not be detected for a specified period of time or more, a clock signal control circuit 517, and a rotary switch 518 for setting a unit number signal ADD for a distributed type remote I/O unit and switching between the loop-back mode and ordinary I/O mode.

The filter circuit 501 has a function to obtain a signal not containing noise element by filtering an input signal containing noise element inputted into the distributed type remote I/O unit 2.

It should be noted that, in FIG. 6, MOD 0 to 3 are mode select signals each given to the mode setting section 500 to select any of the ordinary I/O mode, bus operation mode, and loop-back mode, RECV END is a receiving complete signal, CRC ERR is a CRC error signal indicating that a CRC error is contained in a receiving frame from the basic system of the NC unit 1, L-RECV is a received data latch signal, and DO RESET is an alarm signal outputted from the alarm counter 530, and the latch circuit 521 for output in the distributed type remote I/O unit 2 is reset according to this alarm signal.

When an MPU is added, output data DI 0 to 7 and DI 8 to 15 are used as signals for DATA 0 to 7, A0 to A3, CS, RD, and WR.

Figure 7:
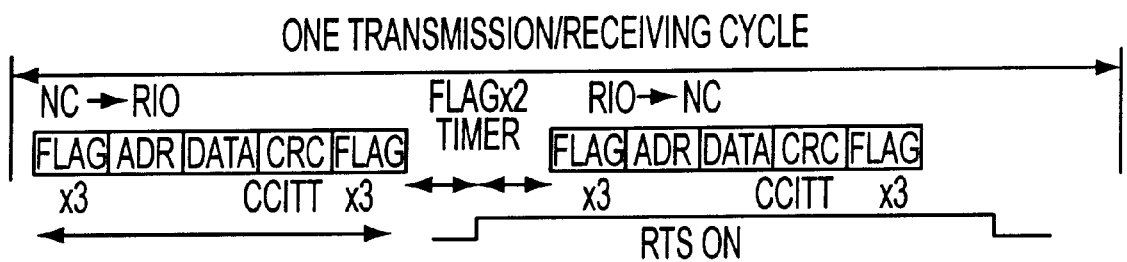
FIG. 7 is a time chart showing a transmitting/receiving cycle of the distributed type remote I/O unit in the distributed type remote I/O control system in which the control method according to the present invention is implemented.

FIG. 7 shows a transmission/receiving cycle in the distributed type remote I/O unit 2.

Figure 8:
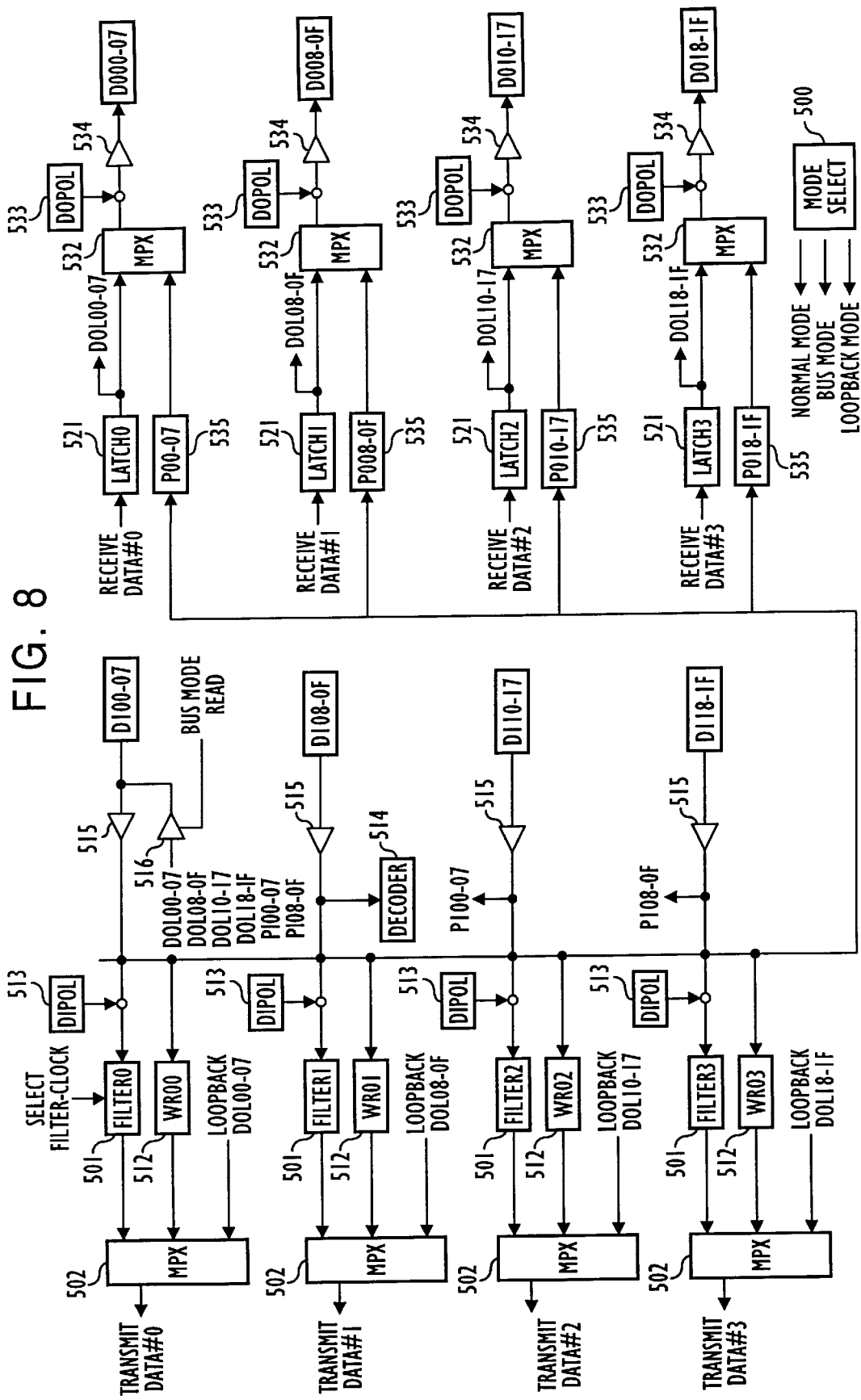
FIG. 8 is a block diagram showing an inner I/O section of the communication control section of the distributed type remote I/O unit in the distributed type remote I/O control system in which the control method according to the present invention is implemented.

FIG. 8 shows an I/O section in the distributed type remote I/O unit 2 used for implementation of a control method for the distributed type remote I/O control system according to the present invention. The I/O section comprises a register 512 (Refer to FIG. 6) for an MPU in the distributed type remote I/O unit 2 to write therein data to be transmitted to the basic system of the NC unit 1 when an MPU is added to the distributed type remote I/O unit 2, a polarity convertor 513 for converting a polarity of an input signal inputted into the communication control section 130, a decoder 514 in a case where an MPU is connected for use to the distributed type remote I/O unit 2, an input buffer 515 for input signals to the communication control section 130, an output buffer 516 for reading received data or the like from the basic system of the NC unit 1 in a case where an MPU is connected to the distributed type remote I/O unit 2, a multiplexer 532 for selecting an output signal from the distributed type remote I/O unit 2 according to mode setting in the communication control section 130, a polarity convertor 533 for switching a polarity of an output signal, an output buffer 534 for output signals, and a register 535 for an MPU added to the distributed type remote I/O unit 2 to write therein output data in a case where an MPU is added to the distributed type remote I/O unit 2.

The polarity convertors 513, 533 each have a function to change a polarity of a signal according to a type of object equipment for signal input and signal output to and from the distributed type remote I/O unit 2, and the function is set according to external signal input by the communication control section 130.

It should be noted that, in Fig, LOOP-BACK, DOL 00 to 1F each are a transmission data signal to be directly transmitted to the basic system of the NC unit 1 in a loop-up test, RECEIVE DATA #0 to #3 are output data signals from the shift register 522 shown in FIG. 6, TRANSMIT DATA #0 to #3 are transmission data signals to the basic system of the NC unit 1 equivalent to XSD 0 to 7 signals in FIG. 6, BUS MODE READ is a bus mode read signal which is turned ON when the MPU in the distributed type remote I/O unit 2 is reading data with the decoder 514 in the bus operation mode, and FILTER-CLOCK is a filter constant select signal for the filter 501.

In the distributed type remote I/O unit 2, according to an external mode input signal (mode select signal) MOD 0 to 3 inputted to the mode setting recorder 500, any one of the ordinary I/O mode no not requiring addition of an MPU, a bus operation mode requiring addition of an MPU, and a loop-back mode in which transmission data from the basic system of the NC unit 1 is returned and transmitted during a test from the distributed type remote I/O unit 2 is selected and set as an operating mode.

In the ordinary I/O mode, data transmitted from the basic system of the NC unit 1 and stored in the latch circuit 521 is selected by the multiplexer 532, the data is used as data signals (DO 00 to 07, DO 08 to 0F, DO 10 to 17, DO 18 to 1F) via the polarity convertor 533, and input signals (DI 00 to 07, DI 08-0F, DI 10–17, and DI 18-1F) pass via the polarity convertor 513 to the filter circuit 501, selected by the multiplexer 502 and transmitted to the basic system of the NC unit 1.

In the bus operation mode, data transmitted from the basic system of the NC unit 1 and stored in the latch circuit 521 is read via the output buffer 516 as DOL 00 to 1F to an MPU added outside the communication control section 130, and the MPU converts the read data according to the necessity and writes the converted data through the input buffer 515 into the writes register 535. In the multiplexer 532, the data bus from the write register 535 is selected, and transmission data DOL 00 to 1F are outputted as output signals DO 00 to DO 1F.

Data transmission to the basic system of the NC unit 1 is executed by the MPU by means of writing the data via the input buffer 515 into the write register 512 for transmission to make the multiplexer 502 select data bus from the register 512.

In the bus operation mode, input data DI 08 to 0F are used as control input to the decoder 514 in the communication control section, and the MPU can read the signal state of DI 01 to 1F as PI 00 to 0F signals via the output buffer 516.

As described above, in the bus operation mode, the communication control section 130 does not sort input data from output data, but once the MPU reads from and analyzes received data from the basic system of the NC unit 1, and sets output data in output port.

In this case, a signal flows from (RECEIVE DATA #0 to #3) to latch circuit 521, (DOL 00 to 1F), and data is read from the buffer 516, then the MPU analyzes and writes the data through the input buffer 515 into the register 535 (PO 00 to 1F), and then outputs the data to DO 00 to 1F.

As input data, only DI 10 to 1F are available, DI 00 to 07 are used as data signals for a remote CPU, and DI 08 to 0F are used as control signal input from the remote CPU, so that, when an MPU is added thereto, DI 00 to 0F becomes unavailable. Signals flow in the order of DI 10 to 1F to (PI 00 to 0F) to the output buffer 516, where data is read out, the MPU analyzes data and writes data through the input buffer 515 into the register 512 (WR 00 to 03), and then the MPU converts the signals through the multiplexer 502 to (TRNSMIT DATA #0 to #3), and transmits the converted data to the basic system of the NC unit 1.

When an MPU is added to the distributed type remote I/O unit 2 to implement this bus operation mode, the distributed type remote I/O unit 2 becomes available for other applications such as input/output of operation panel signals for I/O unit in the basic system of the control unit or for the basic system of the control unit itself, a paper tape reader, a paper tape puncher, or the like, which means expansion of a scope of applications. Even if an MPU is added to the distributed type remote I/O unit 2, communication between the basis system of the NC unit 1 and the distributed type remote I/O unit 2 is automatically executed, not depending on the MPU, so that the software processing by the MPU does not become complicated.

In the loop-back mode, transmission data (DOL 00 to 1F) from the basic system of the NC unit 1 stored in the latch circuit 521 is selected by the multiplexer 502 and is transmitted to the basic system of the NC unit.

In the loop back mode, for checking that the data normally transmitted by the basic system of the NC unit 1 coincides with the received data, it is necessary to once store the data in the latch circuit 521 and then generate the data (LOOPBACK DOL 00 to 1F) to be transmitted in the loop-back mode in a transmission frame, but data receiving from the basic system of the NC unit 1 and transmission from a distributed type remote I/O unit 25 are executed by means of time division, so that no problem occurs.

It can easily be understood that, because of this loop-back mode, output data transmitted from the basic system of the NC unit 1 to the distributed type remote I/O unit 2 is normally transmitted and also transmission from the distributed type remote I/O unit 2 to the basic system of the NC unit 1 can be executed normally.

Figure 9:
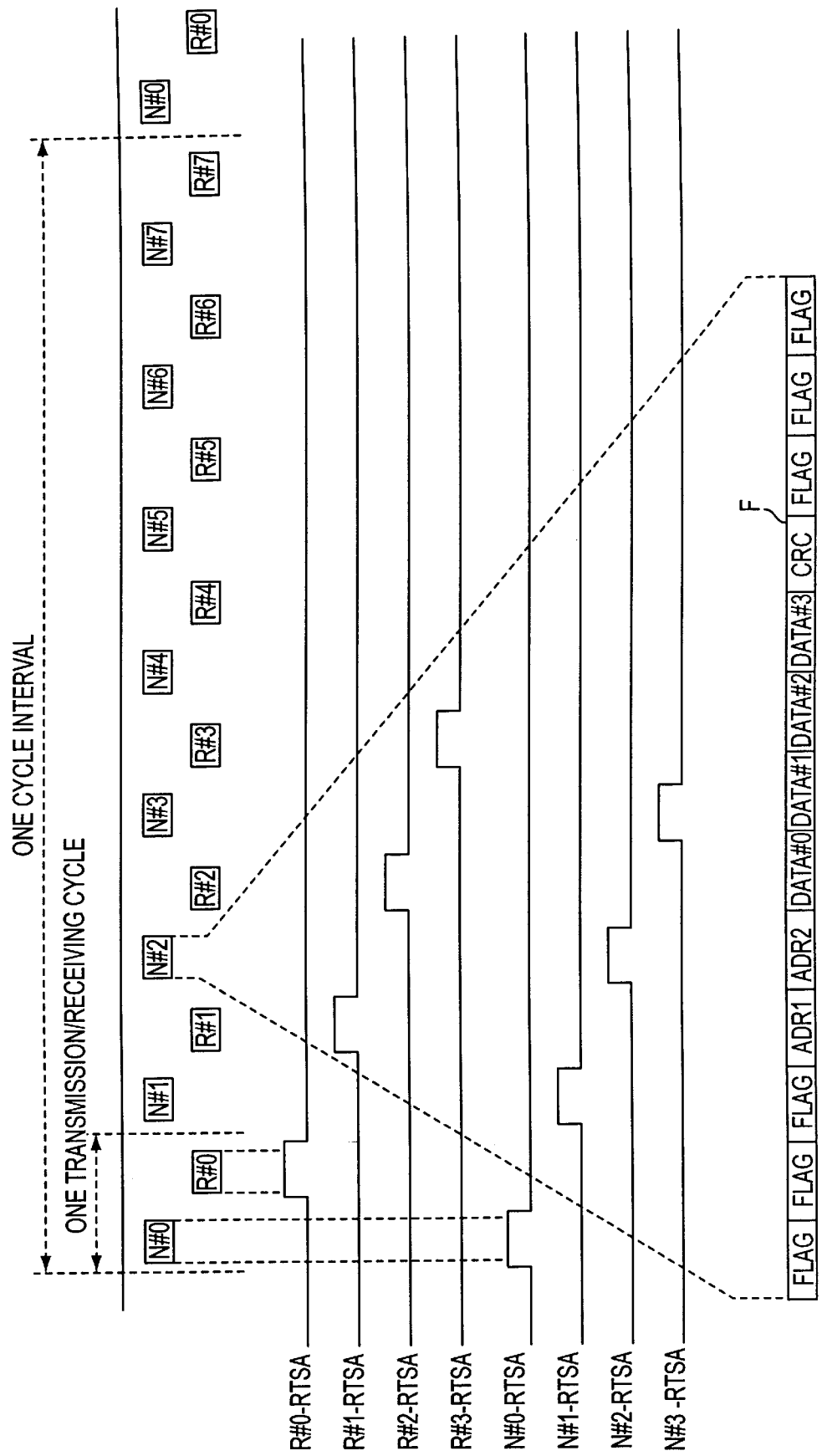
FIG. 9 is a time chart showing transferring timing for transferring a communication frame between the basic system of the NC unit and a plurality of the distributed type remote I/O units in the distributed type remote I/O control system in which the control method according to the present invention is implemented.

FIG. 9 is a timing chart showing a flow of data transacted between the basic system of the NC unit 1 and the distributed type remote I/O unit 2 according to the control method according to the present invention. In FIG. 9, N#0 to N#7 each indicate a timing for transmission of a transmission frame from the basic system of the NC unit 1 to the distributed type remote I/O unit 2; R#0 to R#7 each indicate a timing for transmission of a transmission frame from the distributed type remote I/O unit 2 to the basic system of the NC unit 1; N#0, RTSA to N#3, and RTSA each indicate a timing for transmitting a driver IC enable signal RTSA when transmitting a signal from the basic system of the NC unit 1 to each of the distributed type remote I/O unit (from the first to fourth units); and R#0, RTSA to R#3, RTSA each indicate a timing for transmitting a driver IC enable signal RTSA when the distributed type remote I/O unit 2 transmits a signal from the basic system of the NC unit 1 in response to the transmission frames N#0 to N#3.

A frame format of each frame F from N#0 to N#7, and R#0 to R#7 includes FLAG, ADR1, ADR2, DATA #0 to DATA #3, CRC, and FLAG. The FLAG is a pattern indicating a border of a frame; ADR1, ADR2 are header patterns; DATA#0 to DATA #3 each indicate a data area including data transmitted by the basic system of the NC unit 1 and the distributed type remote I/O unit 2; and CRC is a check code added to detect an error in a frame.

ADR1, ADR2 are used to identify each distributed type remote I/O unit required in the present invention, to recognize the on-line communication mode or off-line status communication mode, to specify the loop-back mode from the basic system of the NC unit 1, and to check for any CRC error in transmission from the basic system of the NC unit 1 to each distributed type remote I/O unit 2.

Input data or output data is given to DATA #0 to DATA #3 in the on-line communication mode, and ID status is given to them in the off-line status communication mode.

Figure 10:
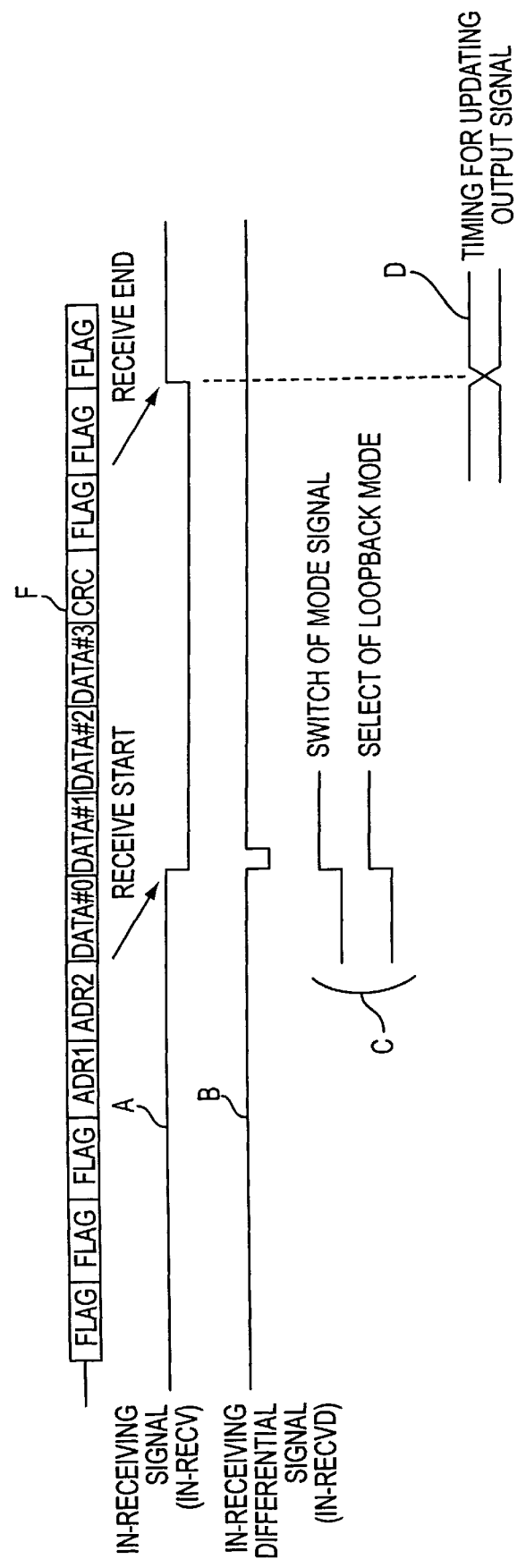
FIG. 10 is a time chart showing operations of the communication control section in the distributed type remote I/O unit in the distributed type remote I/O control system in which the control method according to the present invention is implemented.

FIG. 10 shows operations of the communication control section in the side of a distributed type remote I/O unit. In FIG. 10, A indicates an in-receiving signal (IN-REVE) when a header pattern in a receiving frame F is recognized as a frame to the unit; B indicates an in-receiving differential signal (IN-REVED) for detecting start of the in-receiving signal A; C indicates a mode recognition signal to execute mode switching in the communication control section by checking which of the on-line communication mode, off-line status communication mode, and loop-back mode a header pattern in a receiving frame indicates; and D indicates a timing for updating an output signal from the communication control section when receiving is executed without a CRC error being detected in the on-line communication mode.

Figure 11:
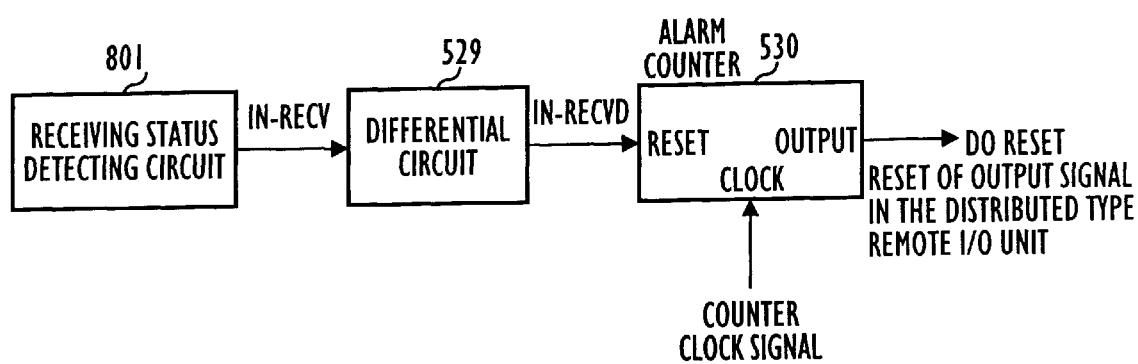
FIG. 11 is a block diagram showing an alarm signal generating circuit in the distributed type remote I/O control system in which the control method according to the present invention is implemented.

FIG. 11 is a circuit block diagram showing a software mechanism of detecting that receiving from the basic system of the NC unit 1 is terminated due to an operation of the watch dog detecting circuit 315 to stop transmission output and generating an alarm signal for resetting an output signal. This circuit is realized by internal configuration of the receiving HDLC sequencer 528 (Refer to FIG. 6) and comprises a receiving status detecting circuit 801 generating a in-receiving signal A, a differential circuit 529 (differentiator) for receiving an in-receiving signal A and generating an in-receiving differential signal B (Refer to FIG. 6), and an alarm counter 530 counting up when a counter clock signal is given and reset according to an in-receiving differential signal B (Refer to FIG. 6), in which, when a count value of the alarm counter 530 overflows, an alarm signal DO RESET is outputted and an output signal storage register in the distributed type remote I/O unit 2 is reset thereby.

With this configuration, the receiving status detecting circuit 801 in the receiving HDLC sequencer 528 functions as the carrier sensor 135 shown in FIG. 1.

For this reason, if the distributed type remote I/O unit 2 does not detect a receiving start status conditions for a period of time specified according to a count value by the alarm counter 530, the distributed type remote I/O unit 2 resets the output.

With this configuration, if the basic system of the NC unit 1 stops its system operation for some reason or other, transmission output from the basic system of the NC unit 1 is stopped according to an instruction from the watch dog circuit 315, and the distributed type remote I/O unit detects that a receiving start status of a transmission frame from the basic system of the NC unit 1 does not occur for the specified period of time and resets output, so that a mechanical control signal can be reset when the basic system of the NC unit 1 enters an abnormal state and the system operation is stopped, which insures construction of a system with high reliability. In this case, also when it is detected that a system program in the basic system of the NC unit 1 does not work normally, output from the distributed type remote I/O unit 2 is reset, which also assures higher system reliability.

Also a receiving start system can be detected, when the system operation is stopped during transmission from the basic system of the NC unit 1, or even if such a trouble as cable separation or breaking of wire occurs, output from the distributed type remote I/O unit 2 is reset and a system with high reliability can be constructed.

Figure 12A:
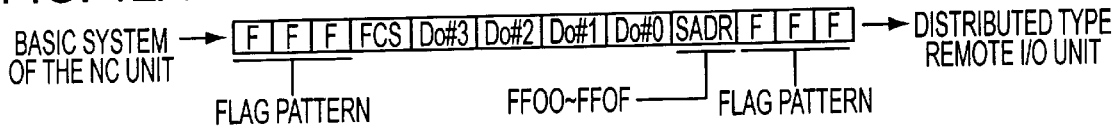
FIGS. 12A to 12F are explanatory views each showing a transmitting/receiving frame in each operation mode in the distributed type remote I/O control system in which the control method according to the present invention is implemented.
Figure 12B:
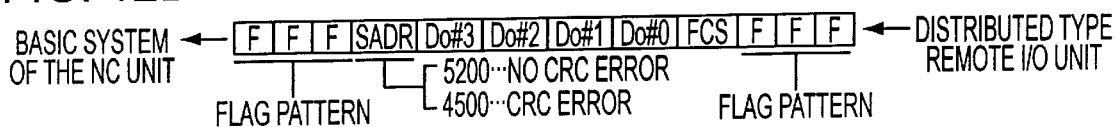
Figure 12C:
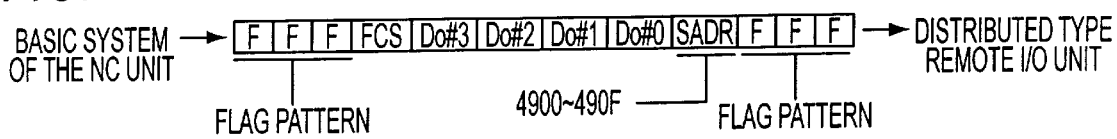
Figure 12D:
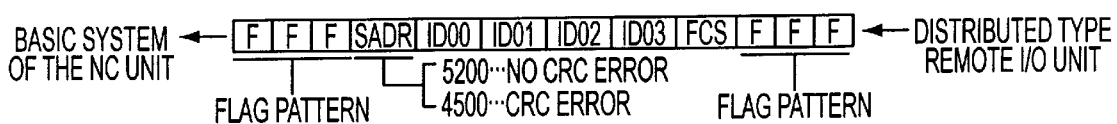
Figure 12E:
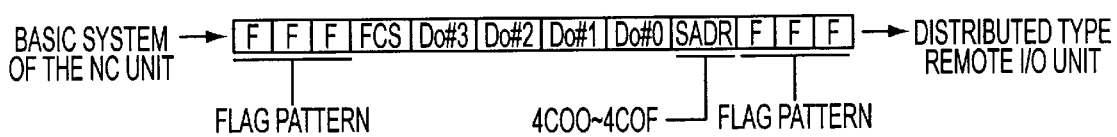
Figure 12F:
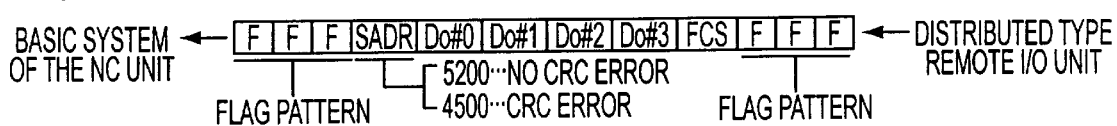

FIGS. 12A to 12F show transmission/receiving frame in each mode, wherein FIG. 12A shows a transmission frame from the basis system of the NC unit 1 to the distributed type remote I/O unit 2 in the on-line communication mode; FIG. 12B shows a transmission frame from the distributed type remote I/O unit 2 to the basic system of the NC unit 1 in the on-line communication mode; FIG. 12C shows a transmission frame from the basic system of the NC unit 1 to the distributed type remote in the off-line status communication mode; FIG. 12D shows a transmission frame from the distributed type remote I/O unit 2 to the basic system of the NC unit 1 in the off-line status communication mode; FIG. 12E shows a transmission frame from the basic system of the NC unit 1 to the distributed type remote I/O unit 2 in the loop-back mode; and FIG. 12F shows a transmission frame from the distributed type remote I/O unit 2 to the basic system of the NC unit 1 during the loop-back mode.

In each of the transmission frames above, Do #1 to 3 each indicate transmission data (output data) to the distributed type remote I/O unit 2; D1 #0 to 3 each indicates transmission data (input data) to the basic system of the NC unit 11; ID 00 indicates a type ID code for the distributed type remote I/O unit 2; ID 01 indicates setting data for the distributed type remote I/O unit 2; and ID 02 and ID 03 each indicates a reservation area for other status data for the distributed type remote I/O unit 2.

Data configuration in all of these frames is identical, but only a header pattern in each frame is different, so that timing control for the basic system of the NC unit 1 and distributed type remote I/O unit 2 can easily be executed.

A header pattern consists of, for instance, 16 bits, which are allocated to response header patterns for transmission of FF00 to FF0F in the ordinary transmission mode from the basic system of the NC unit 1 to the distributed type remote I/O unit; concretely 4900 to 490F is allocated to a header pattern for transmission from the basic system of the NC unit 1 to the distributed type remote I/O unit in the off-line status transmission mode, 4C00 to 4C0F to that for transmission from the basic system of the NC unit 1 to the distributed type remote I/O unit in the loop-back transmission mode, 5200 to that indicating normal receiving by a distributed type remote I/O unit from each distributed type remote I/O unit to the basic system of the NC unit 1, and 4500 to that when a receiving error occurs in the distributed type remote I/O unit during transmission of 4500 from each distributed type remote I/O unit to the basic system of the NC unit 1.

Herein, as for transmission from each distributed type remote I/O unit to the basic system of the NC unit 1, after transmission from the basic system of the NC unit 1 to a particular distributed type remote I/O unit 2, a receiving frame received from the basic system of the NC unit 1 is automatically recognized as receiving from the particular distributed type remote I/O unit 2, so that the header pattern is common to all the distributed type remote I/O units.

Figure 13A:
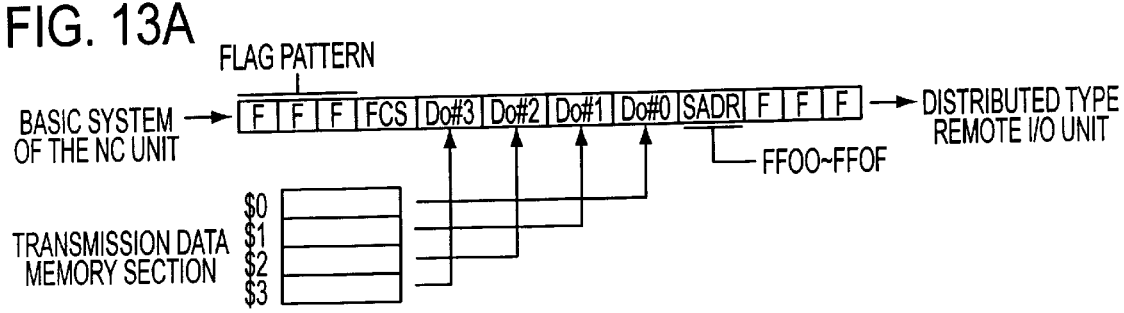
FIGS. 13A to 13D are explanatory views each showing a data array switching system in the distributed type remote I/O control system in which the control method according to the present invention is implemented.
Figure 13B:
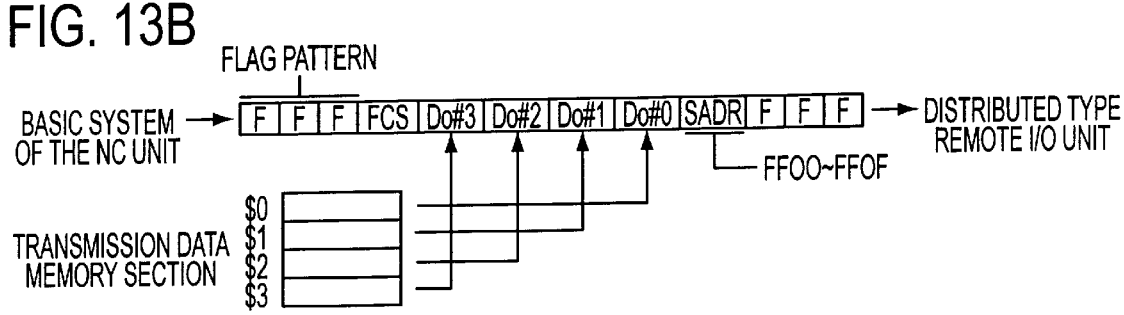

FIGS. 13A to 13D show the data array switching system. When transmitting from the basic system of the NC unit 1, as shown in FIG. 13A and FIG. 13B, a big endian system with the most significant bit as a header bit and a little endian system with the least significant bit as a header bit are selectively realized by changing an order when constructing a transmission frame from the transmission data memory section (latch circuit 301) in the communication control section of the basic system 1 of the NC unit 1.

Figure 13C:
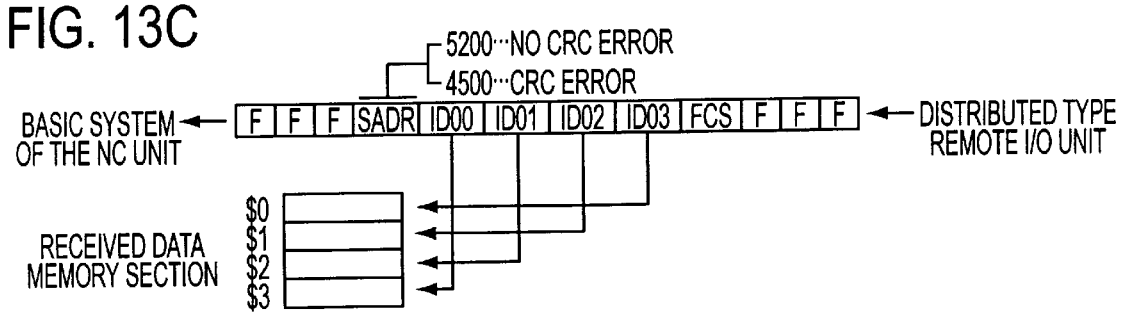
Figure 13D:
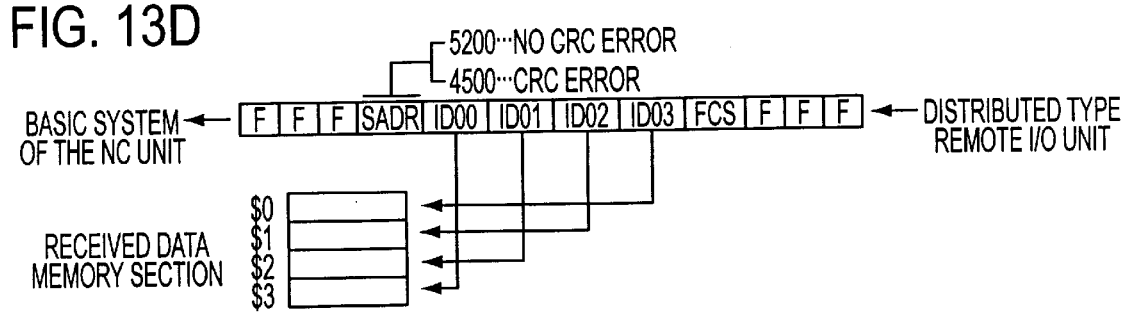

When the basic system of the NC unit 1 receives a signal, as shown in FIG. 13C and FIG. 13D, the big endian system with the most significant bit as a header bit and the little endian system with the least significant bit as a header bit are selectively realized by changing the order when writing received data into the received data memory section (latch circuit 401) in the communication control section in the basic system of the NC unit 1.

Selection of the data array described above is decided according to an input signal to the communication control section 103 in the basic system of the NC unit 1, and the actual operation is executed by the multiplexer 314 shown in FIG. 3 as well as the received data latch control section 410 shown in FIGS. 4A and 4B.

Input and output of the distributed type remote I/O unit to and from the basic system of the NC unit 1 are connected through a cable to a load-dispatching board in the machine side, and in this case sometimes meaning of a signal may be decided according to a pin correspondence in a connector for cable connection in the distributed type remote I/O unit 2, but in such a case easy response can be made to various types by switching a data array between the big endian system and little endian system, and in addition the distributed type remote I/O unit 2 can be connected to the basic system of the NC unit 1 without being restricted by the endian system of an MPU in the basic system of the NC unit 1.

Figure 14:
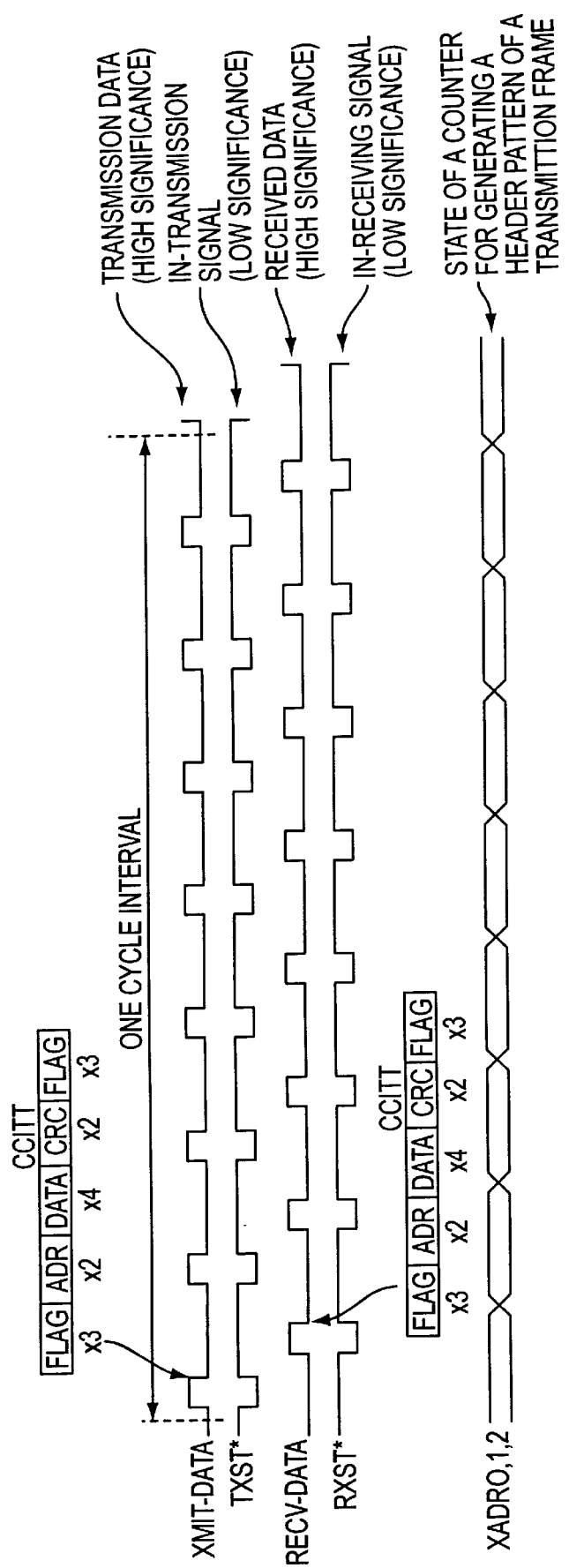
FIG. 14 is a time chart showing checking operation for connection of the distributed type remote I/O unit in the distributed type remote I/O control system in which the control method according to the present invention is implemented.

FIG. 14 shows a time chart of an operation for the MPU in the basic system of the NC unit 1 to check whether the distributed type remote I/O unit has been connected or not. In FIG. 14, XADR0 to XADR2 each indicate a signal indicating a state of a counter for generating a header pattern of a transmission frame, XMIT-DATA indicates a transmission data signal, TXST* indicates an in-transmission signal, REVE-DATA indicates a received data signal, and RXST* indicates an in-receiving signal. It should be noted that TXST* is the same as IN-XMIT signal in FIG. 3, and RXST* is the same as IN-RECV in FIG. 5.

Checking whether a distributed type remote I/O unit has been connected or not is executed by a circuit storing therein as a status a result of checking after transmission from the basic system of the NC unit 1 as to whether a receiving frame from the corresponding distributed type remote I/O unit 2 is present or no not, because transmission from the basic system of the NC unit 1 to the distributed type remote I/O unit 2 is executed at an interval specified by the transmission HDLC start timer 311 shown in FIG. 3.

Figure 15:
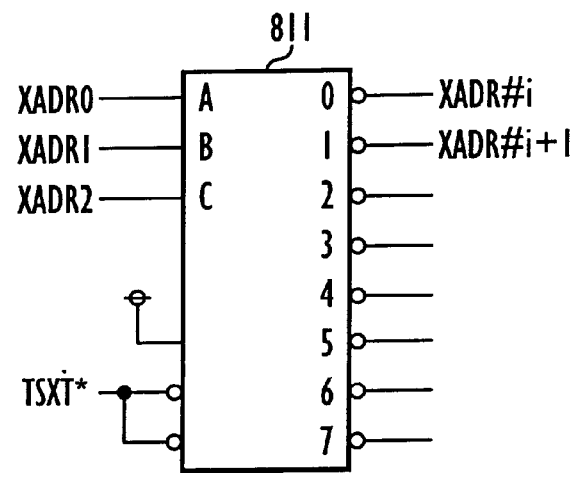
FIG. 15 is a block diagram showing a transmitting address decoder circuit for checking operation as to whether the distributed type remote I/O unit is connected or not to the basic system of the control unit.
Figure 16:
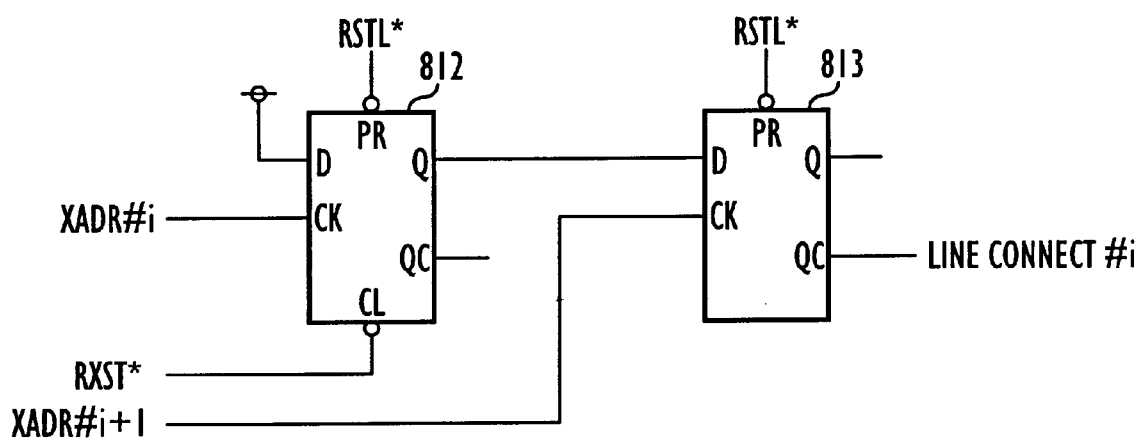
FIG. 16 is a block diagram showing a flip-flop circuit used for checking as to whether the distributed type remote I/O unit is connected or not to the basic system of the control unit.

Namely, in the communication control section 102 in the basic system of the NC unit 1, a header pattern for a transmission frame is generated by incrementing signals XADR0 to XADR2 each indicating a state of a counter for generating a header pattern of a transmission frame generated by the address pattern generator 306 (Refer to FIG. 3) for each transmission, and the signals XADR0 to XADR2 are inputted to a transmission address decoder circuit 811 shown in FIG. 15 to set transmission complete at a timing in a flip-flop circuit 812 shown in FIG. 16.

And only when a signal from the distributed type remote I/O unit 2 is received, the flip-flop circuit 812 is reset, and when transmission to the next distributed type remote I/O unit 2 is complete, a state of the flip-flop circuit 812 is stored in the flip-flop circuit 813 in the next stage. With this configuration, a result of checking as to whether a response to each transmission is returned from the distributed type remote I/O unit 2 or not is stored, and the MPU 101 in the basic system of the NC unit 1 can check a connecting state of the distributed type remote I/O unit 2.

With this configuration, the basic system of the NC unit 1 can accurately determine whether each distributed type remote I/O unit has been packaged therein or not.

It should be noted that, in FIG. 15 and FIG. 16, RSTL* indicates an internal reset signal in the distributed type remote I/O communication control section, and presetting of the flip-flop circuits 812 and 812 are executed according to this signal. Also XADR #i indicates a signal indicating that transmission to a distributed type remote I/O unit 2 having a unit number of #i is now being executed, XADR#i+1 indicates a signal indicating that now transmission to the distributed type remote I/O unit 2 having a unit number of #i+1 is being executed, and LINE CONNECT#i indicates a status signal indicating whether each distributed type remote I/O unit 2 has been connected or not and is the same as CONNECTION STATUS shown in FIG. 5.

Figure 17:
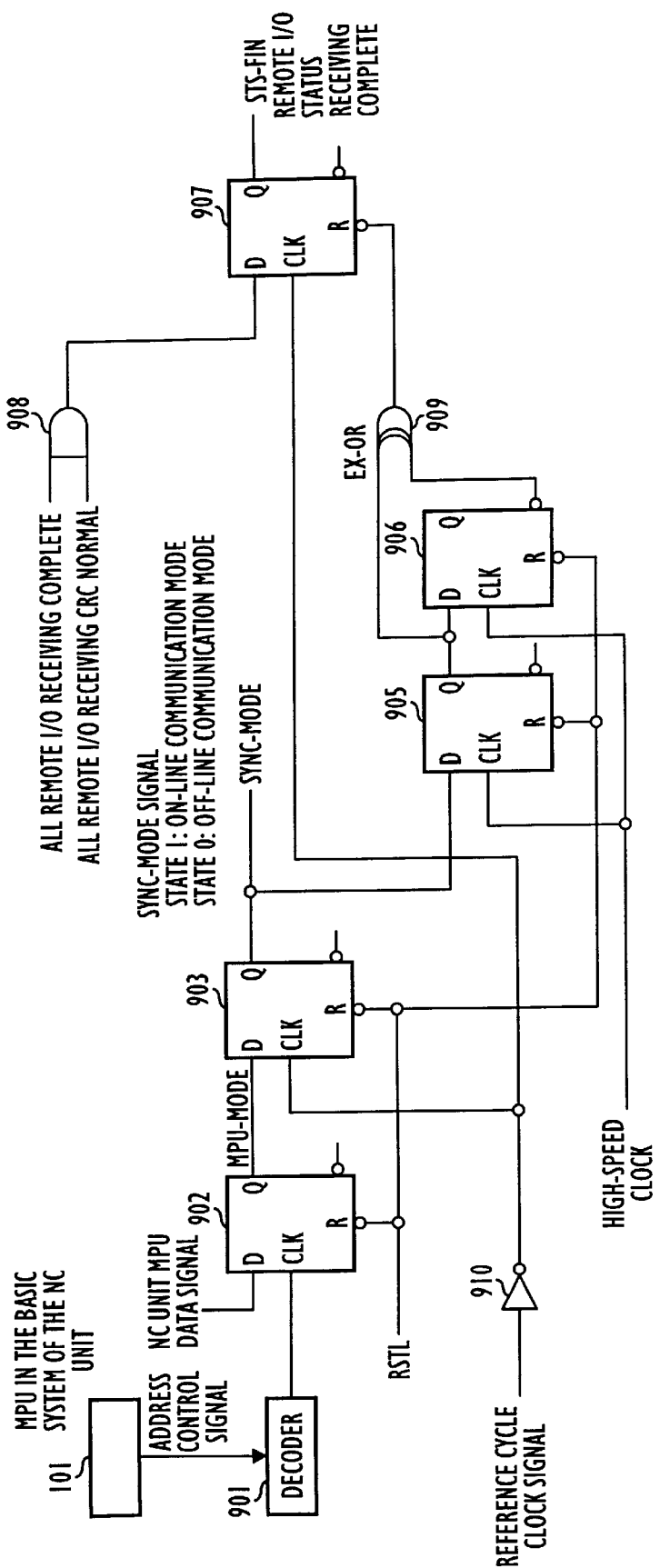
FIG. 17 is a block diagram showing hardware configuration for switching of an off-line status communication mode/an on-line communication mode in the distributed type remote I/O control system in which the control method according to the present invention is implemented.

FIG. 17 shows hardware configuration for switching between the off-line status communication mode and on-line communication mode. This mode switching section comprises a decoder 901 to which an address and a control signal are given from the MPU 101, a flip-flop circuit 902 for storing a mode select bit, a flip-flop circuit 903 for storing therein a mode synchronizing select signal, flip-flop circuits 904, 905 for differentiating a change in the mode synchronizing select signal, a flip-flop circuit 907 for storing therein a status bit, an AND gate 908 for computing a logical product of an all remote I/O receiving complete signal and all remote I/O receiving CRC normal signal, EX-OR 909, and an inverter 910.

Set/reset of the mode select bit is executed by the MPU 101 by means of writing data at a particular address. Namely, when the MPU 101 writes data at a particular address (NC unit MPU data signal=1), the particular address is decoded by the decoder 901. This is inputted as a CLK for the flip-flop circuit 902 for storing the mode select bit, the MPU-MODE is effected, and the MPU-MODE signal is shifted from a low level to a high level.

On the contrary, if the MPU 101 executes data write to a particular address (NC unit MPU data signal=0) while the MPU-MODE signal is at a high level, the MPU-MODE is effected, and the MPU-MODE signal is shifted from the high level to the low level.

Figure 18:
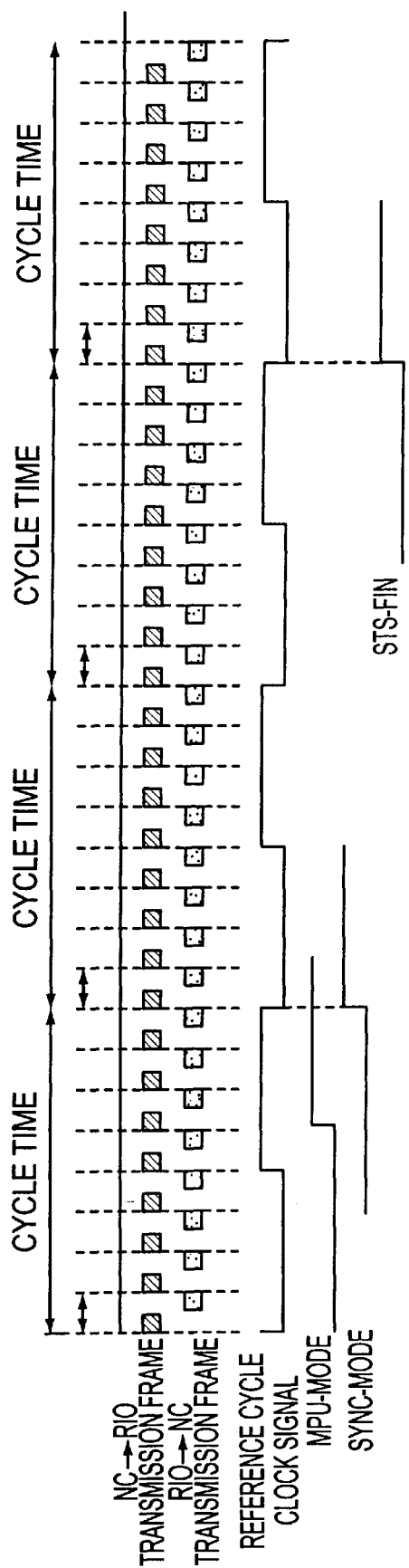
FIG. 18 is a time chart showing switching operation of an off-line status communication mode/an on-line communication mode in the distributed type remote I/O control system in which the control method according to the present invention is implemented.

When the MPU-MODE signal is set at the timing as shown in FIG. 18, the MPU-MODE signal is fetched into the flip-flop circuit 904 for differentiating change in the mode synchronizing select signal in the last transaction of the reference cycle clock signal, and the SYNC-MODE signal shifts from the low level to the high level. This SYNC-MODE signal changes at a break of the cycle time, so that it synchronizes to transmission to a first distributed type remote I/O unit 2 from the basic system of the NC unit 1.

When the SYNC-MODE signal is inputted into the address pattern generator 306 (Refer to FIG. 3), switching of a header pattern between the off-line and on-line communication modes is executed.

Status bit setting is executed after the SYNC-MODE signal is switched when a response indicating completion of normal receiving has been returned from all the distributed type remote I/O units 2.

If it is assumed that, in the first cycle time after the SYNC-MODE signal has shifted from the low level to the high level, a CRC error is generated in transmission from any distributed type remote I/O unit 2 and that transmission from all the distributed type remote I/O units is made normally in the next cycle time, a time gap between the SYNC-MODE signal and STS-FIN signal becomes 2 times of the cycle time C.

With the operations described above, the MPU 101 in the basic system of the NC unit 1 can be switched between the off-line communication mode and on-line communication mode, and can determine only with the status bit that received data from all the distributed type remote I/O unit 2 has been switched. This feature provides the advantage that a time of processing by the MPU becomes shorter.

Also the operating status is switched to a transmission frame for status request synchronizing to and from transmission to a first unit, so that it is possible to prevent a status from being taken for the normal input in the side of the basic system of the NC unit.

At first, in the communication control section 102 in the basic system of the NC unit 1, after system power is turned ON or system is reset, the off-line status communication mode is automatically set, and transmission is executed sequentially by means of time division control so that a transmission frame requiring an off-line status to the distributed type remote I/O units will correspond to each distributed type remote I/O unit.

When transmission in the off-line status communication mode is finished in the normal condition, the on-line communication mode for ordinary input/output is set.

In any communication mode, a time interval for frame transmission is set at a constant value specified by the receiving HDLC timer 311 taking into considerations a time for a receiving frame from the distributed type remote I/O unit 2, so that transmission to each distributed type remote I/O unit 2 is repeated at a specified time interval upon input of a clock signal into the communication control section 102.

Herein, when the communication control section 130 in the distributed type remote I/O unit 2 corresponding to a header pattern of a transmission frame detects a header pattern directed to the unit, the unit automatically incorporates the ID data for the distributed type remote I/O unit 2 after receiving is complete, and transmits the transmission frame to the basic system of the NC unit 1 with a margin of a specified period of time set by a hardware timer in the transmission HDLC sequencer 510. The specified period of time herein may be around several-byte length in a transmission/receiving frame.

Because frame transmission for the basic system of the NC unit 1 is controlled by a hardware timer in the distributed type remote I/O unit 2, a software sequence by an MPU in a distributed type remote I/O unit for checking completion of frame receiving from a basic system of a control unit as required in the conventional technology becomes unnecessary, and system construction becomes easier.

Software in the basic system of the NC unit 1 can read out data for external equipment through the distributed type remote I/O unit 2, so that software in the side of the basic system of the NC unit 1 can readout data likely in a case where external equipment is directly connected to a data bus in the MPU 101, without being aware of the operation for receiving data through serial communication, by writing control commands and parameters in the latch circuit 301 of the distributed type remote I/O unit 2 and reading the data written in the latch circuit 401 in a specified time set by the hardware timer.

With this configuration, software in the basic system of the NC unit 1 is not required to execute a specific operation for inputting data using the distributed type remote I/O unit 2, so that software processing in the basic system of the NC unit 1 becomes more simple.

The communication control section 102 in the basic system of the NC unit 1 is ready for receiving during a period when a transmission frame is not being transmitted, and executes receiving only when a transmission frame is sent from the distributed type remote I/O unit 2.

The communication control section 102 in the basic system of the NC unit 1 has a communication data storage memory (latch circuit 301) with a capacity corresponding to a number of distributed type remote I/O units and a received data storage memory (latch circuit 401), transmits the data in corresponding to a transmission data storage memory constructing the data into a transmission frame according to a header pattern, and if a receiving frame is received after transmission is complete, the receiving frame is stored in a received data storage memory corresponding to the header pattern.

Herein a header pattern for a transmission frame transmitted from the distributed type remote I/O unit 2 to the basic system of the NC unit 1 is divided to only two types; a header pattern indicating that a CRC error has been generated in transmission from the basic system of the NC unit 1 to the distributed type remote I/O unit 2, and a header pattern indicating that the distributed type remote I/O unit 2 received a transmission frame in normal condition, and the communication control section 102 in the basic system of the NC unit 1 automatically determines from what number of distributed type remote I/O unit 2 the transmission frame was sent at a timing when received, and stores the transmission frame in the corresponding received data storage memory.

If a CRC error occurs during data receiving by the distributed type remote I/O unit 2, the communication control section 130 in the distributed type remote I/O unit 2 does not set the received data in the output section, and automatically aborts the received data. With this feature, the reliability against noise environment in a transmission path is improved.

Also by sending a transmission frame having a header pattern indicating that a CRC error has been generated during receiving from the communication control section 130 in the distributed type remote I/O unit 2 to the basic system of the NC unit 1, the communication control section 102 in the distributed type remote I/O unit 2 can set a CRC error status corresponding to each distributed type remote I/O unit 2, and then the MPU 101 in the basic system of the NC unit 1 reads out the status, determines that there has occurred any system fault when the status indicating generation of a CRC error is detected specified times or more, displays the system fault on the display unit 3 provided in the basic system of the NC unit 1, and stops operation of the system. With this feature, reliability of the system is improved.

When the distributed type remote I/O unit 2 receives a normal frame from the basic system of the NC unit 1, the distributed type remote I/O unit 2 outputs data in a command section of the received data as a hardware control signal and also data in a parameter section of the received data as a data signal to the output control section, and makes hardware added to the distributed type remote I/O unit 2 run. Also the distributed type remote I/O unit 2 inputs a result of hardware operation into a transmission buffer and transmits it to the basic system of the NC unit 1 at a specified timing.

Figure 19:
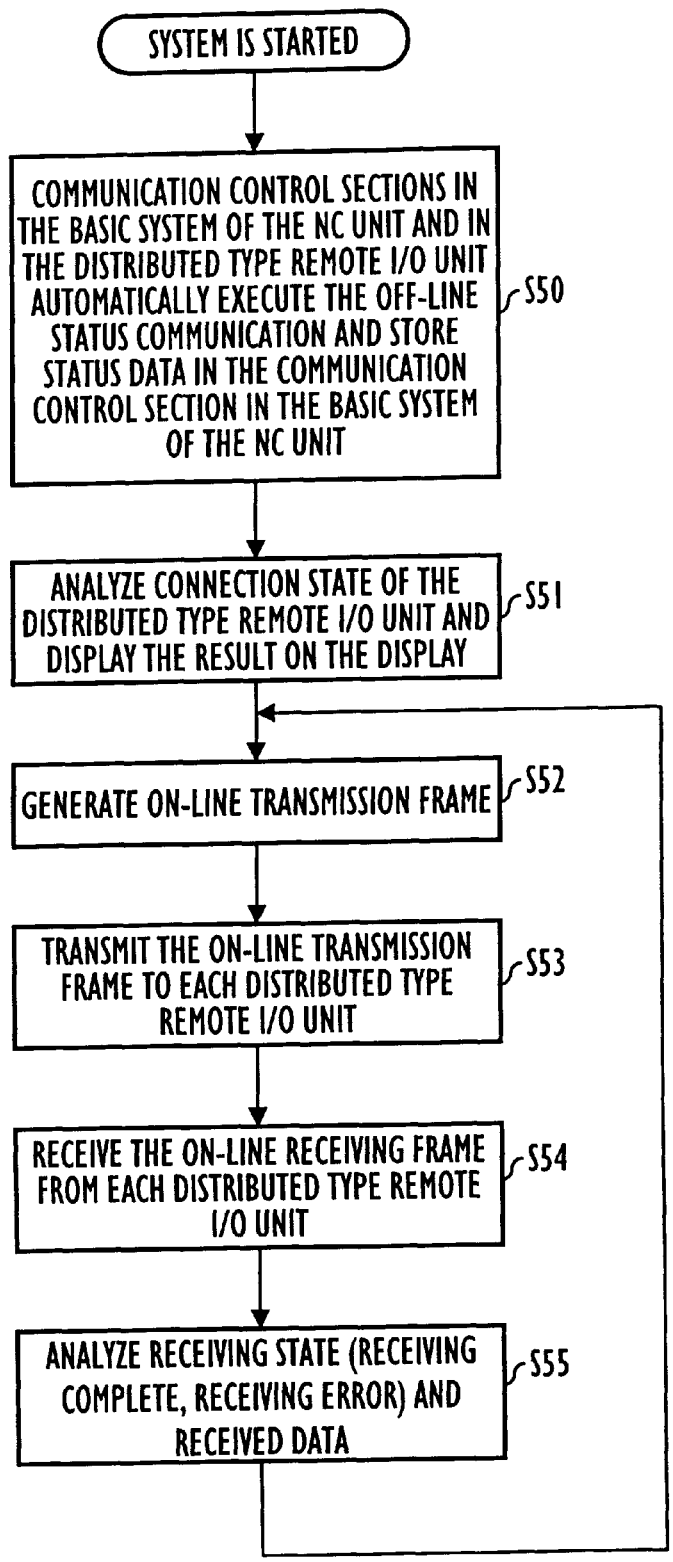
FIG. 19 is a flow chart showing a operation flow in the basic system of the NC unit in which the control method in the distributed type remote I/O control system according to the present invention is implemented.

FIG. 19 shows a flow of operations of the basic system of the NC unit 1 according to the control method according the present invention. When operation of the system is started, as described above, the communication control section 102 in the basic system of the NC unit 1 and the communication controls section 130 in the distributed type remote I/O unit 2 automatically execute the off-line status communications, and store status data in the communication control section 102 in the basic system of the NC unit 1 (Step S50).

In the off-line status communication mode, transmission frames for off-line status communication mode each including a header pattern corresponding to the switch 134 packaged in each distributed type remote I/O unit 2 (Refer to FIG. 12C) are successively transmitted from the basic system of the NC unit 1 to each distributed type remote I/O unit 2, and each distributed type remote I/O unit 2 corresponding to the transmission frame respectively transmits a transmission frame including data concerning a type of the unit to the basic system of the NC unit 1 (Refer to FIG. 12D), so that a type of the distributed type remote I/O unit 2 corresponding to a switch packaged in the distributed type remote I/O unit 2 can be recognized by the basic system of the NC unit 1.

With this type of off-line status communications, the basic system of the NC unit 1 can recognize a type of the distributed type remote I/O unit 2, and run in the off-line status communication mode without fail when system operation is started, so that an abnormal operation of the system can always be prevented.

Also data concerning a type of each distributed type remote I/O unit 2 can automatically be accumulated in a communication control section of the basic system of the NC unit 1 in the off-line status communication mode regardless of MPU operation in the basic system of the NC unit 1, so that connection state of the system can quickly be recognized and control corresponding to the system can quickly be executed.

Also the system operation can automatically be started in the off-line status mode without depending on software in the basic system of the NC unit 1, so that, in case of incorrect connection, it is possible to prevent incorrect output from being executed to the distributed type remote I/O unit 2, which insures construction of a system with high reliability.

Also after power is turned ON, the communication control section 102 in the basic system of the NC unit 1 automatically enters the off-line status communication mode, and automatically transmits transmission frames for successive status request to the distributed type remote I/O unit 2, so that the MPU 101 in the basic system of the NC unit 1 has only to check a status of each distributed type remote I/O unit 2 fetched into the communication control section 102, which allows simple software processing in the basic system of the NC unit 1.

In this off-line status communication mode, an output signal from the distributed type remote I/O unit 2 is the same as that used in the previous operation, and is not updated to newly transmitted data, and the data transmitted from the basic system of the NC unit 1 is not used in the distributed type remote I/O unit 2. With this feature, even if the MPU 101 in the basic system of the NC unit 1 sends incorrect output data to the distributed type remote I/O unit 2 upon start of system operation, the data is not outputted in each distributed type remote I/O unit 2, which insures construction of a system with high reliability.

The memory 103 in the basic system of the NC unit 1 stores therein data concerning a number of units of distributed type remote I/O units 2 connected to the basic system of the NC unit 1 as well as a type of distributed type remote I/O unit corresponding to each unit number, and in the off-line status communication mode just after start of system operation, the MPU 101 in the basic system of the NC unit 1 compares status data included in a transmission frame from the distributed type remote I/O unit to data stored in the memory 103, and if there is any difference between the two types of data described above, an alarm is outputted. This alarm output may be display provided on the display unit 3 or stoppage of system operation.

Data concerning a type includes a difference between number of inputs or outputs in each distributed type remote I/O unit, specific functions (such as A/D, D/A, pulse count I/F, pulse output I/F, serial signal I/O or the like), and a difference between specifications of input signals and those of output signals (such as DC, AC, voltage, current or the like).

Type data concerning difference includes information concerning, for instance, the fact that a number of inputs and outputs required by a machine tool is not identical to a number of inputs and outputs to and from the distributed type remote I/O unit 2 when the basic system of the NC unit 1 controls operation of the machine tool by controlling input and output to and from the distributed type remote I/O unit 2, or that such parameters as a DC voltage or current specification in the machine side are not identical to a number of inputs and outputs to and from the distributed type remote I/O unit.

If on-line system operation is executed with the type data kept different, sometimes a machine tool may not be controlled correctly in the former case, while in the latter case circuits in the basic system of the NC unit 1 and a machine tool may be broken, which is disadvantageous for system operation.

For this reason, if the type data is different, an alarm display is alerted to an operator, and operation as that of an on-line system is not executed.

When this alarm display is given, an operator can accurately recognize and grasp without a short period of time why the system does not work normally.

As described above, it is possible to recognize a type of the distributed type remote I/O unit 2, so that in the subsequent on-line communication mode, the basic system of the NC unit 1 can control input and output according to a type of the distributed type remote I/O unit 2 and increases a number of types of distributed type remote I/O, which makes it. possible to flexibly construct a system corresponding to a type of machine to be controlled.

As described above, connection state of the distributed type remote I/O unit 2 is analyzed, and the result is displayed on the display unit 3 (Step S51).

Then the MPU 101 in the basic system of the NC unit 1 switches the operating mode to the on-line communication mode, prepares on-line transmission frames(Refer to FIG. 12A) (step S52), then successively transmits the on-line transmission frames to each distributed type remote I/O unit 2 (step S53), receives on-line receiving frames (Refer to FIG. 12B) from each distributed type remote I/O unit 2 (step S54), and analyzes receiving state (receiving complete, receiving error) and received data in each cycle (step S55). Then the sequence from step S52 to step S55 is repeated.

Switching between the on-line communication mode and off-line status communication mode is executed by updating a header pattern for a frame to be transmitted from the basic system of the NC unit 1 to the distributed type remote I/O unit 2, and the communication control section 130 in the distributed type remote I/O unit 2 detects a difference of a header pattern, and selects ordinary input in the on-line communication mode or status input in the off-line status communication mode according to a mode select signal based on the difference.

The communication control section 103 in the basic system of the NC unit 1 stores the status data from each distributed type remote I/O unit 2 in the off-line status communication mode described above and input data for each distributed type remote I/O unit 2 in the on-line communication mode together in the latch circuit 401.

By using the latch circuit 401, namely a received data memory section of the communication control section 103 in the basic system of the NC unit 1, both in the off-line status communication mode and on-line communication mode, it is possible to minimize hardware configuration of the communication control section 103 in the basic system of the NC unit 1, thus cheap hardware being provided.

The off-line communication mode and on-line communication mode are not operative simultaneously, and when system operation is started, which type of distributed type remote I/O unit 2 is connected to the basic system of the NC unit 1 is still unknown, so that, when the operating mode is switched, after the operating status is normally recognized, to the on-line communication mode using the latch circuit 401 using a storage means for storing therein status data transmitted from the distributed type remote I/O unit 2, the latch circuit 401 is used as an input signal storage means for the ordinary distributed type remote I/O unit 2.

Configuration of a transmission frame from the basic system of the NC unit 1 to the distributed type remote I/O unit 2 in the off-line status communication mode is the same as that in the on-line communication mode, and the off-line status communication mode is switched to the on-line communication mode or vice versa according to a difference of a header pattern, so that circuit configuration in the basic system of the NC unit 1 and distributed type remote I/O unit 2 can be simplified.

Also output from the distributed type remote I/O unit in the off-line status communication mode can be executed like in the on-line communication mode, so that, even while the system is running, it is possible to temporally change the operating mode to the off-line status communication mode, and to monitor connection state as well as a type of the distributed type remote I/O unit and display the result on a display unit of the basic system of the control system.

Also a difference of a header pattern is detected, and a select signal for the off-line status communication mode or on-line communication mode is outputted to outside, so that switching between ordinary input and status input can be executed according to a select signal, and circuit configuration of a distributed type remote I/O unit is simplified.

Figure 20:
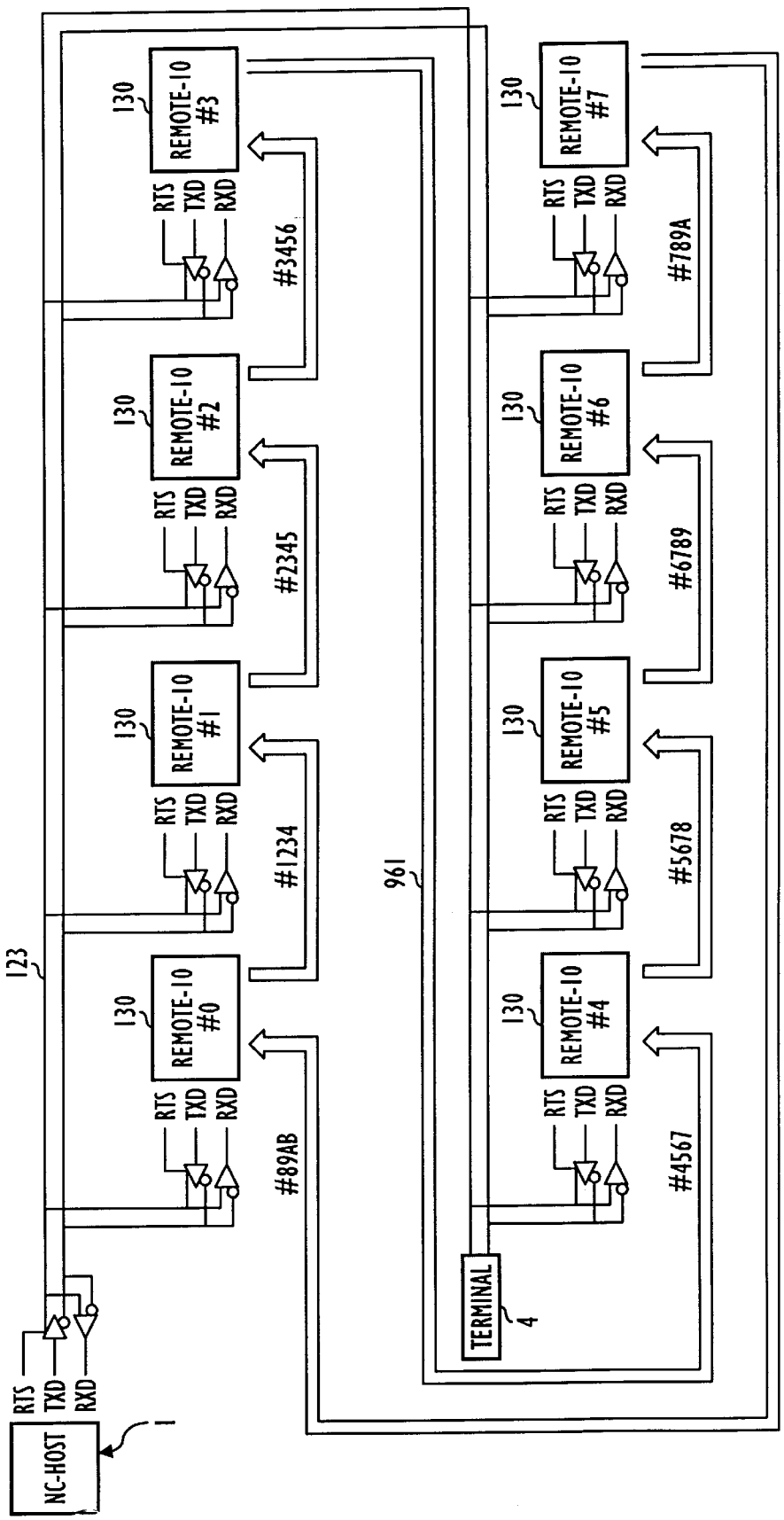
FIG. 20 is a block diagram showing a test system for the system in the distributed type remote I/O control system in which the control method according to the present invention is implemented.

FIG. 20 shows a testing method for testing a distributed type remote I/O control system. In this testing method, an output section of each distributed type remote I/O unit 2 is connected to an input section of other distributed type remote I/O unit 2 through an input/output signal line 9691, so that distributed type remote I/O units are connected in a form of closed loop.

In FIG. 20, REMOTE-IO#0 sends a transmission frame from the basic system of the NC unit 1 to have a signal #1234 outputted, and subsequently REMOTE-IO#1 has a signal #2345 outputted.

When each distributed type remote I/O unit 2 is connected as shown in FIG. 20, data which the basic system of the NC unit 1 receives from the REMOTE-IO#0 becomes #89AB, and data which the basic system of the NC unit 1 receives from the REMOTE-TO#1 becomes #1234. As described above, a system test is executed by inputting an output from the distributed type remote I/O unit 2 having a particular unit number into another distributed type remote I/O unit 2 and comparing the data to expected data in an MPU in the basic system of the NC unit 1. With this operation, a system test can easily and accurately be executed.

To check whether all the inputs and outputs to and from the distributed type remote I/O unit 2 are normal or not, a test can be executed by changing an output signal for each unit number.

Figure 21:
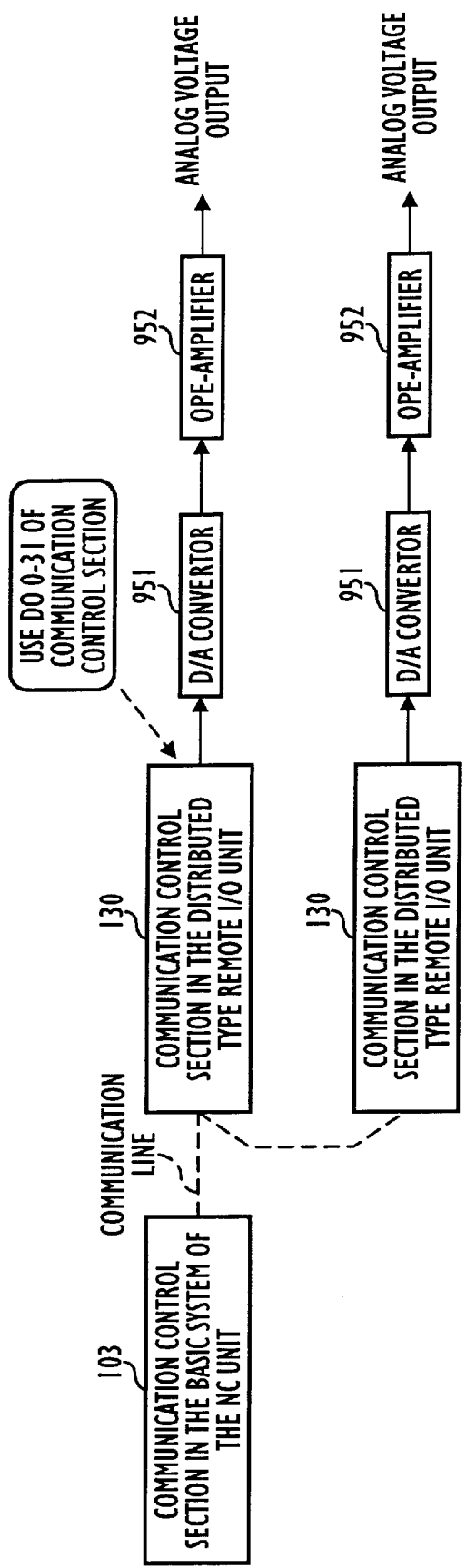
FIG. 21 is a block diagram showing hardware configuration of analog voltage output in the distributed type remote I/O control system in which the control method according to the present invention is implemented.

FIG. 21 shows hardware configuration for analog voltage output. The analog voltage output section has a D/A convertor 952 for receiving output signals DO 01 to 31 from the communication control section 130 in the distributed type remote I/O unit 2, and an ope-amplifier 953 for providing an analog voltage output.

Figure 22:
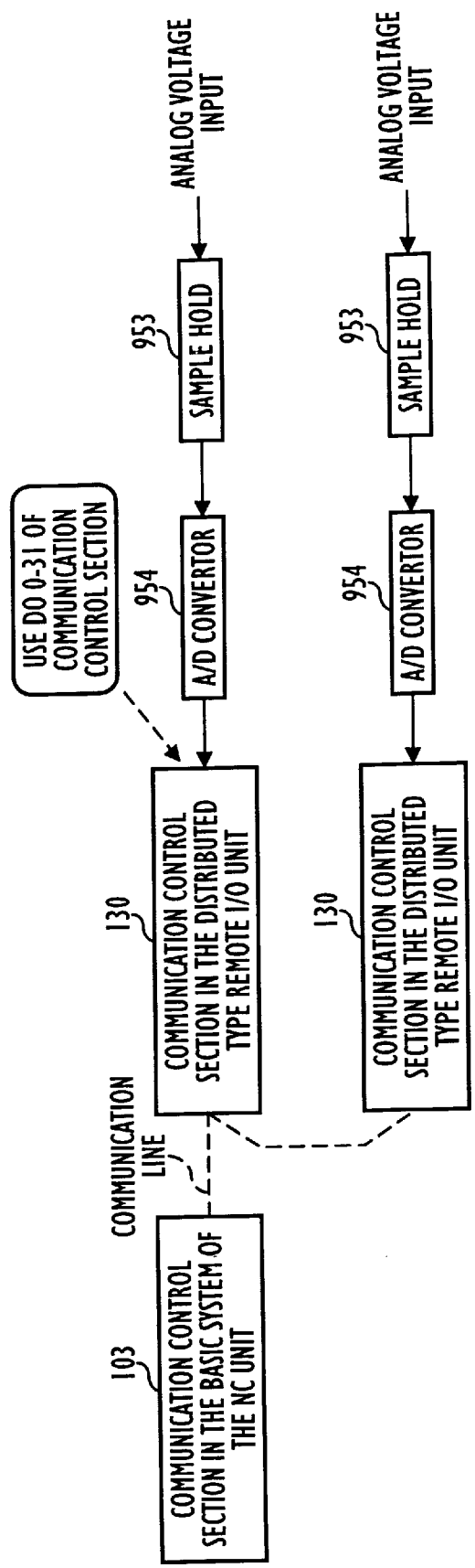
FIG. 22 is a block diagram showing hardware configuration of analog voltage input in the distributed type remote I/O control system in which the control method according to the present invention is implemented.

FIG. 22 shows hardware configuration for analog voltage input. The analog voltage input section comprises a sample hold circuit 953 to which an analog voltage is loaded, and an A/D convertor 954 connected to the sample hold circuit 953, and the A/D convertor 954 inputs input signals DI 0 to 31 into the communication control section 130 in the distributed type remote I/O unit 2.

As for the analog voltage output, like the digital data, digital data transmitted from the basic system of the NC unit 1 is outputted from the communication control section 130 in the distributed type remote I/O unit 2, and when the output is inputted into the D/A convertor 951, an analog output is obtained from the D/A convertor 951. Furthermore during ordinary operation, output from the D/A convertor 951 is inputted into an ope-amplifier 952, adjusted to amplification gain adjustment thereon, and is outputted to an external device.

As for analog voltage input, an analog voltage input is sampled by the sample hold circuit 953 and then converted by the A/D convertor 954 to digital data, and then the digital data is inputted into the communication control section 130 in the distributed type remote I/O unit 130, and then transmitted to the basic system of the NC unit 1.

Thus, in case of input and output of analog voltage, basically digital data is treated, so that an instruction and a trigger are not necessary.

As analog voltage output and analog voltage input can be treated in the distributed type remote I/O unit 2, interface with a machine tool is provided in any case through the distributed type remote I/O unit 2, and for this reason it is not necessary to provide an analog interface in the basic system of the NC unit 1, and size of the basic system of the NC unit 1 can be reduced.

Also even if an analog signal easily affected by external noise is not transmitted through a long signal cable line from the basic system of the NC unit 1, a distributed type remote I/O unit 2 can be provided near a device requiring analog input or analog output interface with a short signal line connected thereto, so that a system hardly affected by external noise can be constructed.

Figure 23:
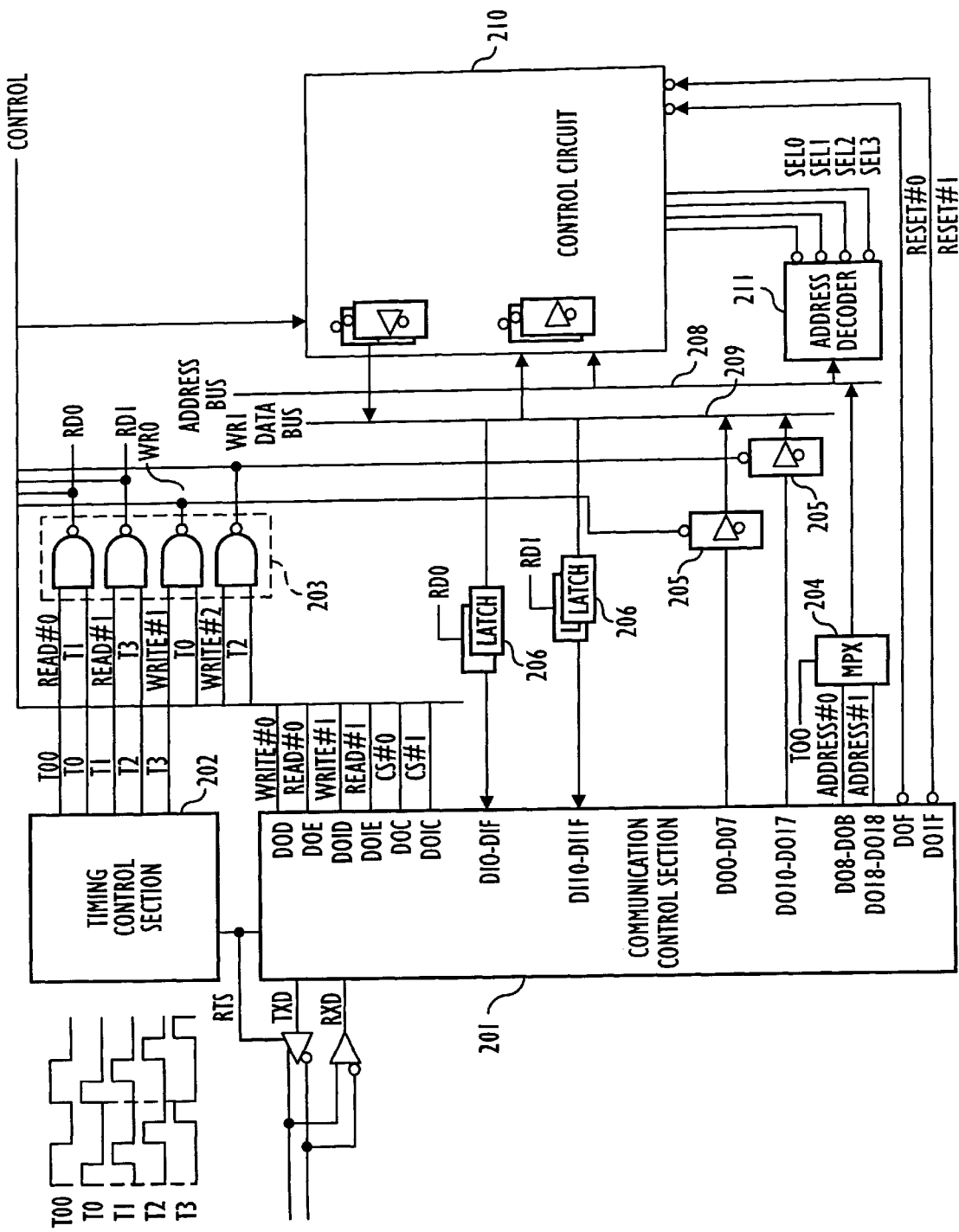
FIG. 23 is a block diagram showing a communication control section in the distributed type remote I/O unit and a control circuit for hardware for executing a particular function connected thereto in the distributed type remote I/O control system in which the control method according to the present invention is implemented.
Figure 24A:
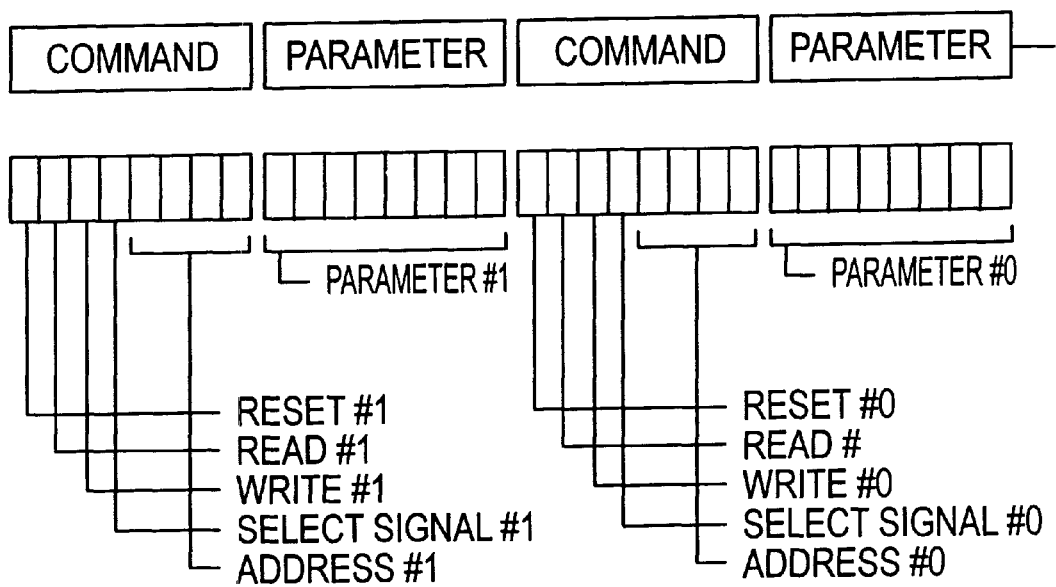
FIG. 24A is an explanatory view showing a data format in the distributed type remote I/O control system in which the control method according to the present invention is implemented.

FIG. 23 shows a communication control section in the distributed type remote I/O unit 2 and a hardware control circuit connected thereto and executing a particular function. When the communication control section 201 in the distributed type remote I/O unit 2 receives transmission data from the basic system of the NC unit 1 as shown in FIG. 24A, the communication control section 201 changes select signals #0, #1 to CS #0, CS #1, READ signal#0, #1 to READ #0, #1, WRITE signals #0, #1 to WRITE #0, #1, reset signals #0, #1 to RESET #0, #1 signals, address signals #0, #1 to ADDRESS #0, #1 signal sets, parameter signals #0, #1 to DO0 to D07, DO10 to D017 signal sets for output.

The communication control section 201 comprises a timing control circuit 202, a logic circuit section 203, a multiplex circuit 204, an output data buffer 205, and an input data latch circuit 206 each connected thereto.

The timing control circuit 202 generates timing signals T00, T1, T2, T3 and T4 synchronizing to a communication timing of the distributed type remote I/O unit 2, and outputs the timing signals to the logic circuit section 203.

The logic circuit section 203 comprises a NAND gate, and generates control signals for read and write (RD0, 1, WR0, 1) from READ #0, #1, WRITE #0, #1 outputted from the communication control system 201 and the timing signals T00, T1, T2, T3, and T4 outputted from the timing control circuit 203.

The multiplex circuit 204 selects addresses #0, #1 outputted from the communication control section 201 by means of time division according to a timing signal T00, and selectively outputs either the address #0 or #1 to the address bus 1 line 208.

The output data buffer 205 receives output data DO0 to DO7, DO10 to DO17 outputted from the communication control section 201, and outputs the data to a data bus 209 according to the write control signals WR0, 1.

The input data latch circuit 206 receives data outputted from a control circuit 210 from the data bus 209 according to input of read control signals RD0, 1.

The control circuit 210 is a hardware control circuit executing a particular function, and is controlled according to the control signals and data signals as described above. Connected to this control circuit 210 is an address decoder 211, and the address decoder 211 generates signals SEL 0, 1, 2, 3 for circuit selection from the address signal #0 or #1.

Figure 24B:
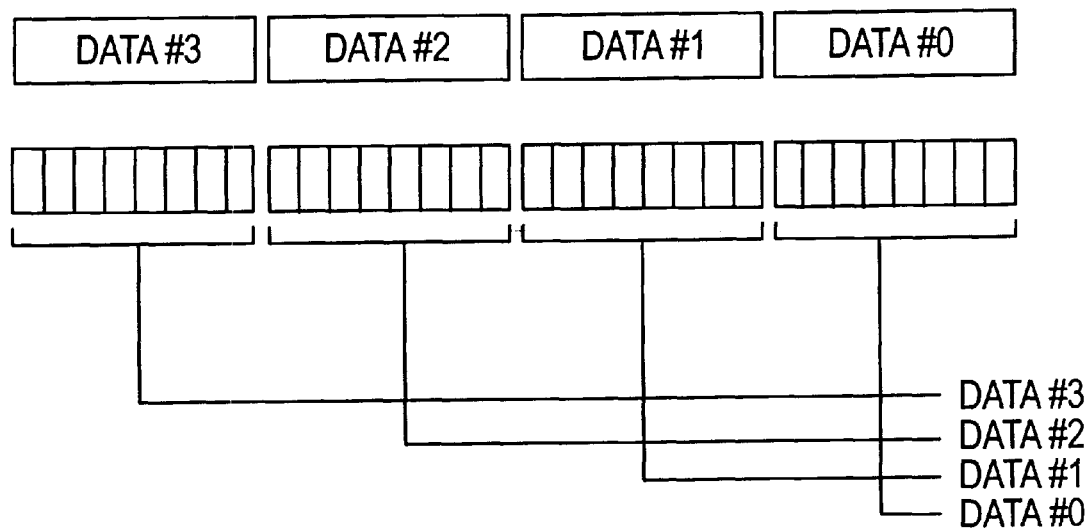
FIG. 24B is an explanatory view showing a data format in the distributed type remote I/O control system in which the control method according to the present invention is implemented.

When the transmission data shown in FIGS. 24A and 24B is inputted as receiving data RXD into the communication control section 201, data in the command section is outputted as the control signal described above. Data in the parameter section is outputted from DO0 to 7 and DO10 to 17, and is written in the control circuit 210 specified by an address signal through the output data buffer 205 by means of time division. The control circuit 210 processes the written data and outputs a result of the processing to the 16-bit data bus 209 according to a timing of the read signals RD 0,1. The data is latched by means of time division to the input data latch circuit 206.

The communication control section 201 receives signals of DIO to F and DI10 to 1F inputted from the input data latch circuit 206, generates the receiving data (response) #0 to 3 as shown in FIG. 24B, and transmits the data to the basic system of the NC unit 1 according to a timing for communications.

When initializing the control circuit 210, RESET#0, #1 signals are outputted from the communication control section 201 to the control circuit 210 by setting resets #0, 1 for the transmission data (request), thus the control circuit 210 being initialized.

In this circuit, with a function of the communication control section 201, when transmission data (request) is inputted from the basic system of the NC unit 1, commands and parameter data as described above are outputted to the hardware control circuit, and furthermore the result is cyclically transmitted as receiving data (response) to the basic system of the NC unit 1.

Transmission data transmitted from the basic system of the NC unit 1 becomes an address signal with the data in the command section thereof comprising 4 bits of hardware select signal, a READ signal, a WRITE signal, and a reset signal, and 8-bit data in the parameter section becomes an output data signal as shown in FIG. 24A. In FIG. 24A, command and parameter become a signal set of #0 and #1 respectively for two control circuits.

FIG. 25A to F show a data format of a data area in a distributed type remote I/O unit respectively.

Figure 25A:
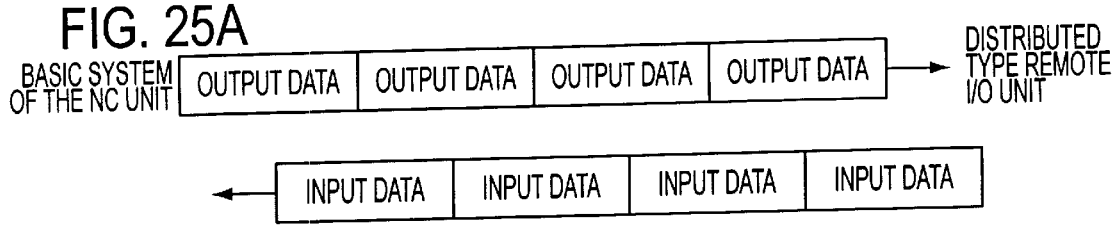
FIGS. 25A to 25F are explanatory views each showing a data format for a data region in the distributed type remote I/O control system in which the control method according to the present invention is implemented.

FIG. 25A shows a data format during the ordinary I/O, and output data for I/O from the basic system of the NC unit 1 is transmitted to the distributed type remote I/O unit 2. The transmission data is received by the communication control section 201 shown in FIG. 23, and is outputted as signals of DO0 to DO1F. As for input data for I/O, the signals of DI0 to DI/F are inputted to the communication control section 201 in synchronism to a timing for communication, and are transmitted as input data to the basic system of the NC unit 1.

In case of the ordinary I/O input/output mode, every 1 bit of all the data areas in transmission data from the basic system of the NC unit 1 is an independent output signal, and also every 1 bit of all the data areas in transmission data to the basic system of the NC unit 1 is an independent input signal.

Figure 25B:
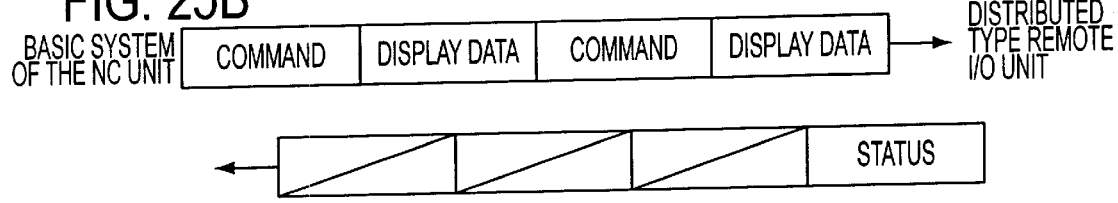

In case of the external position display mode, as shown in FIG. 25B, transmission data from the basic system of the NC unit 1 is divided to a command section and a parameter section, and the parameter section indicates display data, while the command section indicates a reset signal, a write signal, and a display data sequence number to the hardware circuit.

By combining a sequence number with display data, even if display data can not be transmitted by one transmission, the display data can be displayed as successive data in the side of the distributed type remote I/O unit 2 on an external position display unit. Transmission data from the distributed type remote I/O unit 2 indicates a status of the external position display unit, and a reset input signal is returned to the basic system of the NC unit 1.

In case of the manual pulse generator interface mode and synchronous pulse encoder interface, transmission data from the basic system of the NC unit 1 comprises a command section and a parameter section.

Figure 25C:
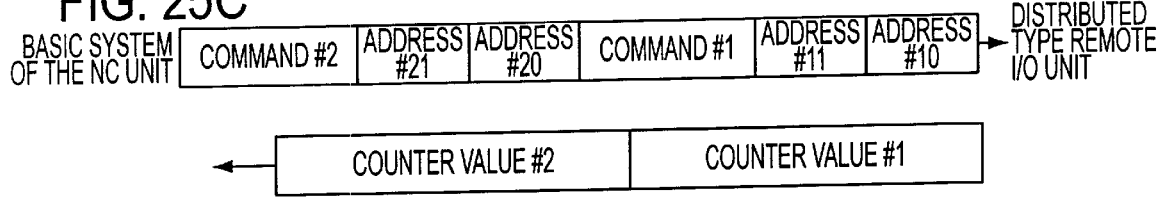

In the manual pulse generator interface, as shown in FIG. 25C, the command section comprises a counter reset signal, a read signal for latching and storing a pulse counter value, and a read signal for inputting the latched value into an input section of the distributed type remote I/O unit 2. The parameter section comprises an address for instructing counter latch, and a buffer address for the pulse counter.

Figure 25D:
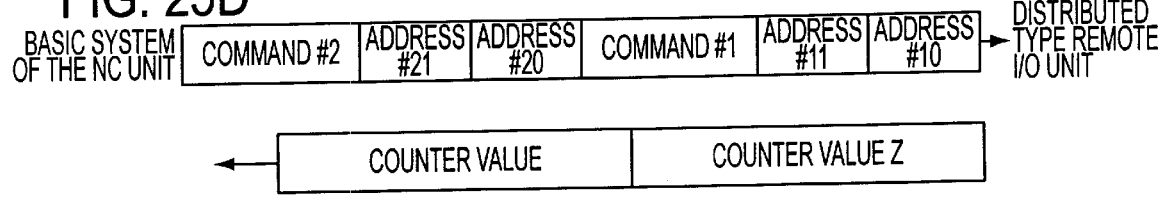

Also configuration of the synchronous pulse encoder interface is the same as that of the manual pulse generator interface, but in case of the synchronous pulse encoder interface, as shown in FIG. 25D, a control signal similar to that for a Z-phase counter is added as a signal for recognizing one rotation additionally.

When transmission data from the basic system of the NC unit 1 is received, the distributed type remote I/O unit 2 generates the control signal described above, reads out data from the pulse counter, and inputs the data into an output data buffer in the distributed type remote I/O unit 2. Transmission data from the distributed type remote I/O unit 2 is a pulse counter value in case of the manual pulse generator interface, and a pulse counter value and a Z-phase counter value are transmitted to the basic system of the NC unit 1 in case of the synchronous pulse encoder interface.

Figure 25E:
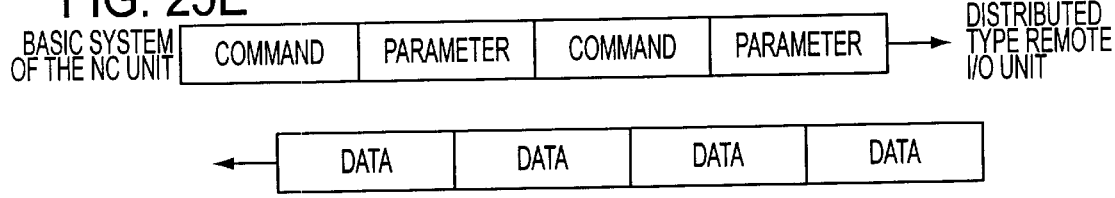

In case of a distributed type remote I/O unit 2 having general hardware, transmission data from the basic system of the NC unit 1 comprises, as shown in FIG. 25E, a command section and a parameter section. The parameter section is output data from the basic system of the NC unit 1, while the command section is a sequence number which can also be used as a reset signal, a read signal, a write signal, and an address signal.

Transmission data from the basic system of the NC unit 1 is outputted to a hardware circuit, and a result of the operation is transmitted to the basic system of the NC unit 1 with a data communication format comprising a status section and a parameter section.

Figure 25F:
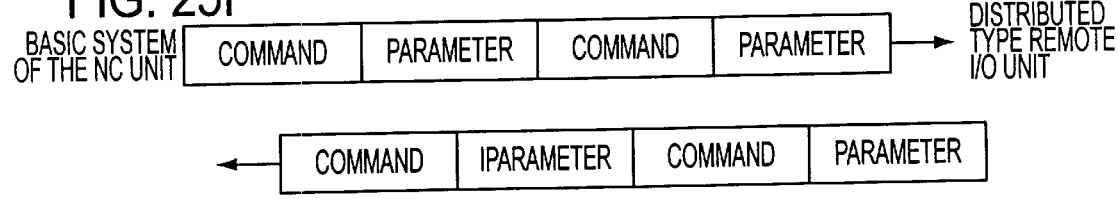

In a case where the distributed type remote I/O unit 2 is incorporated in a device having an MPU, as shown in FIG. 25F, transmission data from the basic system of the NC unit 1 comprises a command section and a parameter section. The parameter section is output data from the basic system of the NC unit 1 to the distributed type remote I/O unit 2, while the command section comprises a reset instruction, a read/write instruction and a sequence number of the distributed type remote I/O unit 2.

An MPU in the distributed type remote I/O unit 2 reads out transmission data from the basic system of the NC unit 1, incorporates the response data into a data communication format comprising a command section and a parameter section and outputs the data to the transmission buffer, and thus the distributed type remote I/O unit 2 transmits the data to the basic system of the NC unit 1.

FIG. 26A and FIG. 26B show a data format in the distributed type remote I/O unit 2 with an MPU and the detail respectively. FIG. 26A shows a format of transmission data (request) from the basic system of the NC unit, while FIG. 26B shows a format of receiving data (response) to the basic system of the NC unit 1. These data formats each comprise a command, a sequence number, and a parameter. The command comprises 4 bits, and up to 16 commands can be specified. As for transfer of serial data, a header address select command (command 1) is transmitted to specify a header address, and then a read command (command 2) or a write command (command 4) is successively transmitted, when an MPU in the distributed type remote I/O unit 2 automatically increments the specified address, and reads or writes data at the specified address, thus a plurality of data being read or written.

Whether successive read commands or write commands are being issued or not is determined by checking succession of 4-bit sequence number #1 or #2. This sequence number cyclically changes from 0 to F, and incremented by 1 in data transfer. For a write command, the distributed type remote I/O unit 2 cyclically receives data, so that the command and succession of the sequence number are checked, and if the sequence number has been incremented, it is determined that new data has been received, and the data is written at a specified address in a memory.

If the sequence number is the same as a previous one, the data is read and aborted. Then, a write response command, a received sequence number, and a status are transmitted to the basic system of the NC unit 1. If there is any fault in succession of the sequence numbers, a reset response command, the sequence number, and the error status are transmitted to the basic system of the NC unit 1.

For a read command, data is transmitted together with a read response command and the received sequence number to the basic system of the NC unit 1. Like in case of a write command, if succession of sequence numbers are confirmed, system operation is normal, and if there is any fault, a reset response command, the sequence number, and the error status are transmitted.

With the features, when data is outputted cyclically, successive data can be transmitted with high reliability.

It should be noted that, in case of communication with the distributed type remote I/O unit 2, if receiving frames are consumed out, the output is reset, but in response to this operation 0 is assigned to a reset command and a reset response command.

Also if no command is issued from the basic system of the NC unit 1 to the distributed type I/O unit 2, a no-operation command (command F) is transmitted from the basic system of the NC unit 1 to the distributed type remote I/O unit 2, and the distributed type remote I/ unit 2 transmits a no-operation command response to the basic system of the NC unit 1.

2-byte data communications can be executed with one communicating operation between the basic system of the NC unit 1 and the distributed type remote I/O unit 2 with an MPU using the above-described read command and write command, and also successive data can be transmitted or received by successively transmitting the commands.

With the operations above, the basic system of the NC unit 1 can control a hardware circuit added to the distributed type remote I/O unit 2 by determining a type of the distributed type remote I/O unit 2 by means of checking ID code thereof and transmitting a command corresponding to a type of the distributed type remote I/O unit 2. With this, different types of I/O can be connected through one communication line, and the basic system of the NC unit 1 having the distributed type remote I/O unit 2 can be constructed at a low cost.

Figure 27:
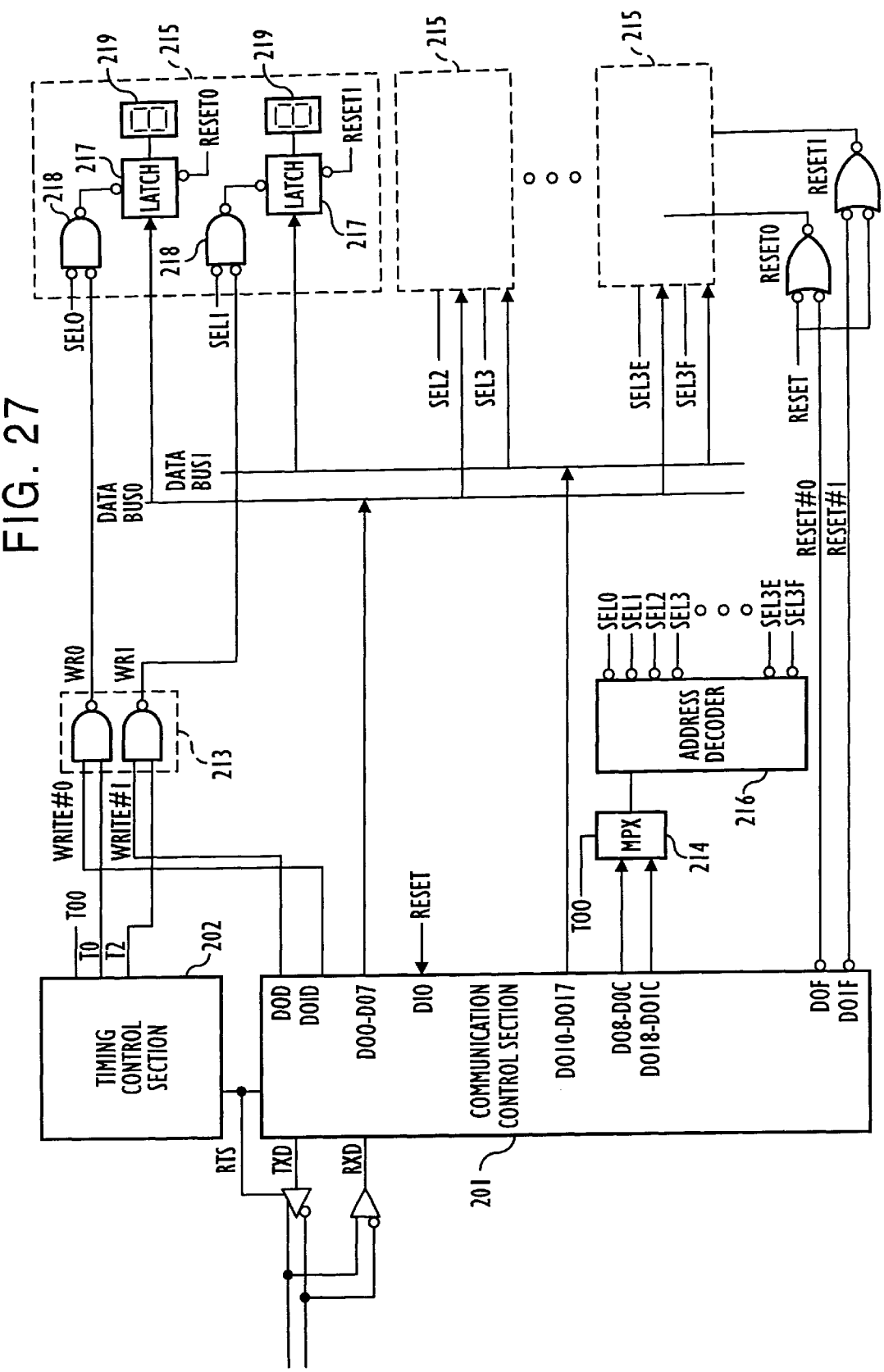
FIG. 27 is a block diagram showing a displayed data output circuit for the display unit connected to the distributed type remote I/O unit in the distributed type remote I/O control system in which the control method according to the present invention is implemented.

FIG. 27 shows an embodiment of a displayed data output circuit for a display unit connected to the distributed type remote I/O unit 2. The displayed data output circuit comprises a logic circuit 213 for generating a write signal for latching displayed data, a multiplexer 214 for selecting a displayed address, and an address decoder 216 for selecting the display unit 215. The display unit 215 comprises a latch circuit 217, a logic section 218, and a segment display section 219.

Transmission data (Request) transmitted with a format for display data output shown in FIG. 25B from the basic system of the NC unit 1 is received by the communication control section 201, and the displayed data is outputted for signals for DO 0 to DO 7 as well as DO 10 to DO 17 in the communication control section 201.

Addresses in command data are outputted as signals for DO 8 to DOC as well as DO 18 to DO1C, and inputted to the address decoder 216 through the multiplexer 214 by time division according to a T 00 signal outputted from the timing control section 202. The address decoder 216 generates select signals SEL 0 to SEL 3F for the display segments.

Each display unit 215 inputs select signals SEL 0 to SEL 3F and write signals WR 0 and WR 1 generated in the logic section 213 to the logic section 218 to latch the displayed data in the latch circuit 217 and make the segment display section 219 display the data.

In this embodiment, displayed data can be rewritten by up to 4 letters with transmission data in one transmission cycle, and the basic system of the NC unit 1 selects an address and successively updates data at a specified cycle, so that data display with maximum 64 letters can be executed.

When display is to be reset, a reset bit in the command section for transmission data is set, so that reset signals RESET 0 and 1 are outputted from DOF and DO1F in the communication control section 201, and the display can be reset.

When a reset switch is added to the display unit 215, with a reset request signal (RESET), display on the display unit can be reset like in a case of a reset signal (RESET #0 and #1) outputted from D0F and D01F in the communication control section 201. Furthermore with display being reset by the reset switch, this reset request signal (RESET) is inputted from D10 in the communication control section 201, and can be transmitted as transmission data (response) indicating a status to the basic system of the NC unit 1.

With operations as described above, software in the basic system of the NC unit 1 is required only to write control command and display data in the latch circuit 301 in the basic system of the NC unit like in aa case where a display unit is directly connected to the data bus in the MPU and without being aware of operations for transmitting displayed data through serial communication, then the commands and data are transmitted by hardware to the distributed type remote I/O unit 2 through serial communication, and furthermore output data from the distributed type remote I/O unit 2 is displayed on the display unit 215, so that software in the basic system of the NC unit 1 is not required to execute a specific operation for outputting data using the distributed type remote I/O unit 2, so that a software processing can be simplified.

Also, a reset of display can be executed by a reset switch added to the display unit, and software in the basic system of the NC unit 1 can read out data for input of displayed reset as a status of the display unit without being aware of operations for receiving data through serial communication, so that the software processing can be simplified.

Figure 28:
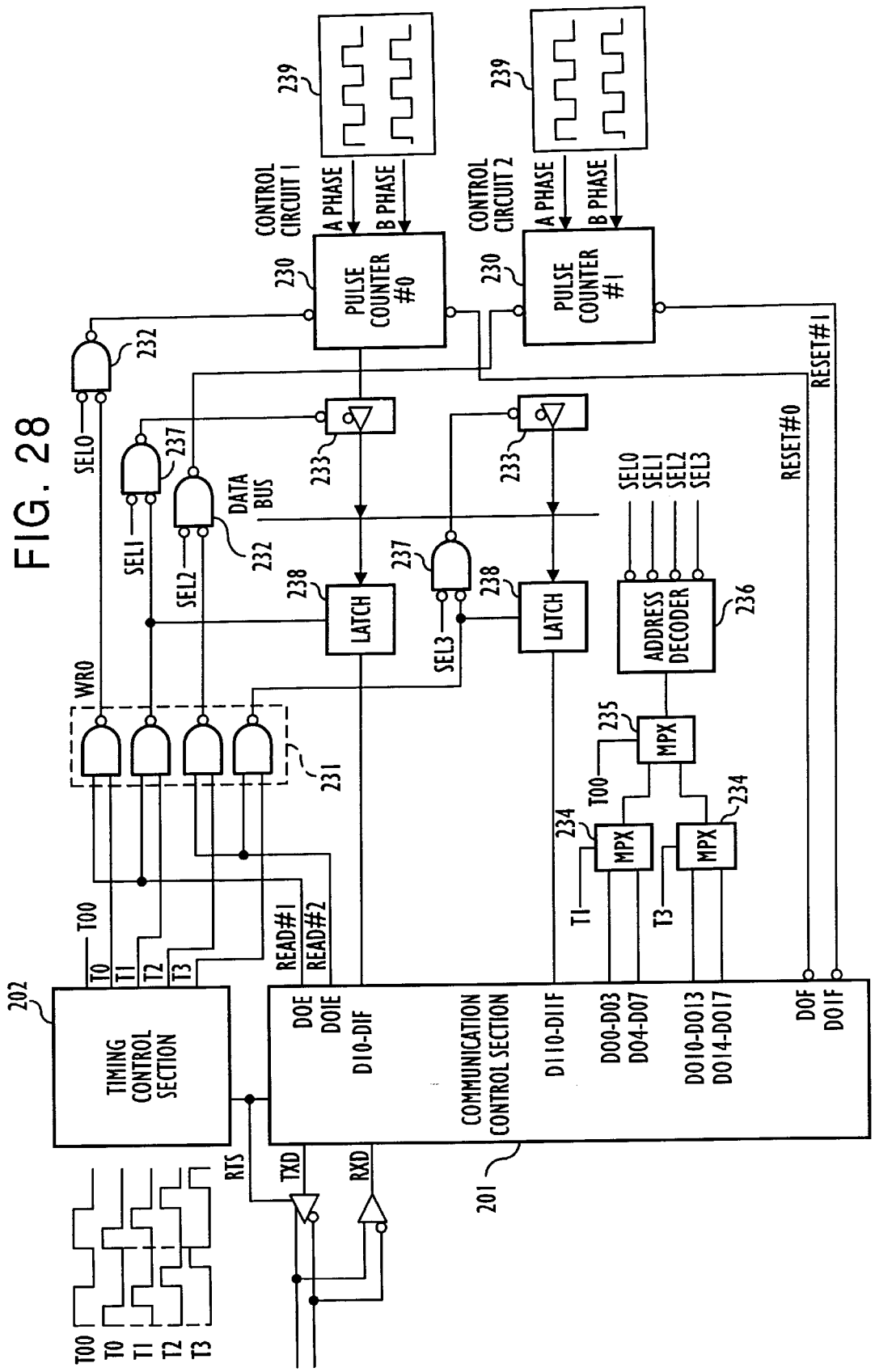
FIG. 28 is a block diagram showing an interface circuit for the manual pulse generator connected to the distributed type remote I/O unit in the distributed type remote I/O control system in which the control method according to the present invention is implemented.

FIG. 28 shows an interface circuit for a manual pulse generator connected to the distributed type remote I/O unit 2. This interface circuit comprises a logic circuit 231 for generating a write signal pulse; a logic circuit 232 for generating a signal for latching a pulse count value of the pulse counter 230; a multiplexer 234 for switching between latch addresses (DO 0 to DO 3 or DO 10 to DO 13) of the pulse counter 230 and addresses (DO 4 to DO 7 or DO 14 to DO 17) of the data buffer 233; a multiplexer 235 for switching between addresses (DO 0 to DO 7) of the pulse counter #0 and addressed (DO 10 to DO 17) of the pulse counter #1; an address decoder 236 for preparing a select signal from the address signal transmitted from the multiplexer 235; a logic section 237 for generating a control signal for the data buffer 233 out of the select signal and read pulse; and a latch circuit 238 for latching data of the pulse counter 230.

The pulse counter 230 counts a number of rotations of the manual pulse generator 239 by counting a number of pulses from two pulse arrays of phase A and phase B, which are different phases from each other, outputted from the manual pulse generator 239. Data for this count is read out to the data buffer 233.

In this interface circuit, data transmitted with the format for the manual pulse generator I/F shown in FIGS. 25A to 25F from the basic system of the NC unit 1 is received by the communication control section 201, and the communication control section 201 outputs data for addresses #10, #11, #20, #21 as address signals from DO 0 to 3, DO 4 to 7, DO 10 to 13, DO 14 to 17. Also the communication control section 201 outputs signals for READ #1 and #2, RESET #0 and #1 as data for the command section.

The pulse counter 230 counts a number of rotations of the manual pulse generator 239 by counting a number of pulses from two pulse arrays of A phase and B phase, which are different from each other, outputted from the manual generator 239. These count values are always counted according to change in phase A and phase B. For instance, a value of pulse counter #0 is latched at timing of T0 in the timing control section 201, outputted to DATA BUS consisting of 8 bits through the data buffer 233 at the timing of T1, and furthermore, a value of pulse counter #1 latched in the latch circuit 238 is processed also at the timing of T2 and T3.

Data in the pulse counter 230 latched to the latch 238 is inputted from DI0 to DIF and DI10 to DI1G in the communication control section 201 according to the timing specified by the control section 202, and transmitted with the data format as shown in FIG. 25C to the basic system of the NC unit 1.

A value of the pulse counter in the distributed type remote I/O unit 2 is read out from the basic system of the NC unit 1 at a specified cycle and a difference between this data and previous data is computed, so that the basic system of the NC unit 1 can detect an instruction value (a number of pulses) inputted from the manual pulse generator 239.

Also when the pulse counter 230 is initialized, reset bits in the command section are set, so that reset signals for RESET 0 and 1 are outputted from DOF and DO1F in the communication control section 201, and pulse counters #0 and #1 can be reset respectively.

In this interface circuit, data from the two manual pulse generators 239 is included in the communication data format, so that two units of manual pulse generators can be connected to one unit of distributed type remote I/O unit.

As described above, data for the pulse counter is cyclically transmitted to the basic system of the NC unit 1, and software in the basic system of the NC unit can read out data updated cyclically likely in a case where a pulse counter interface is directly connected to the data bus in the MPU 101 without being aware of operations for receiving data through serial communication by means of reading out data from the latch circuit 401 in the basic system of the NC unit 1.

With this feature software in the basic system of the NC unit 1 is not required to execute a specific operation to input data using the distributed type remote I/O unit 2, so that the software processing can be simplified.

Figure 29:
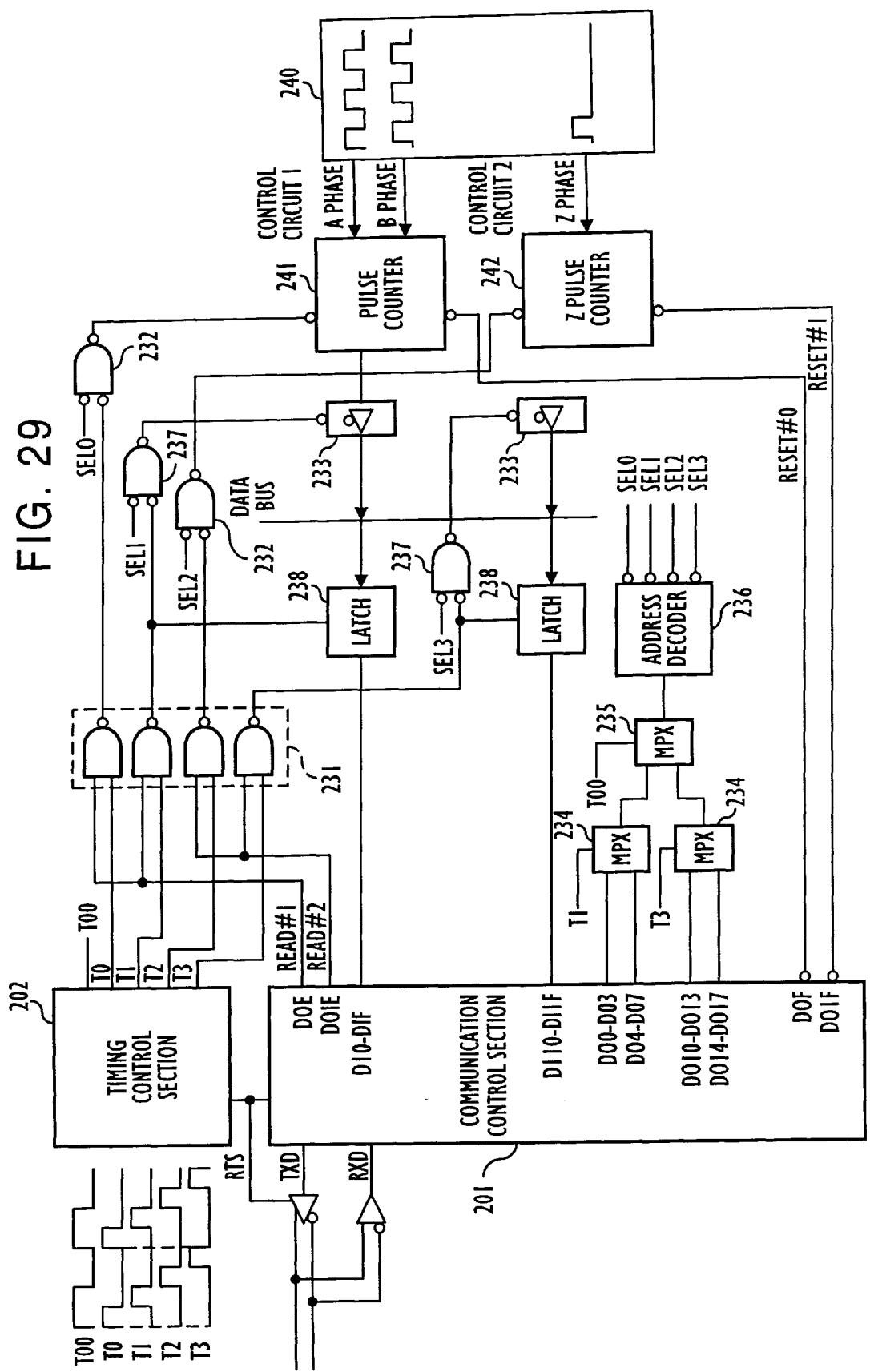
FIG. 29 is a block diagram showing an interface circuit for the synchronizing encoder connected to the distributed type remote I/O unit in the distributed type remote I/O control system in which the control method according to the present invention is implemented.

FIG. 29 shows an interface circuit for a synchronizing encoder connected to the distributed type remote I/O unit 2. Provided in the interface circuit are a pulse counter 241 for counting two pulse arrays of A phase and B phase, which are different from each other, outputted from the synchronizing encoder 240, and a Z phase counter 242 for counting a pulse indicating a rotation outputted from the synchronizing encoder 240. In other words, the Z pulse counter 242 is a counter to count Z phase pulses outputted from the synchronizing encoder 240 at each rotation.

These counters 241 and 242 are equivalent to the two pulse counters 230 in the interface circuit shown in FIG. 28, and they are constructed like that shown in FIG. 28 excluding the matter described above.

In this interface circuit, data transmitted from the basic system of the NC unit 1 according to a format for the synchronizing encoder I/F shown in FIG. 25D is received by the communication control section 201, and the communication control section 201 outputs data for addresses #10, #11, #20, #21 as address signals from DO 0 to 3, DO 4 to 7, DO 10 to 13, DO 14 to 17. Also the communication control section 201 outputs signals for READ #1 and #2, RESET #0 and #1 as data for the command section. Circuit operations are the same as those in the manual pulse generator I/F described above.

When reading out a pulse counter value of a synchronizing encoder I/F, it is necessary to simultaneously read out values of the pulse counter 241 in A/B phase and those of the pulse counter 242 in Z phase. In this circuit, a A/B phase counter value and a Z phase counter value are transmitted with the format for transmission data (response) shown in FIG. 25D to the basic system of the NC unit 1.

The basic system of the NC unit 1 reads out two counter values described above at a specified cycle and computes a difference between this data and the previous one, so that a transfer value (a number of pulse)inputted from the synchronizing encoder 240 can be detected.

Figure 30:
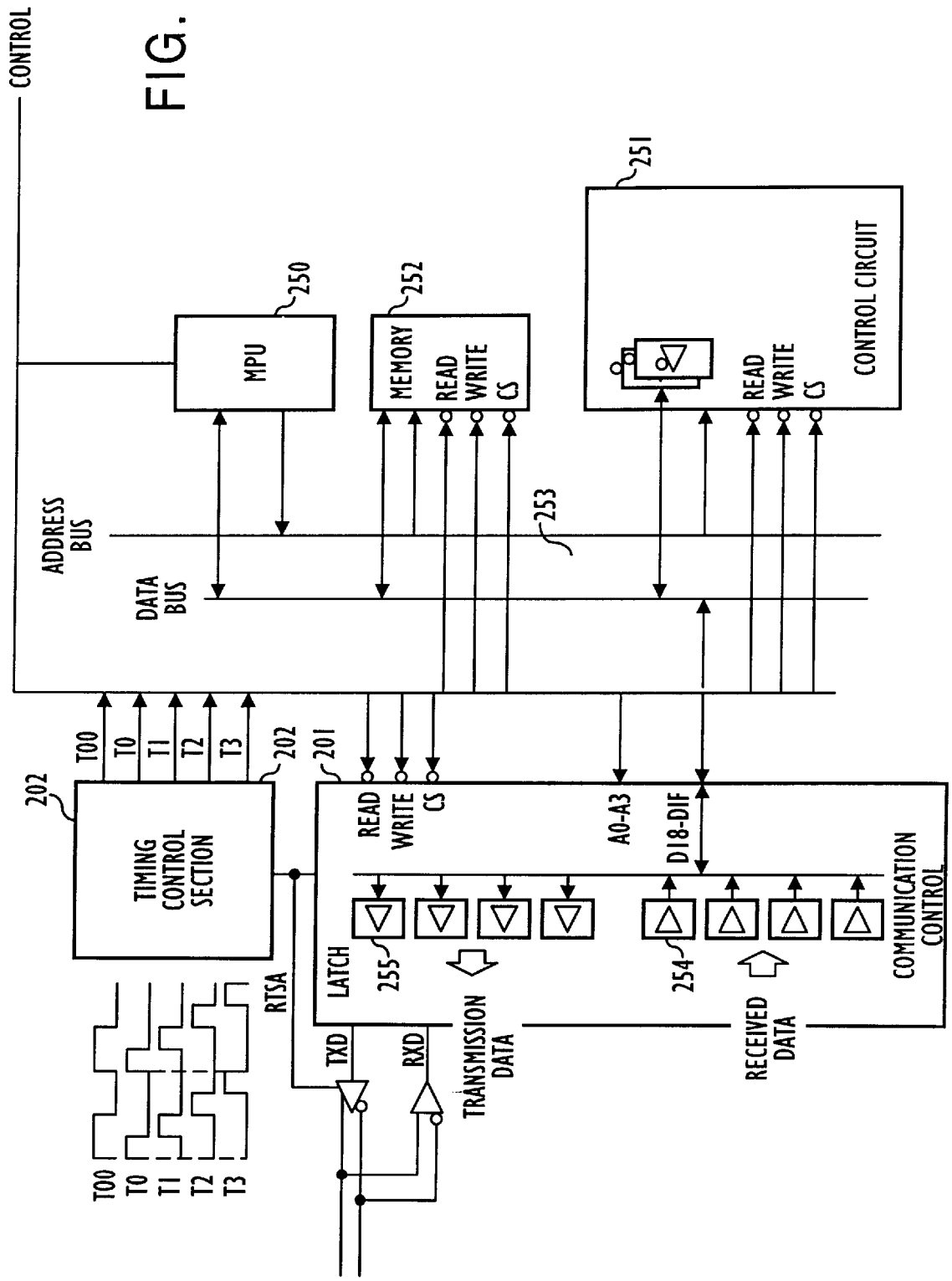
FIG. 30 is a block diagram showing an interface circuit for the distributed type remote I/O unit with an MPU in the distributed type remote I/O control system in which the control method according to the present invention is implemented.
Figure 31:
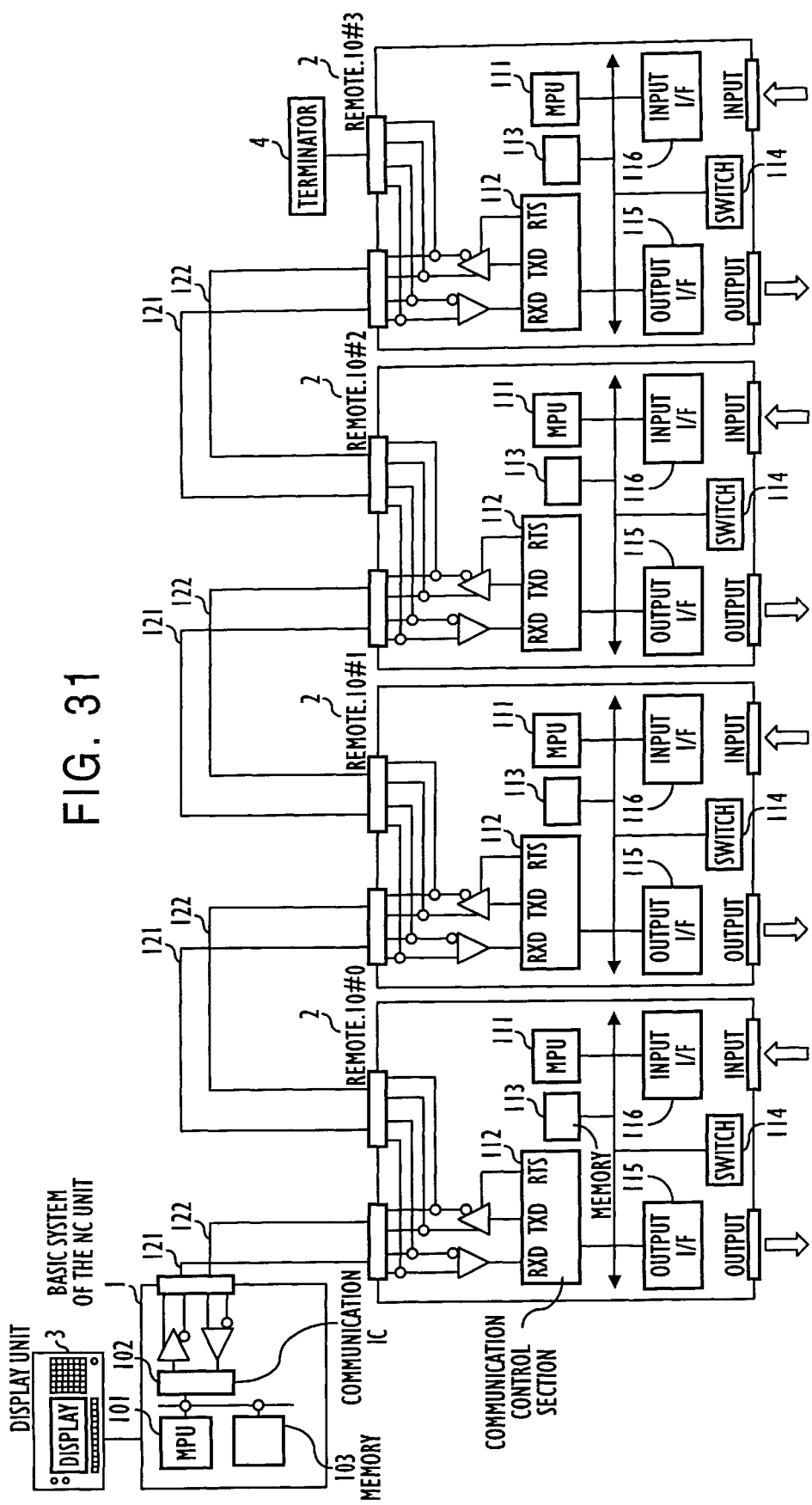
FIG. 31 is a block diagram showing an example of the conventional type of distributed type remote I/O control system.
Figure 32:
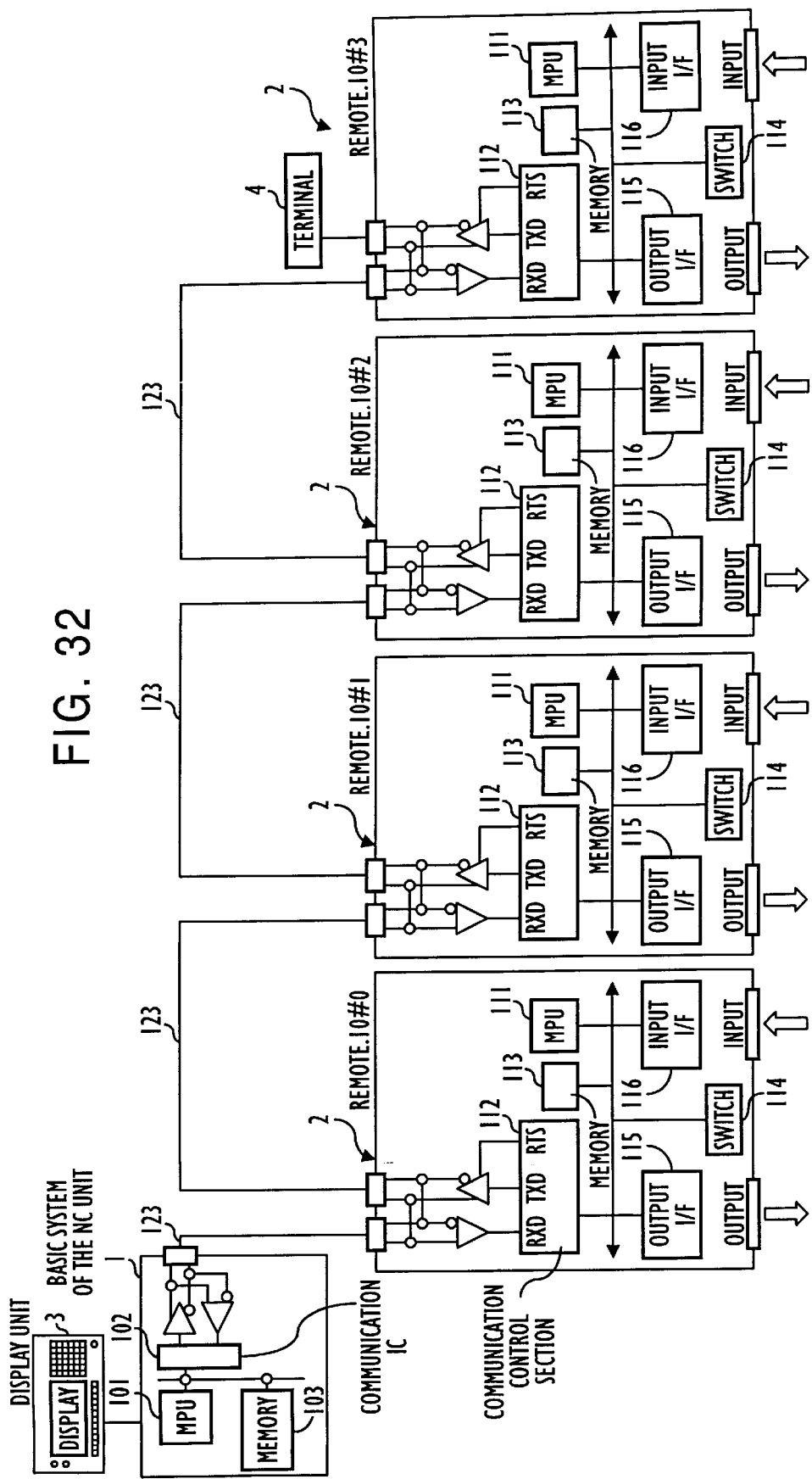
FIG. 32 is a block diagram showing another example of the conventional type of distributed type remote I/O control system.
Figure 33:
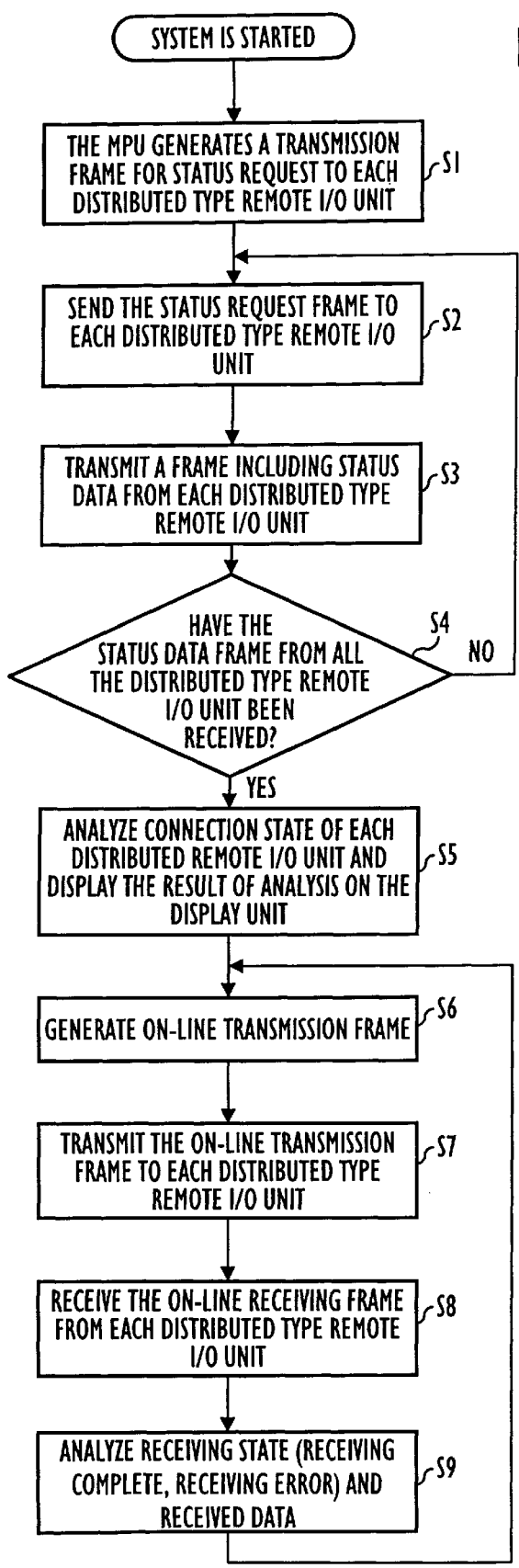
FIG. 33 is a flow chart showing an operating flow in the basic system of the NC unit in the conventional type of distributed type remote I/O control system.
Figure 34:
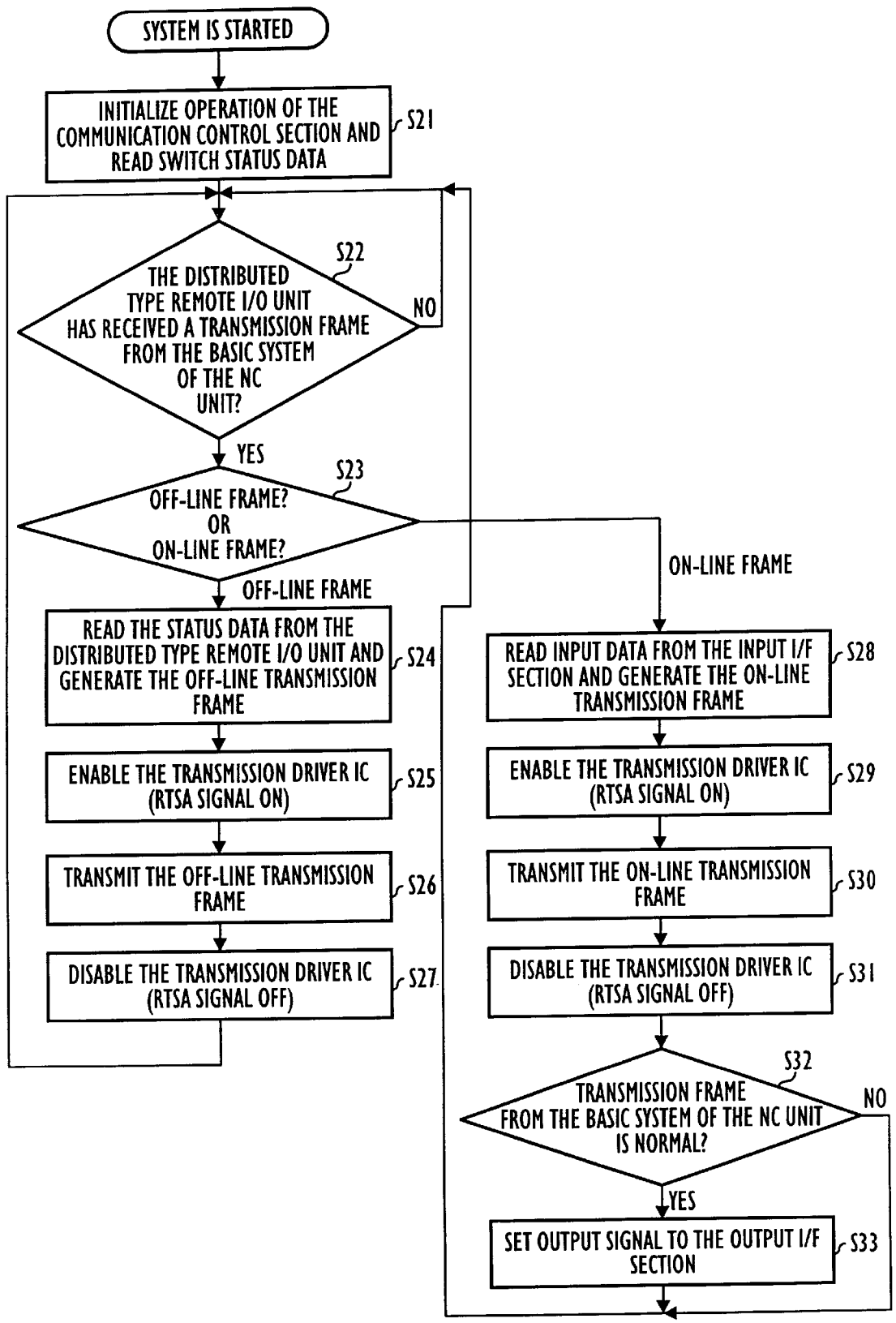
FIG. 34 is a flow chart showing an operating flow in the distributed type remote I/O unit in the conventional type of distributed type remote I/O control system.

FIG. 30 shows an interface circuit for the distributed type remote I/O unit with an MPU. The interface circuit has an MPU 250, a control circuit 251 controlled by MPU 250, and a memory 252 comprising a memory (ROM) for storing a system program for MPU 250 and a memory (RAM) for storing a computing result of MPU 250.

In this interface circuit, DI 18 to DI 1F in the communication control section 201 are connected to the data bus 253 in the MPU 250, and the MPU selects an internal register according to an address signal (A0 to A3), the communication control section 201 reads out received data from the received data buffer 254 and also writes data to the write register 255 for transmission data, so that the data can be transmitted with the format for transmission data (response) as shown in FIG. 25F to the basic system of the NC unit 1.

The MPU 250 operates according to the system program stored in the memory 252, and gets access cyclically to the received data buffer 254 to read out data comprising commands and parameters transmitted with the format for transmission data (response) shown in FIG. 25F from the basic system of the NC unit 1.

The MPU 250 executes reads out data from and writes data into the memory 252 in response to a command and provides controls with the control circuit 251, and furthermore writes a result of execution into the write register 255 in the communication control section 201 with the format for transmission data (Response) shown in FIG. 25F. The communication control section 201 synchronizes to a transmission timing and transmits data in the write register 255 to the basic system of the NC unit 1.

With the processing sequence described above, the PUS 250 each in the basic system of the NC unit 1 and the distributed type remote I/O unit 2 execute requests and response according to commands and parameters via the communication control section 201.

Also, when a distributed type remote I/O unit 2 with an MPU is the basic system of the NC unit 1, a plurality of basic system of the NC units 1 can be connected to each other according to the transmission control system in the distributed type remote i/O unit 2. In the distributed type remote I/O unit 2 with an MPU, the distributed type remote I/O unit 2 itself can be used as the NC unit in the slave unit with software according to execution of a program by the MPU, and with this feature a distributed type of the NC system can be constructed.

The basic system of the NC unit 1, when power is turned on, automatically enters a mode for monitoring a status of each distributed type remote I/O unit 2, and also automatically transmits a communication frame having data for noticing that the current operating mode is in the off-line status communication mode for a specified period of time without being involved by the MPU 101 in the basic system of the NC unit 1 to each distributed type remote I/O unit 2. This communication frame is the same as that in the on-line communication mode excluding the header pattern. The fact that the communication frames for the two modes excluding a header pattern for each are identical to each other makes it possible for the communication control section in the basic system of the NC unit 1 and the distributed type remote I/O unit 2 to be realized with a simple configuration.

In each distributed type remote I/O unit, as long as a header pattern of a communication frame transmitted from the basic system of the NC unit 1 indicates the off-line communication mode, ID data of each distributed type remote I/O unit is transmitted to the basic system of the NC unit 1. Included in the ID data is status code indicating a type of the distributed type remote I/O unit, and the communication control section in the basic system of the NC unit 1 stores the status code sent from the distributed type remote I/O unit 2 and the MPU in the basic system of the NC unit 1 reads out the stored code to obtain data for a type of each distributed type remote I/O unit 2 and display the data on the display unit 3 provided in the basic system of the NC unit 1.

In the basic system of the NC unit 1, after transmitting a transmission frame to a particular distributed type remote I/O unit 2, when a receiving flow chart with a particular format is received before the transmission frame is transmitted to the next distributed type remote I/O unit 2, it is recognized as receiving from the corresponding distributed type remote I/O unit. If not received, it is determined that corresponding distributed type remote I/O unit 2 is not packaged therein, and this fact is displayed on the display unit 3 in the basic system of the NC unit 1.

When connection data for the distributed type remote I/O unit 2 preset in a memory section is different from a result of checking for a response frame by each distributed type remote I/O unit 2, the basic system of the NC unit 1 determines that the units are impossible to operate as a system, and displays an alarm on the display unit 3 indicating that the system does not shift to the on-line communication mode.

If connection data for the distributed type remote I/O unit preset in the memory section is identical to a result of checking for a response frame by each distributed type remote I/O unit 2, the basic system of the NC unit 1 shifts to the on-line communication mode and transmits control data with the specified format for communication data corresponding the type of the remote I/O unit to each distributed type remote I/O unit 2.

Each distributed type remote I/O unit 2 outputs transmission data comprising commands and parameters transmitted from the basic system of the NC unit 1 to an output control hardware circuit, and executes specified operations. Also it writes data to be transmitted to the basic system of the NC unit 1 into the transmission buffer.

In the distributed type remote I/O unit with an MPU, when successive data is transmitted or received through a plurality of communication cycles, a command section comprising commands and sequence numbers added thereto cyclically to change is transmitted with data, so that the content of data can be differentiated.

The communication control section in each distributed type remote I/O unit 2 synchronizes to the timing of completion of receiving the frame which the basic system of the NC unit 1 transmits to the unit, and enables the transmission driver IC with a specified time margin, then executes transmission to the basic system of the NC unit 1 with the specified time margin, and after transmission is complete, disables the transmission driver IC also with the specified time margin, and then the system returns to a state of waiting for receiving.

If a state where operations for writing transmission data from the MPU 101 in the basic system of the NC unit 1 and reading out received data are not detected continues for a specified period of time, the communication control section in the basic system of the NC unit 1 recognizes the basic system of the NC unit as in fault and stops transmission by turning off the transmission driver IC to the distributed type remote I/O unit 2.

In the communication control section in the distribute type remote I/O unit 2, a receiving start state from the basic system of the NC unit is monitored, and if the state where the receiving start state is not detected continues for a specified period of time, the communication control section in the distributed type remote I/O unit 2 recognizes that some trouble has occurred therein and resets output from the distributed type remote I/O unit 2.

As described above, in the control method for a distributed type remote I/O control system according to the present invention, a transmission frame between the basic system of the control unit and the distributed type remote I/O unit in an on-line communication mode is different from that in off-line status communication, the basic system of the control unit can recognize a type of the distributed type remote I/O unit in the off-line status communication, and the system always operates in an off-line status communication mode whenever operation of the system is started, so that abnormal operation in the system can be prevented without fail. Also the basic system of the control unit can execute an I/O control corresponding to a type of the distributed type remote I/O unit in the on-line communication mode thereafter, and types of the distributed type remote I/O units can be increased, so that system configuration corresponding to a machine which is an object to be controlled can flexibly be constructed.

Also a type of the distributed type remote I/O unit can automatically be stored in the communication control section of the basic system of the control unit in the off-line status communication mode regardless of an operation of an MPU in the basic system of the control unit, so that a connection state of the system can quickly be recognized, thus control corresponding to the system can be executed more quickly.

In another control method for the distributed type remote I/O control system according to the present invention, when the system is started, the operator of the basic system of the control unit can easily check a connecting state of the distributed type remote I/O unit, and a type of the connected distributed type remote I/O unit, and also the system can be started automatically in an off-line status communication mode without depending on a software in the basic system of the control unit, so that an incorrect output to the distributed type remote I/O unit can be avoided before its occurring when incorrectly connected, which makes it possible to construct a system with high reliability.

In the off-line status communication mode, data transmitted from the basic system of the control unit is not used in the distributed type remote I/O unit, so that even if a MPU transmits output data by mistake when communication is started, the output data is not outputted from the distributed type remote I/O unit, which makes it possible to construct a system with high reliability.

In another control method for the distributed type remote I/O control system according to the present invention, configuration of a transmission frame transmitting from the basic system of the control unit to the distributed type remote I/O unit in the off-line status communication mode is the same as that in the on-line communication mode, and switching between an off-line status communication mode and an on-line communication mode is executed according to a difference of a header pattern, so that circuit configuration each for the basic system of the control unit and the distributed type remote I/O unit becomes more simple.

Also in the off-line status communication mode, an output from the distributed type remote I/O unit can be executed like in the on-line communication mode, so that the on-line mode can temporarily be changed to the off-line status communication mode during operation of the system to monitor a connection state and a type of the distributed type remote I/O unit, and then the data can be displayed in the display unit of the basic system of the control unit.

The difference of a header pattern is detected, and a signal for switching between the off-line status communication mode and the on-line communication mode is outputted, so that switching between an ordinary input and a status input inputted to the data selector IC can be executed according to a mode switching signal, which makes it possible to simply realize circuit configuration for the distributed type remote I/O unit.

In another control method for the distributed type remote I/O control system according to the present invention, the communication control section in the basic system of the control unit automatically selects the off-line status communication mode after system power ON, and automatically transmits successively transmission frames for a status request to the distributed type remote I/O units, so that the MPU in the basic system of the control unit is required only to execute processing for checking status in each distributed type remote I/O unit fetched into the communication control section, and for this reason a software processing for the basic system of the control unit becomes more simple.

Also the mode switching to a transmission frame for status request is executed by means of synchronizing to a first one of the distributed type remote I/O units, so that, in the basic system of the control unit, it is possible to prevent an ordinary input from being mistaken for a status.

In another control method for the distributed type remote I/O control system according to the present invention, a control program for the basic system of the control unit corresponding to an actual machine is compared to a connection state of the distributed type remote I/O unit, and if a result of the comparison indicates that the two are not identical, the system operation does not generate, which means an alarm therefor, so that a distributed type remote I/O unit system with higher reliability can be constructed.

In another control method for the distributed type remote I/O control system according to the present invention, a received data memory means in the communication control section of the basic system of control unit is used in both the off-line status communication mode and the on-line communication mode, so that configuration of the communication control section can be simplified.

In another control method for the distributed type remote I/O control system according to the present invention, when the basic system of the control unit is stops its system operation for some reason or other, the basic system of the control unit detects the fact that the system is stopped as a watch dog by a timer in the internal the basic system of the control unit, and a transmission signal from the basic system of the control unit to the distributed type remote I/O unit is turned OFF according a watch dog state signal, so that if the distributed type remote I/O unit does not detect start of receiving of a transmission frame from the basic system of the control unit for a specified period of time, an output is reset, and for this reason, when the basic system of the control unit enters an abnormal state, a machine control signal can be reset, which makes it possible to construct a system with high reliability.

Also as a receiving start system can be detected, when the system operation is stopped during transmission from the basic system of the control unit, or even if such a trouble as cable separation or breaking of wire occurs,-output from the distributed type remote I/O unit can surely be reset, and a system with high reliability can be constructed.

In another control method for the distributed type remote I/O control system according to the present invention, the basic system of the control unit detects that a system program in the basic system of the control unit does not normally operate, and output from the distributed type remote I/O unit can surely be reset, and for this reason also in this case a system with high reliability can be constructed.

In another control method for the distributed type remote I/O control system according to the present invention, with a hardware timer in the distributed type remote I/O unit, a frame transmission to the basic system of the control unit is controlled, so that a software sequence that an MPU in the conventional type of the distribute type of the control unit checks completion of receiving of a frame transmitted from the basic system of the control unit and transmits it to the basic system of the control unit is not required, and for this reason system construction can be made easier.

Software in the basic system of the control unit can read out data in the external devices through the distributed type remote I/O unit, so that the software in the basic system of the control unit can read out data like in a case where an external device is directly connected to the data bus in the MPU by writing commands and parameters into a transmission buffer in a distributed type remote I/O unit and then reading out the data in the receiving buffer in a specified period of time countered by a hardware timer without being aware of any specific operation for receiving data by means of serial communications. From the fact described above, a particular processing of inputting data by using the distribute type remote I/O unit is not required to the software in the basic system of the control unit, and a software processing in the basic system of the control unit becomes more simple.

In another control method for the distributed type remote I/O control system according to the present invention, the communication control section in the distributed type remote I/O unit does not execute transmission to the basic system of the control unit when a transmission frame from the basic system of the control unit is not received, so that the basic system of the control unit can determine without fail whether the distributed type remote I/O unit is packaged or not.

In another control method for the distributed type remote I/O control system according to the present invention, the distributed type remote I/O unit does not update an output signal when an error is detected during receiving of a frame transmitted from the basic system of the control unit thereto, so that reliability of the communication path against noise environment is improved.

In another control method for the distributed type remote I/O control system according to the present invention, if times when a header pattern for a transmission frame from the distributed type remote I/O unit indicates an error of a transmission frame from the basic system of the control unit exceed a specified value, it is recognized that a system fault has occurred and operation of the system is stopped, and for this reason reliability to the system is improved.

In another control method for the distributed type remote I/O control system according to the present invention, input and output of the distributed type remote I/O unit in the basic system of the control unit are finally connected through a cable to load-dispatching board in the machine side, and in this case sometimes meaning of a signal may be decided according to a pin correspondence in a connector for cable connection of the distributed type remote I/O unit, and in such a case, easy response can be made to various types of machines by switching data array to a big endian system or a little endian system. Also, with this configuration, the distributed type remote I/O unit can be connected to the basic system of the control unit without being restricted by the endian system of an MPU in the basic system of the control unit.

In another control method for the distributed type remote I/O control system according to the present invention, the basic system of the control unit can easily check that output data to the distributed type remote I/D unit has been transmitted normally and transmission from the distributed type remote I/O unit to the basic system of the control unit has also been executed normally, so that a system test can easily be carried out.

In another control method for the distributed type remote I/O control system according to the present invention, as an MPU can be added to the distributed type remote I/O unit, the distributed type remote I/O unit can also be used in other applications such as, for instance, an I/O unit device in a basic system of a control unit, input/output of an operating panel signal for a basic system of a control unit, or I/O devices such as a paper tape reader, and a paper tape puncher, which means expansion of a scope of applications thereof.

It should be noted that, even if an MPU is added to the distributed type remote I/O unit, different from the conventional technology, communication between the basic system of the control unit and the distributed type remote I/O unit is automatically executed, so that the software processing by the MPU becomes easier.

In another control method for the distributed type remote I/O control system according to the present invention, the distributed type remote I/O unit has an interface function for an analog input/output, so that an analog voltage output for a simple driving control system such as a transfer line or an analog voltage in a sensor or the like can be measured, which allows expansion of a scope of applications thereof as a system.

In another control method for the distributed type remote I/O control system according to the present invention, a test of a system comprising the basic system of the control unit and a plurality of distributed type remote I/O units can easily and surely be made.

In another control method for the distributed type remote I/O control system according to the present invention, the basic system of the control unit determines a type of the distributed type remote I/O unit by checking ID code, and a hardware circuit added to the distributed type remote I/O unit can be controlled by means of transmitting a command corresponding to a type of the distributed type remote I/O unit, so that various types of I/O units can be connected thereto through a communication line, and for this reason a basic system of the control unit having a distributed type remote I/O unit can be constructed cheaply.

In another control method for the distributed type remote I/O control system according to the present invention, data display on the display unit of the distributed type remote I/O unit is executed only by means of writing a control command and displayed data into the transmission buffer in the basic system of the control unit, so that software in the basic system of the control unit can display data on the display unit of the distributed type remote I/O unit like in a case where the display unit is directly connected to the data bus of the MPU without being aware of a particular operation of transmitting the display data to the distributed type remote I/O unit by means of serial communication.

For this reason, such a particular processing as outputting data by using the distributed type remote I/O unit is not required to the software in the basic system of the control unit, which makes a software processing more simple.

In another control method for the distributed type remote I/O control system according to the present invention, software in the basic system of the control unit can read out data for a number of pulses outputted from the manual pulse generator and synchronizing encoder through the distributed type remote I/O unit; and if software in the basic system of the control unit writes a command and parameters for request for data read only once into the transmission buffer in the basic system of the control unit, this command is cyclically outputted according to the hardware processing according to a communication cycle of the distributed type remote I/O unit; the distributed type remote I/O unit outputs control signal data received through the hardware processing to the pulse counter circuit for the manual pulse generator and synchronizing encoder, and transmits it to the basic system of the control unit after a specified period of time from its reception, so that data for the pulse counter is cyclically transmitted to the basic system of the control unit; and the software of the basic system of the control unit can read out data cyclically updated like in a case where an pulse counter interface is directly connected to the data bus of MPU without being aware of such an operation as receiving data through serial communication by means of reading out data from the received buffer in the basic system of the control unit. With this configuration, such a particular processing as inputting data by using the distributed type remote I/O unit is not required to the software for the basic system of the control unit, which makes a software processing more simple.

In another control method for the distributed type remote I/O control system according to the present invention, transmission data comprising a command section including a header patter as well as a sequence number section cyclically changing and a parameter section is transmitted from the basic system of the control unit to the distributed type remote I/O unit with an MPU, the distribute type remote I/O unit interprets the command section of received data and arrays data in the parameter section according to the order of sequence numbers, so that a series of data can be transmitted with higher reliability from the basic system of the control unit in the master unit to the basic system of the control unit in the slave unit by using the communication system of the distributed type remote I/O unit outputting data cyclically.

In another control method for the distributed type remote I/O control system according to the present invention, the distributed type remote I/O unit with an MPU generates response data consisting of a command section and a parameter section as response data to the received command, the received command and sequence number are assigned to the command section so that the basic system of the control unit can recognize to which command the received data corresponds as a response, and data in the parameter section is arrayed according to the sequence number so that the distributed type remote I/O unit can execute data transfer sequentially to the basic system of the control unit, and for this reason a series of data can be transmitted with higher reliability from the basic system of the control unit in the slave unit to the basic system of the control unit in the master unit through the use of the communication system of the distributed type remote I/O unit outputting data cyclically.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A distributed type remote I/O control system comprising:
   a control unit;
   at least one distributed type remote I/O unit; and
   a serial communication link connecting said control and said remote I/O unit, wherein said distributed type remote I/O unit monitors said serial communication link units to detect a start of reception of transmission frames from said control unit, and automatically resets an output from said distributed type remote I/O unit if said start of reception of transmission frames from said control unit is not detected within a specified period of time.

2. A distributed type remote I/O control system according to claim 1, wherein said control unit comprises a communication control section and an MPU which writes in said communication control section transmission data to be transmitted to said distributed type remote I/O unit and reads from said communication control section transmission received data from said distributed type remote I/O unit, and in case where transmitted data is not written to or received data can not be read from said communication control unit for a specified period of time, recognizes the state as a system fault, stops transmission to said distributed type remote I/O unit, and causes said distributed type remote I/O unit to reset said output.

3. A a distributed type remote I/O control system according to claim 1, wherein said distributed type remote I/O unit further comprises a hardware counter, wherein when a header pattern contained in a transmission frame from said control unit is a pattern corresponding to a switch for setting a unit number of each distributed type remote I/O unit, said distributed type remote I/O unit recognizes the transmission frame as being intended for said distributed type remote I/O unit, and after reception of said frame is complete, said distributed type remote I/O unit starts transmission of said transmission frame to said basic system of the control unit after a lapse of a specified time counted by said hardware timer.

4. A distributed type remote I/O control system according to claim 1, wherein said distributed type remote I/O unit executes frame transmission to said control unit after detecting completion of reception of a frame transmitted from said control unit to the distributed type remote I/O unit, and does not execute frame transmission to said control unit if the distributed type remote I/O unit does not detect completion of reception of a transmission frame.

5. A distributed type remote I/O control system according to claim 1, wherein said distributed type remote I/O unit provides error control of transmission frames when a frame is received from said control unit, and when an error is detected, said distributed type remote I/O unit switches and transmits a header pattern of a transmission frame to said control unit without updating an output signal from said distributed type remote I/O unit, and said control unit detects said error from a header pattern of a transmission frame and recognizes that an error has occurred in a frame transmission from said control unit to said distributed type remote I/O unit.

6. A a distributed type remote I/O control system according to claim 5, wherein if the number of times that a header pattern of a transmission frame from said distributed type remote I/O unit indicates an error of a transmission frame from said control unit exceeds a specified value, said control unit recognizes that a system fault has occurred and operation of said system is stopped.

7. A distributed type remote I/O control system according to claim 1, wherein said control unit comprises a communication control section including a transmitted data memory means for storing therein data transmitted to said distributed type remote I/O unit and a received data memory means for storing therein received data from said distributed type remote I/O unit, and a data array in a transmission frame between said control unit and said distributed type remote I/O unit is switched by reversing a sequence of a step of reading a transmission frame from said control unit to said distributed type remote I/O unit and that from said distributed type remote I/O unit to said control unit by each data unit from said transmitted data memory means and a step of writing said transmission frame into a received data memory means according to a data array in an MPU in said basic system of the control unit.

8. A distributed type remote I/O control system according to claim 1, wherein said control unit comprises an MPU and a communication control section, and wherein during a loop back mode in which data transmitted from said control unit to said distributed type remote I/O unit is outputted from said distributed type remote I/O unit and the same data as said outputted data is transmitted to said control unit, is provided to said communication control section in said distributed type remote I/O unit, an instruction for said loop-back mode is given according to a switch packaged in said distributed type remote I/O unit or a header pattern of a transmission frame transmitted from said basic system of the control unit, and a header pattern is changed by said MPU by setting a mode select bit for said communication control section.

9. A distributed type remote I/O control system according to claim 1, wherein said distributed type remote I/O unit comprises communication control section including an MPU for reading data transmitted from said control unit and writing data to be transmitted to said control unit.

10. A distributed type remote I/O control system according to claim 1, wherein said distributed type remote I/O unit allows input/output of an analog voltage, and digital data for output of an analog voltage or input of an analog voltage once for every cycle is transacted between said control unit and said distributed type remote I/O unit.

11. A distributed type remote I/O control system according to claim 1, wherein said distributed type remote I/O unit comprises an output section which is connected to an input section of another distributed type remote I/O unit, and said control unit transmits output data to said distributed type remote I/O unit which is set so that different types of data will be outputted to different distributed type remote I/O units, and said control unit checks that data transmitted to said distributed type remote I/O unit coincides with an I/O connection state previously set in said distributed type remote I/O unit.

12. A distributed type remote I/O control system according to claim 1, wherein, in an on-line communication mode, in correspondence to said distributed type remote I/O unit which is identified by referring to data on a switch on said distributed type remote I/O unit, said control unit cyclically transmits transmission data consisting of a header pattern including a unit number of said distributed type remote I/O unit, commands, and parameters, and only when a transmission frame contains a header pattern corresponding to a set switch for setting a station number of said distributed type remote I/O unit, said distributed type remote I/O unit recognizes said transmission frame and processes command data and parameters in said transmitted data.

13. A distributed type remote I/O control system according to claim 1, wherein said control unit cyclically transmits a header pattern including a unit number of a display unit, a display command and display data to said distributed type remote I/O unit, and said data is displayed on a display unit connected to said distributed type remote I/O unit.

14. A distributed type remote I/O control system according to claim 1, wherein digital data in a synchronizing encoder and a manual pulse generator each connected via said distributed type remote I/O unit to said control unit, a header pattern of said distributed type remote I/O unit and a command to store and read a pulse counter value are cyclically transmitted from said control unit to said distributed type remote I/O unit which includes a pulse counter for counting a number of pulses in a pulse array outputted from said synchronizing encoder and manual pulse generator, and said pulse counter values for said synchronizing encoder and manual pulse generator are transmitted to said control unit.

15. A distributed type remote I/O control system according to claim 1, wherein said control unit transmits to said distributed type remote I/O unit transmission data comprising a command section including a header pattern as well as a sequence number section cyclically changing and a parameter section, said distributed type remote I/O unit interprets a command section of received data and arrays data in said parameter section according to a sequence number.

16. A distributed type remote I/O control system according to claim 15, wherein said distributed type remote I/O unit generates response data consisting of said command section and said parameter section as response data to a received command, said received command and sequence number are assigned to said command section so that said control unit can recognize to which command said received data correspond as a response, and data in said parameter section is arrayed according to said sequence number so that said distributed type remote I/O unit can execute data transfer sequentially to said control unit.

* * * * *